United States Patent [19]
Yamamoto

[11] Patent Number: 5,828,669
[45] Date of Patent: Oct. 27, 1998

[54] NETWORK SYSTEM CONNECTING NODE DEVICES WITH PLURAL CHANNELS, NODE DEVICE USED THEREIN, AND TRANSMISSION CONTROL METHOD THEREFOR

[75] Inventor: Mitsuru Yamamoto, Yokohama, Japan

[73] Assignee: Canon Kabushiki Kaisha, Tokyo, Japan

[21] Appl. No.: 636,332

[22] Filed: Apr. 23, 1996

[30] Foreign Application Priority Data

Apr. 24, 1995 [JP] Japan ..................................... 7-098522
Apr. 9, 1996 [JP] Japan ..................................... 8-086564

[51] Int. Cl.⁶ ..................................................... H04J 4/04
[52] U.S. Cl. ........................ 370/412; 370/420; 370/429; 359/119
[58] Field of Search ..................................... 370/412, 420, 370/428, 429, 433, 437, 408, 421, 413, 414, 415, 416, 417, 418; 359/119

[56] References Cited

U.S. PATENT DOCUMENTS

| 5,276,681 | 1/1994 | Tobagi et al. | 370/420 |
| 5,521,923 | 5/1996 | Willmann et al. | 370/412 |
| 5,526,356 | 6/1996 | Kim et al. | 370/412 |
| 5,633,865 | 5/1997 | Short | 370/412 |

*Primary Examiner*—Chi H. Pham
*Assistant Examiner*—Ricky Q. Ngo
*Attorney, Agent, or Firm*—Fitzpatrick, Cella, Harper & Scinto

[57] ABSTRACT

A network system for effecting signal transmission by connecting node devices with at least plural N channels is disclosed. It includes a first node device constituting at least a node device and having: N fixed-channel reception units for receiving the N channels; N buffers for temporarily storing signals received by the N fixed-channel reception units, wherein a buffer of the N buffers divides the received signals into first signals with designation of a channel for transmission and second signals without designation of a channel for transmission and further divides the first signals in respective designate channels; transmission units for transmitting the first and second signals released from the N buffers in the N channels; an end detection unit for detecting an end of reading of the first and second signals to be transmitted by channels currently capable of transmission; a channel variation control unit for controlling the transmission unit to vary the channels capable of transmitting released signals from the N buffers, in response to a detection of the end of reading by the end detection unit such that the released signals from two or more of the N buffers are not simultaneously supplied to a same channel; and a buffer control unit for controlling the N buffers, in synchronization with a variation of the channels capable of transmitting the released signals from the N buffers, to read the first and second signals be based on the variation of the channels.

78 Claims, 31 Drawing Sheets

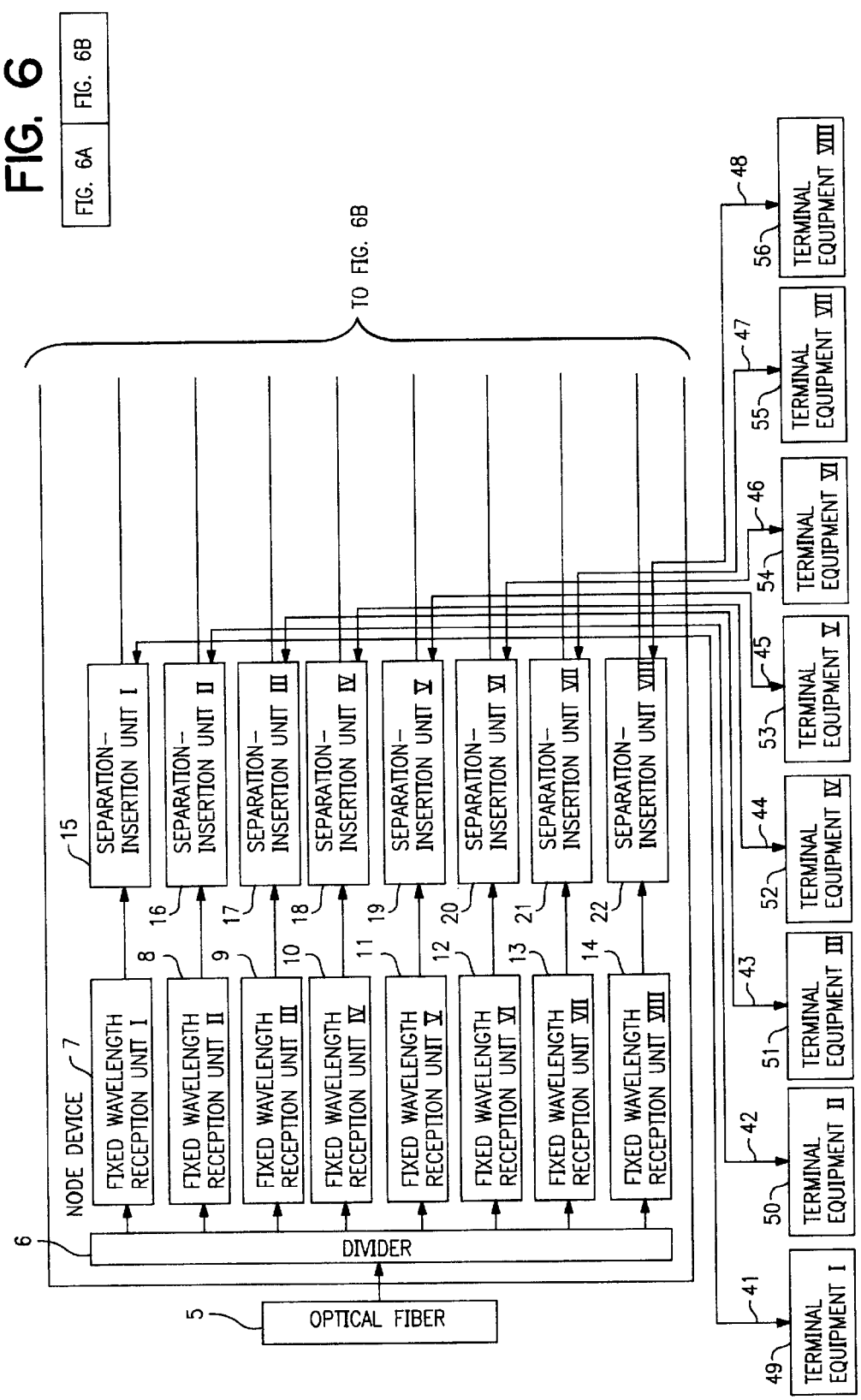

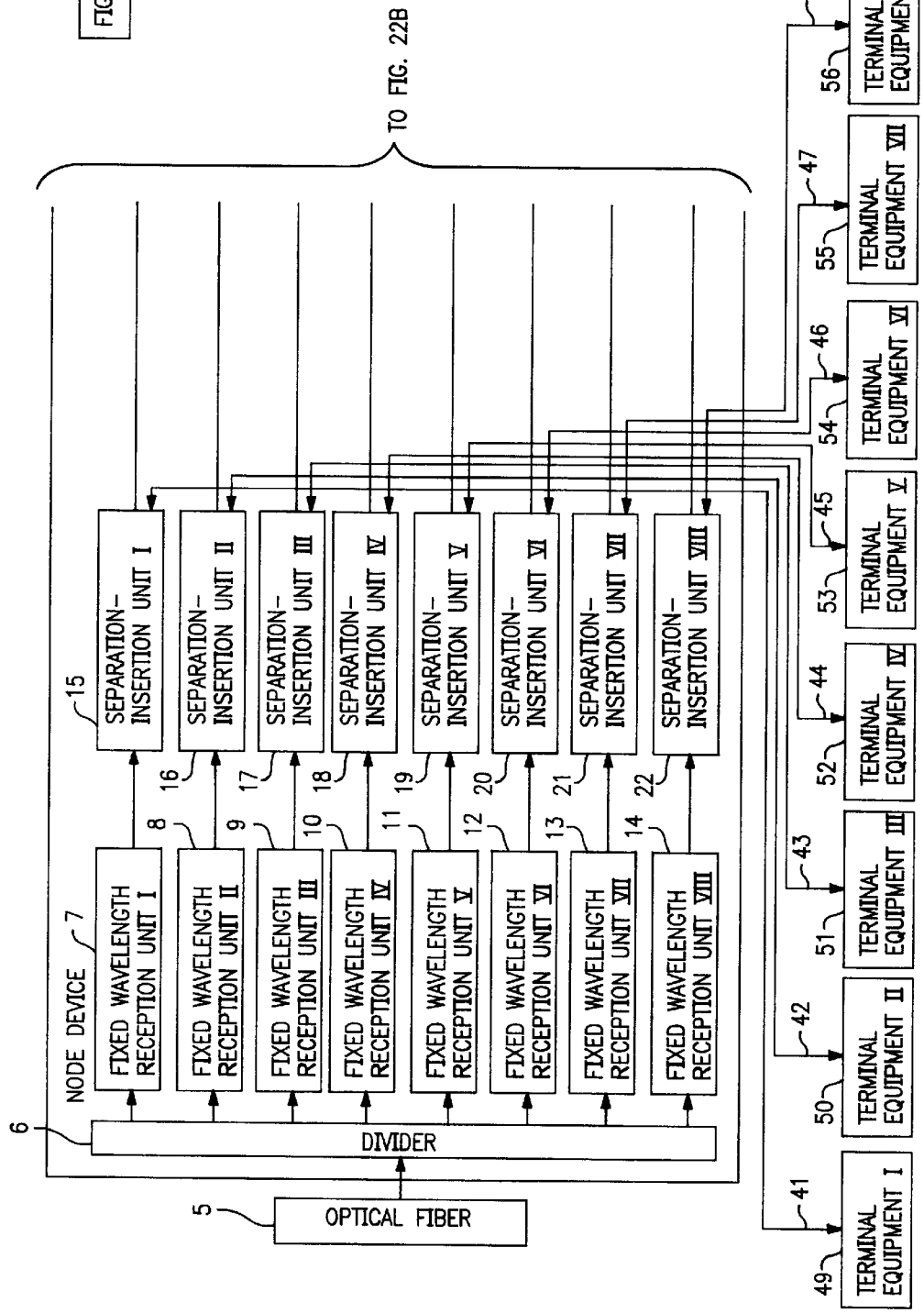

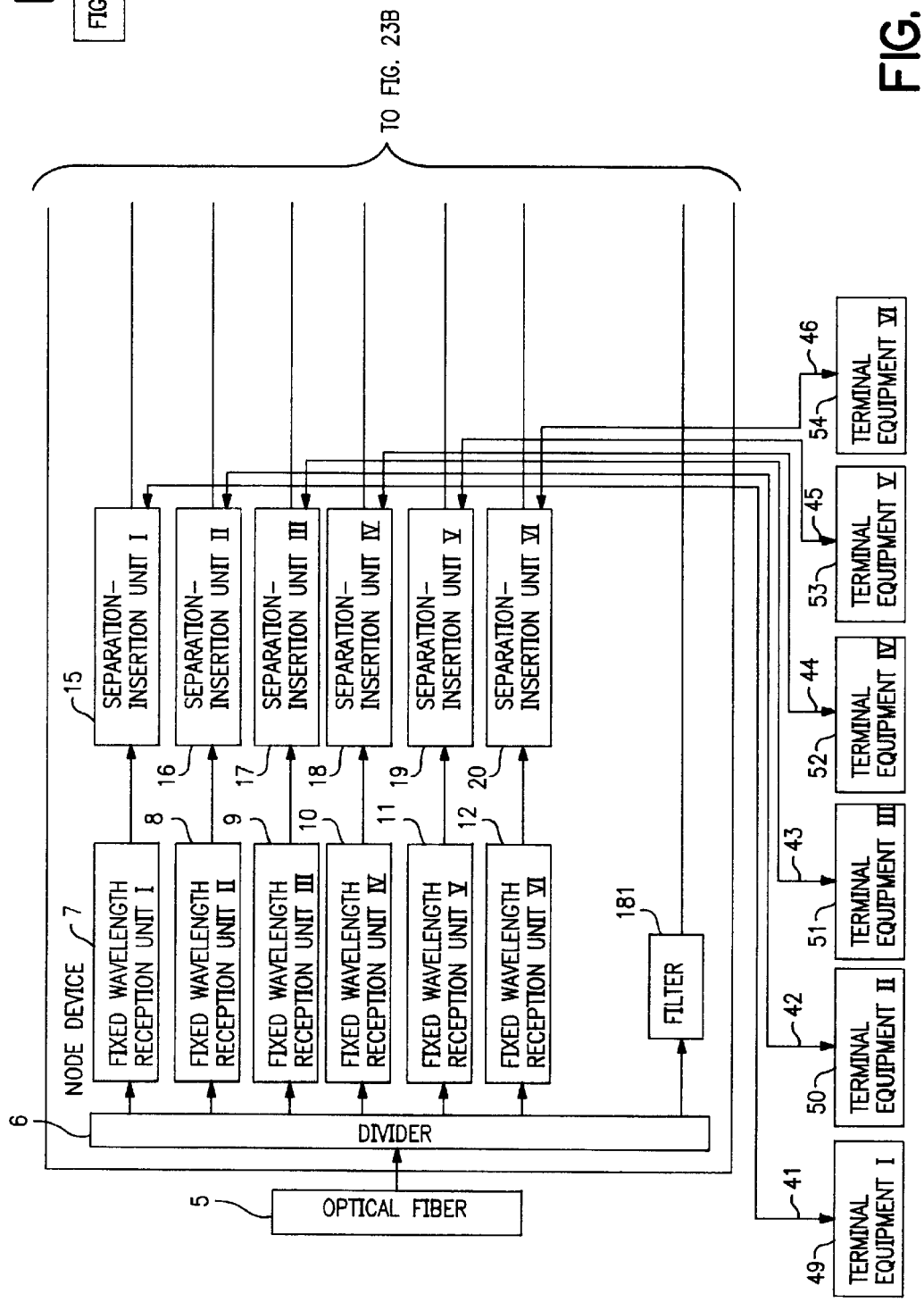

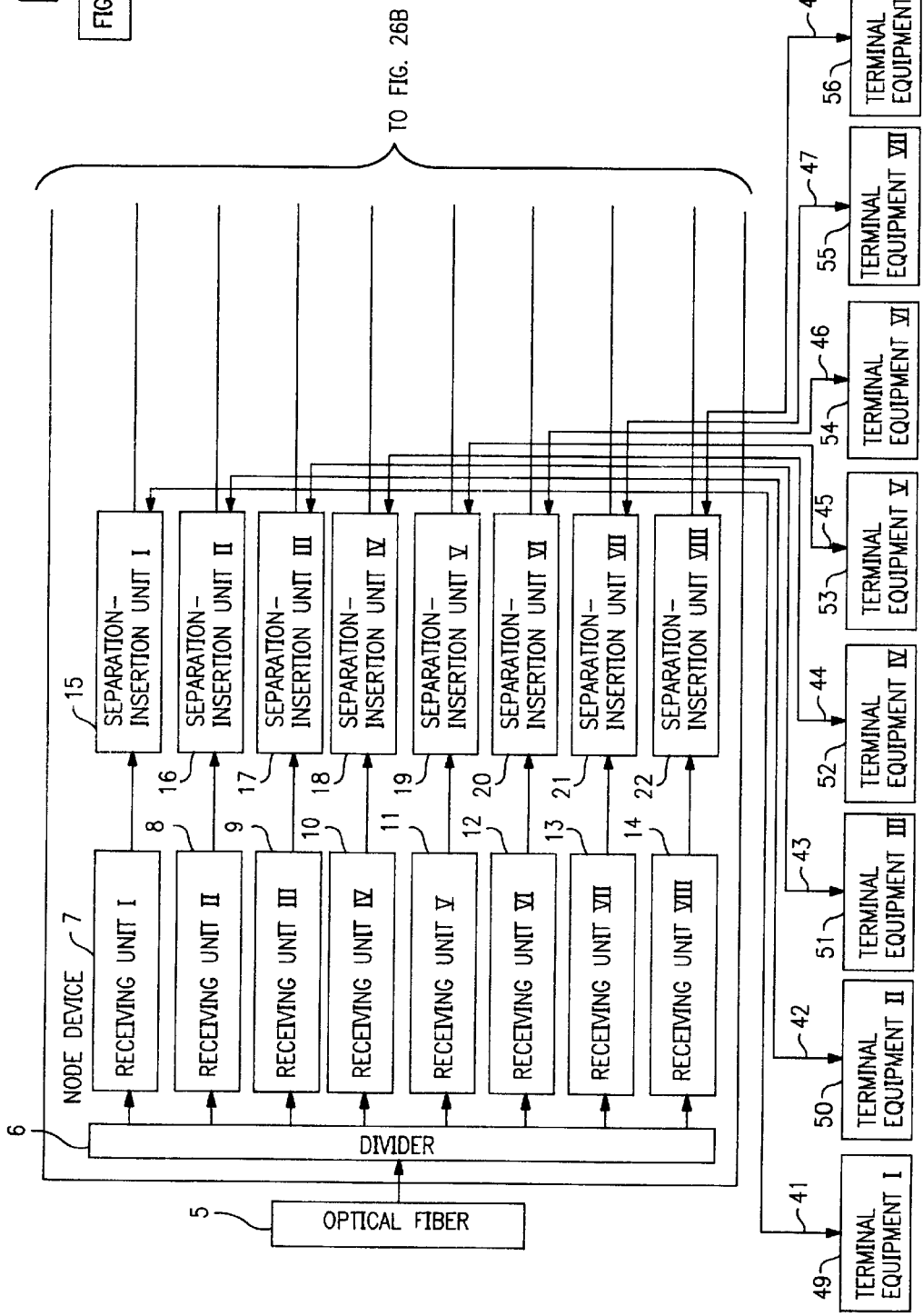

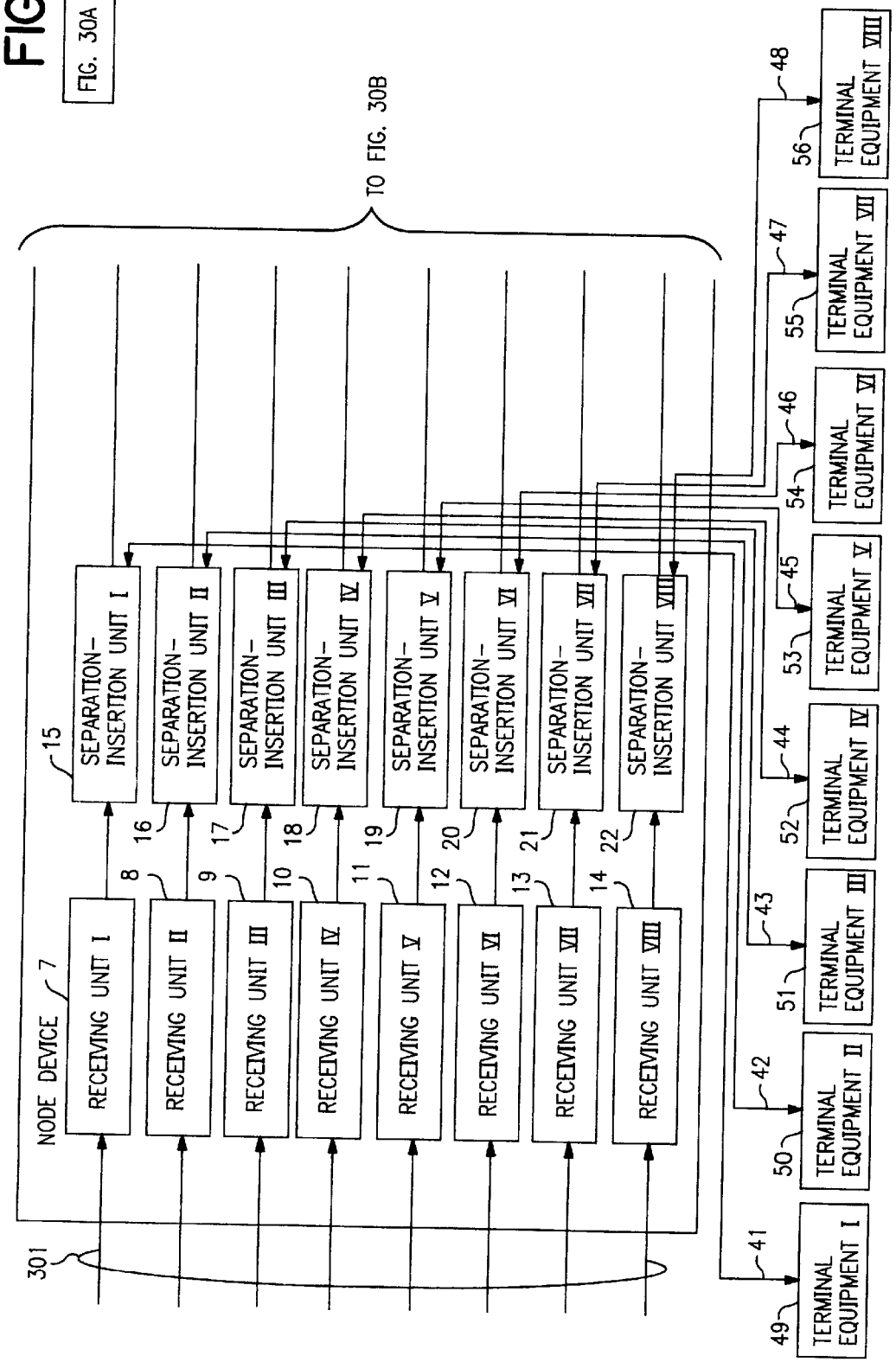

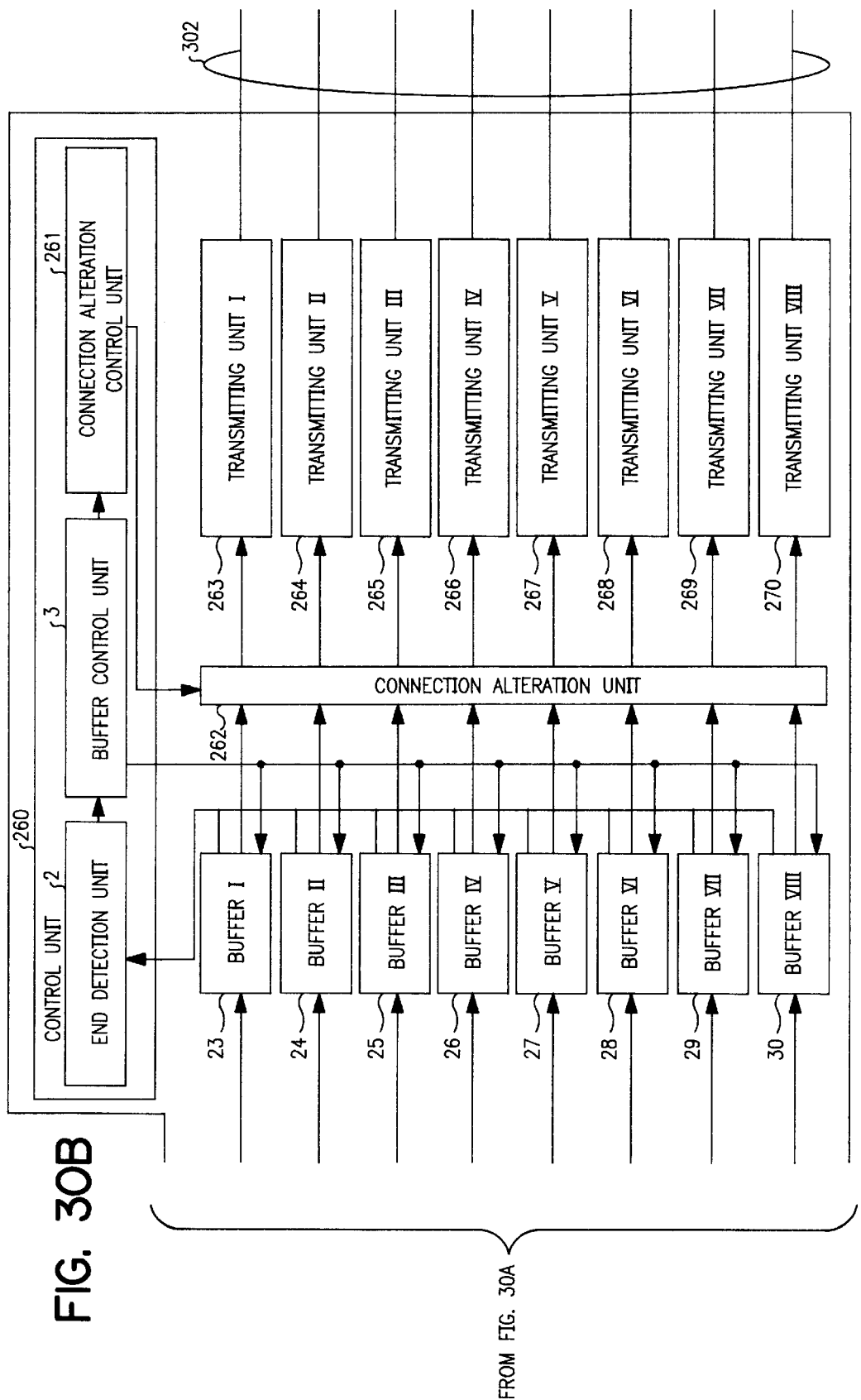

NETWORK SYSTEM CONNECTING NODE DEVICES WITH PLURAL CHANNELS, NODE DEVICE USED THEREIN, AND TRANSMISSION CONTROL METHOD THEREFOR

BACKGROUND OF THE INVENTION

1. Field of the Invention

The present invention relates to a network system connecting node devices with plural channels, and more particularly to such network system in which plural terminal equipment are connected to each of the node devices and communication is made between the terminal equipments through the node devices.

2. Related Background Art

With the increase of process speed in the terminal equipment in recent years, there is being investigated, for the purpose of achieving a higher speed in the network connecting such terminal equipment, a network system utilizing a network composed of a wavelength multiplexed transmission channel employing plural optical wavelengths. Such network systems, node devices used therein and methods therefor can be generally classified into two categories.

In the first category, the network system is composed of node devices 126, each for connecting plural terminal equipment 132, and a multi-channel transmission path 133 employing plural channels and connecting a plurality of the node devices, as shown in FIG. 1.

FIG. 1 shows a wavelength-multiplexed transmission path utilizing plural wavelength, as an example of the multi-channel transmission path. In the network system shown in FIG. 1, a packet transmitted from a terminal equipment 132 and received by an input I/F unit 130 is exchanged in an exchange unit 128 for transmission with predetermined wavelengths by plural fixed-wavelength transmission units 129, then supplied to predetermined fixed-wavelength transmission units 129 and transmitted with predetermined wavelengths. The signal is then relayed by node devices, present in front of a node device to which the destination terminal equipment is connected, finally received by the fixed-wavelength reception unit 127 of the destination node device, controlled by the exchange unit in such a manner as to be released from an output I/F unit 131 to which the destination terminal equipment is connected, released from such output I/F unit and received from the terminal equipment. The exchange unit 128 of the node device serves to guide the entered packet to the desired terminal equipment of the desired node device, by an exchange operation for selecting, among the plural fixed-wavelength transmission units and I/F units, the ones to which the entered packet is to be transmitted.

In the second category, the network system is constructed with so-called shared transmission media structure, connected with wavelength-multiplexed transmission paths such as of a bus or star topology. In such system, in transmitting a packet from a terminal equipment, there is employed so-called demand-assign method in which the terminal equipment sends a request for the use of the wavelength-multiplexed transmission path to a server managing the wavelength to be used by each terminal equipment and obtains an assignment of the wavelength to be used from the server, thereby realizing arbitration control for avoiding a competitive situation in which a same wavelength is used by plural terminal equipment In the network system of the second category, the packet transmission is conducted with such assigned wavelength.

However, the conventional configurations mentioned above have been associated with the following drawbacks.

In the conventional configuration of the first category, the node device becomes expensive because of the large hardware magnitude of the exchange unit as will be explained in the following.

FIG. 2 showing an example of configuration of the exchange unit employed in the conventional first category, illustrates a crossbar exchange unit with N inputs and N outputs. The number N of the inputs is the sum of the number of the fixed-wavelength reception units and that of the input I/F units, and the number N of the outputs is similarly the sum of the number of the fixed-wavelength transmission units and that of the output I/F units.

Referring to FIG. 2, a decoder 134 reads the address portion of the packet and generates output designation data for designating the destination of the packet to the control unit. A FIFO (first-in-first-out) register 135 temporarily stores the input packets and releases them in the order of entry, under the control by the control unit. An input line 136 sends the packet signal from the FIFO to the input terminal of a switch. A switch 137 selects whether or not to send the packet signal, entered from the input line, to an output line. There are employed switches of a number N×N, for N inputs and N outputs. A control unit 138 controls the signal readout from the FIFO and the open/close control of the switches, according to the output designation data from the decoder. An output line 139 sends the packet signal from the switch to the destination.

FIG. 3 shows the configuration of a packet exchanged in the exchange unit. the packet consists of an address portion 140 indicating the destination terminal equipment of the packet, and a data portion 141 transmitted by the packet.

FIG. 4 shows an example of the decoder unit, for decoding the addresses of all the n terminal equipment connected to the network system.

In FIG. 4, a latch 142 temporarily stores the address portion of the input packet. A memory 143 has n memory units, in which the addresses of all the n terminal equipment, connected to the network system, are respectively stored by an unrepresented decoder management unit. A comparator 144 compares the packet address, temporarily stored in the latch, with the address stored in each memory unit, and, in case of coincidence, sends a coincidence signal to a table address generator 145, which generates a table address for reading an output designation table. An output designation table 146, storing output designation data for open/closing the switches 137, releases desired output designated data for supply to the control unit 138, based on the instruction from the table address generator. The table address generated from the table address generator is used for reading a table corresponding to the number of the comparator which has generated the coincidence signal, so that there is read the output designation data of a table corresponding to the address of the input packet. The switches 137 are suitably operated according to the output designation data, whereby the input packet is released from a predetermined output terminal In such crossbar exchange device, the control unit 138 effects routing control by controlling the switches connected to the desired destination. Also it effects arbitration control, in case of so-called output competition where a same output destination is simultaneously desired by plural inputs, of selecting the input to be released to the destination. The exchange operation is achieved through these controls.

However such conventional exchange unit is associated with a drawback that the magnitude of the hardware becomes very large as it requires N×N switches for N inputs and N outputs.

Also in such conventional exchange unit, the output terminals of the switches are connected, in a number N, to a same output line. For this reason the connecting line becomes long, leading a delay in the line or an increase in the floating capacitance therein, and the operating speed of the switches cannot be increased when the number N of the inputs increases. Consequently such exchange unit is not suitable for the exchange of high-speed packet signals.

Furthermore, such conventional exchange unit has to execute arbitration control by detecting, for each output, the presence of output competition on the input signals from all the inputs. For this reason, the control unit inevitably becomes large in the hardware magnitude.

In summary, the conventional network system of the first category has a first drawback in that each node device, necessitating an expensive exchange unit with a large hardware magnitude, such that the cost for connecting a terminal equipment to the network system becomes high.

Secondly, the exchange unit requires N×N switches for N inputs and N outputs, wherein the number N is selected as the sum of the number of the fixed wavelength reception or transmission units and that of the input or output I/F units. For this reason, with the increase in the number of channels of the multi-channel transmission paths or of the connected terminal equipment, the number of switches non-linearly increases in the second order, leading to a very large hardware magnitude.

Thirdly, the conventional decoder requires a seperate memory, a comparator and output designation table for each item of the terminal equipment connected to the network system. This is because the destination address of the packet is compared with the addresses of the terminal equipment connected to the network system and the output designation data is read from the output designation table, based on the coinciding terminal address. Also, the table address generator requires a longer time for generating the table address, with the increase of the coincidence signals to be entered. Consequently, in such conventional decoder, with the increase in the number of terminal equipment connected to the network system, there results an increase in the hardware magnitude and in the cost of each node device. Moreover it becomes difficult to decode the addresses at a high speed, thus hindering the high-speed operation of the network system.

On the other hand, the conventional network system of the second category is constructed as shown in FIG. 5 and is associated with the following drawbacks.

FIG. 5 illustrates a conventional configuration of the second category, in which a server for assigning the wavelengths to the terminal equipment and plural terminal equipment are connected in a bus-type configuration. In FIG. 5, an optical fiber 147 constitutes a bus-type wavelength-multiplexed transmission path. There are also shown a server 148 having the wavelength assigning function; terminal equipment 149; multiplexer/dividers 150 for transmitting the optical signal from the variable-wavelength transmission unit to the optical fiber and also transmitting the optical signal, sent through the optical fiber, to the fixed-wavelength reception units; variable-wavelength transmission units 151, each provided with a tunable laser diode (TLD) and adapted to convert the packet signal from a packet process unit into an optical signal of a predetermined wavelength for supply to the multiplexer/divider under the control of a wavelength control unit; and fixed-wavelength reception units 152, each composed of a filter for transmitting the optical signal of a predetermined wavelength and intercepting those of other wavelengths and a photodiode for converting the optical signal of the predetermined wavelength, transmitted by the filter, into an electrical signal. The transmission wavelength of the filter of the fixed-wavelength reception unit is made different for each terminal equipment. A packet process unit 153 divided the data to be transmitted into desired packets, and restores the original data from the received packets. A wavelength control unit 154 controls the transmission wavelength of the variable-wavelength transmission unit at a desired value. An allocation control unit 155 effects allocation of the plural wavelengths used in the network system and also effects arbitration control on the competition of use of the wavelengths.

In this conventional configuration of the second category, As the optical fiber constituting the bus-type wavelength-multiplexed transmission path is shared by the terminal equipment, there is necessitated the arbitration control for avoiding the overlapping of the transmission wavelengths from the variable-wavelength transmission units of the plural terminal equipment. For this reason there is employed the demand-assign method. In transmitting a packet, each terminal equipment first sets the variable-wavelength transmission unit to a wavelength receivable by the server and sends a transmission request packet, specifying the destination terminal equipment, to the server. In response, the server determines, in the wavelength assignment control unit, the status of use of the optical signal of the wavelength receivable by the destination terminal equipment, and sends a communication enable/disable packet indicating that the communication is enabled or disabled respectively if the above-mentioned wavelength is used or not, by setting the variable-wavelength at a wavelength receivable by the terminal equipment that has issued the transmission request packet. In response, if the communication is enabled, the terminal equipment that has issued the transmission request packet sets the variable-wavelength transmission unit at a wavelength receivable by the destination terminal equipment and transmits the desired packet. If the communication is disabled, it again sends the transmission request packet to the server after a predetermined waiting time, and repeats this procedure until the communication is enabled. In this manner the arbitration control for avoiding the overlapping of the transmission wavelengths from the variable-wavelength transmission units of the plural terminal equipment is realized.

In this conventional configuration of the second category, the filter of each terminal equipment has a different transmission wavelength, so that each photodiode receives a wavelength specific to each terminal equipment. Consequently the routing function for transmitting the packet to a desired destination can be achieved by adjusting the transmission wavelength of the tunable laser diode (TLD) of the terminal equipment issuing the packet.

However, such conventional network system of the second category is associated with the drawback of requiring time in the communication with the server for the arbitration control, including the transmission of the transmission request packet and the reception of the communication enable/disable packet, and in the arbitration itself because of the increased burden in the arbitration control unit of the server, since all the arbitration control for all the wavelengths used in the network has to be executed in the server. Besides the throughput of the network deteriorates since data communication is not possible during the setting time required for setting the transmitting wavelength. Furthermore, the wavelength control unit of each terminal equipment is required to be capable of high-speed wavelength control because the transmission wavelength has to be controlled to a predetermined value in each communication with the server and with the destination terminal equipment, so that the magnitude of the hardware becomes inevitably large

SUMMARY OF THE INVENTION

As a result of intensive research, the present inventors have found that the exchange operation in the conventional exchange unit in the first category consists of switching the connection between the information transmission source and the destination by connecting the plural signal transmission sources and the plural destinations with plural channels and by varying the combination of the transmission source and the destination utilizing each channel. It has also been found that the arbitration can be dispensed with and that each channel can be utilized efficiently, in such variation of the combination, by fixedly assigning a channel to either of the transmission source or the destination, selecting the channel to be used by the other in such a manner that the channels used by the plural transmission sources or the plural destinations function simultaneously without overlapping, causing each transmission source or destination to effect transmission or reception of the data in thus set channel until the transmission of the data to be transmitted in thus set channels are completed in all the channels or in a part thereof, then causing to effect the transmission or reception of the data for which the transmitting or receiving channel is not designated, and then changing the channels to simultaneously function without overlapping.

In consideration of the foregoing, a first object of the present invention is to dispense with the exchange unit in the conventional node device of the aforementioned first category, thereby minimizing the hardware magnitude of the node device and providing an Inexpensive node device.

A second object of the present invention is to simplify the decoder unit to improve the throughput of the network system, thereby providing an improved node device, a network system and a transmission control method, capable of functioning with a higher speed than in the conventional configuration and with a smaller magnitude of hardware.

A third object of the present invention is to dispense with the arbitration control to improve the throughput of the network system, and to simplify the routing control and to extend the period of variation of the transmission channel of the transmission means, such as the transmission wavelength of the tunable laser diode employer in the variable-wavelength transmission means, thereby providing an improved node device, a network system and a transmission control method capable of functioning with a higher speed than in the conventional configuration with a smaller magnitude of the hardware.

The foregoing objects can be attained, according to the present invention, by a network system and a node device constructed in the following manner with a following transmission control method:

1) A network system for effecting signal transmission by connecting node devices with at least plural N channels, comprising:
at least a first node device including:
N fixed channel reception means for respectively receiving said N channels;
N buffer means for temporarily storing at least signals respectively received by said N fixed-channel reception means, wherein a buffer means of said N buffer means divides said received signals into first signals with designation of a channel for transmission and second signals without designation of a channel for transmission, where the first and second signals are to be transmitted to another node device, and further divides the first signals in respective designate channels;
transmission means for transmitting each of the first and second signals from said N buffer means to any of said N channels;
end detection means for detecting the end of readout of the signals to be transmitted by the first and second currently available channels;
channel variation control means for controlling said transmission means to vary the channels capable of transmitting released signals from said N buffer means in response to the detection of the end of reading by said end detection means, such that the release signals from two or more of said N buffer means are not simultaneously transmitted to a same channel; and
buffer control means for controlling said N buffer means, in synchronization with the variation of the channels capable of transmitting the released signals from the N buffer means, to read the first and second signals based on the variation of the channels.

The above-explained configuration achieves a function equivalent to the conventional arbitration control, by switching the channels capable of transmission from the buffer means without referring to the addresses of the signals stored in the buffer means, and by controlling the signal readout from the buffer means so as to read the packet to be transmitted by the channels currently available for transmission Also the switching of the channels capable of transmission can be achieved efficiently as it is executed by the detection of the end of readout of the signals to be read by the channels currently capable of transmission.

2) A network system according to 1), wherein said first node device further includes A, B or C:
A. N separation means for separating, among a signal flow released from said N fixed channel reception means, only a predetermined signal according to associated address information of the signals, for sending said predetermined signal to terminal equipment connected thereto;
B. N insertion means for inserting signals transmitted from said connected terminal equipment into the signal flow from said N fixed channel reception means; or
C. both of said N separation means and said N insertion means.

This represents a configuration for connecting the node device and the terminal equipment to be connected therewith. The separation means is to separate the signal from the node device to the terminal equipment, and the insertion means is to enter the signal from the terminal equipment into the node device. The presence of the separation means and the insertion means allows signal transmission and reception between the node device and the terminal equipment.

3) A network system according to 2), wherein the associated address information contained in said predetermined signal includes channel identification information for identifying a channel corresponding to the N separation means to which the destination terminal equipment is connected, and node device identification information for identifying the node device to which the destination terminal equipment is connected;

said buffer means is adapted to determined the channel to which said signal is to be transmitted, according to said channel identification information of the input signal; and said N separation means is adapted to separate the predetermined signal and to send the same to the destination terminal equipment connected to said separation means, according to said node device identification information.

This configuration improves the efficiency of transmission, as all the addresses of the input signal need not be analyzed in the buffer means or in the separation means.

Also for the timing of the channel variation, there are provided following configurations 4) and 5);

4) A network system according to 1), wherein said channel variation control means is adapted to vary the channels capable of transmitting the released signals, after the detection of the end of reading of the first and second signals to be transmitted by the channels currently capable of transmission from all of said N buffer means.

5) A network system according to 1), wherein said channel variation control means is adapted to vary the release channels capable of transmitting the signals from said N buffer means, after a predetermined time from the detection of the end of reading of the first and second signals to be transmitted by the channels currently capable of transmission from all said N buffer means.

In the configuration of the present invention in which the node devices are connected with plural channels, when a signal is relayed by plural node devices, it is not necessary to designate the channel for transmission in all the node devices. It is therefore possible to improve the efficiency of relaying by transmitting the signal as soon as the relaying becomes possible without the channel designation, in the node devices for which the channel designation is not required. In the configuration of the present invention it is preferable, within a period in which the transmission is possible with a certain channel, to at first transmit the signal to be transmitted in this channel and then to transmit the signal which does not require channel designation, but the above-explained configuration 5) allows transmission of the signal without channel designation from any buffer means, by providing a predetermined period after the detection of the end in all the buffer means and before the variation of the channels.

6) A network system according to 1), wherein said channel variation control means is adapted to vary the channels for transmitting the signals from said N buffer means, according to 8 predetermined pattern.

This configuration facilitates the control of the channel variation, as the channels are varied according to a predetermined pattern.

7) A network system according to 1), wherein said transmission means is composed of N variable-channel transmission means respectively corresponding to said N buffer means, and said channel variation control means is adapted to respectively vary the transmission channels of said N variable-channel transmission means.

This configuration eliminates electrical switching, as the release channels capable of transmission from the buffer means are varied by the switching of the channels capable of transmission of the variable-channel transmission means.

8) A network system according to 1), wherein said transmission means is composed of N fixed-channel transmission means adapted for output of predetermined channels within said N channels without overlapping, and connection varying means for varying the connection between said N buffer means and said N fixed-channel transmission means; and said channel variation control means is adapted to control said connection varying means to vary said fixed-channel transmission means capable of transmitting the, released signals.

In this configuration, the connection is switched by the connection varying means, but the burden of control is small since the address of the input signal is not considered in the switching control. A specific configuration of the connection varying means is given by 9).

9) A network system according to 8), wherein said connection varying means is composed of N selectors respectively corresponding to said N fixed-channel transmission means, and means for distributing the outputs of said N buffer means to all of said N selectors, and the variation of connection is achieved by the variation in the selection of the outputs of the N buffer means in each of said N selectors.

Also plural channels can be realized by the following configuration 10).

10) A network system according to 1), wherein said plural N channels are the lights of respectively different wavelengths.

In this configuration, the use of a wavelength-variable semiconductor laser is particularly preferable, as the high-speed switching of wavelength or channel is rendered possible. Also the use of the wavelength multiplexing technology is preferable in consideration of the cost of the transmission path and the ease of wiring, as plural channels can be accommodated in a single transmission path.

11) A network system according to 1), wherein said plural N channels are respectively different transmission paths.

This configuration eliminates the concern of crosstalk among plural channels.

Also there is provided a configuration including a node device capable of transmission and reception.

12) A network system for effecting signal transmission by connecting node devices with at least plural N channels, comprising:

a first node device effecting at least signal transmission and reception, including:

N buffer means for temporarily storing at least the signals to be transmitted to another node device wherein a buffer means of said N buffer means divides said signals into first signals with designation of a channel for transmission and second signals without designation of a channel for transmission, and further divides the first signal in respective designate channels, transmission means for transmitting first and second signals from said N buffer means to any of said N channels;

end detection means for detecting the end of reading of the first and second signals to be transmitted by the channels currently capable of transmission;

channel variation control means for controlling said transmission means to vary the channels capable of transmitting the released signals from said N buffer means in response to the detection of an end by said end detection means, such that the released signals from two or more of said N buffer means are not simultaneously transmitted to a same channels; and buffer control means for controlling said N buffer means, in synchronization with the variation of the channels capable of transmitting the released signals, to read the first and second signal based on the variation of the channels;

a second node device for receiving the released signals transmitted from said first node device, including:

N reception means for respectively receiving at least said N channels.

The present invention also provides a node device corresponding to the foregoing configurations 1) to 12).

Also there are provided following transmission control methods:

1) A signal transmission control method for use in a node device in a network system for signal transmission by connecting node devices with at least plural N channels, comprising steps of:

respectively receiving signals by said N channels;

temporarily storing in N buffer means, among at least the received signals signals to be transmitted to another node device wherein the stored signals are divided into first signals with designation of the channel for transmission and second signals without designation of the channel for transmission, and where the first signals are further divided in respective designate channels;

transmitting the first and second signals released form the N buffer means respectively in the N channels such that released signals from two or more of the N buffer means are not supplied to a same channel;

detecting the end of reading of the first and second signals to be transmitted by channels currently capable of transmission in the N buffer means;

varying the channels capable of transmitting the released signals from said N buffer means in response to the detection of the end of reading such that the released signals from two or more of the N buffer means are not simultaneously transmitted to a same channel; and controlling the N buffer means, in synchronization with the variation of the channels capable of transmitting the released signals from the N buffer means, to read the first and second signals based on the variation of the channels.

2) A signal transmission control method according to 1), wherein the second signals are read when there is no first signal to be transmitted, or after the first signal to be transmitted has been exhausted.

This method can reduce the frequency of channel variations.

3) A signal transmission control method according to 1), wherein the variation of the channels capable of transmitting the released signals from the N buffer means is executed after the detection of end of reading of the first and second signals to be transmitted by the channels currently capable of transmission.

4) A signal transmission control method according to 1) wherein the variation of the channels capable of transmitting the released signals from the N buffer means is executed after a predetermined time from the end of the detection of the and of reading of the first and second signals to be transmitted by the channels currently capable of transmission.

5) A signal transmission control method according to 1) wherein the variation of the channels capable of transmitting the released signals from the N buffer means is executed according to a predetermined pattern.

Also in the network system of the present invention, in case a signal is relayed by plural node devices, the channel designation is required only in the transmission from a node device immediately in front of the destination node device of the signals, or the node device to which the destination terminal equipment is connected.

Also provided is the following transmission control method for a node device capable of transmission and reception.

6) A signal transmission control method for use in a node device in a network system for signal transmission by connecting node devices with at least plural N channels, comprising steps of;

temporarily storing signals to be transmitted to another node device in N buffer means, wherein the stored signals are divided into first signals with designation of a channel for transmission and second signals without designation of a channel for transmission, and where the first signals are further divided in respective designate channels;

transmitting first and second signals released from the means in any of the N channels such that the released signals from two or more of the N buffer means are not supplied to a same N channel;

detecting an end of reading of the first and second signals to be transmitted by channels currently capable of transmission;

varying the channels capable of transmitting the released signals in response to an detection of the end of reading such that the released signals from two or more of the N buffer means are not simultaneously transmitted to a same channel; and controlling the N buffer means, in synchronization with the variation of the channels capable of transmitting the released signals , to read the first and second signals based on the variation of the channels.

BRIEF DESCRIPTION OF THE DRAWINGS

FIG. 30 is comprised of FIGS. 30A and 30B illustrating views showing the configuration of a node device adapted for using separate transmission paths as the plural channels, in the 5th embodiment of the present invention.

DETAILED DESCRIPION OF THE PREFERRED EMBODIMENTS

[Embodiment 1]

Figure 6B:
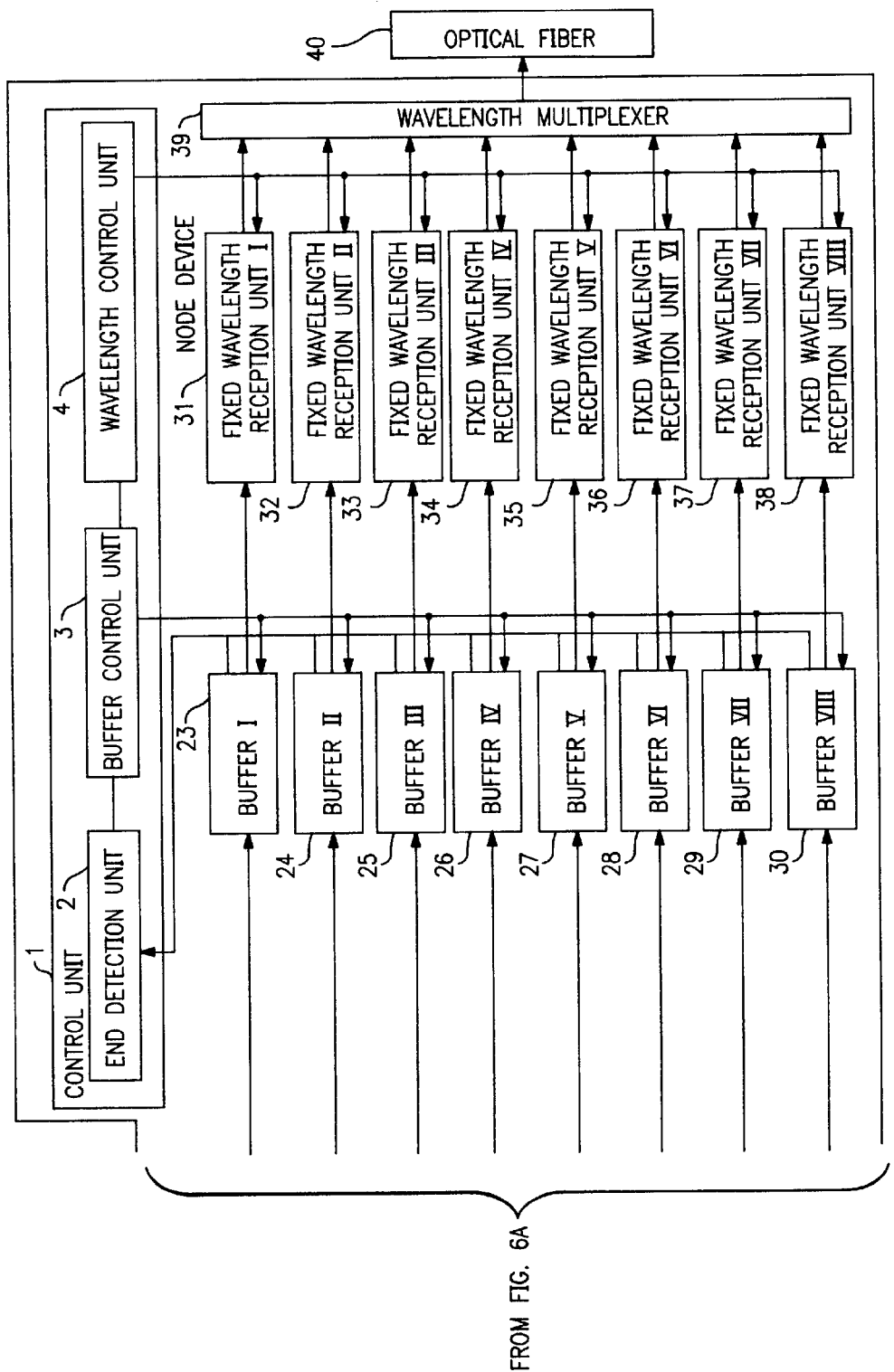
FIG. 6 is comprisd of FIGS. 6A and 6B illustrating views showing the configuration of a node device in a first embodiment of the present invention.

The present embodiment provides a ring-shaped network employing optical signals of plural wavelengths as plural channels and a wavelength-multiplexed transmission path as the multi-channel transmission path FIGS. 6A and 6B show a first embodiment of the node device of the present invention, adapted for connecting eight terminal equipment in a network system utilizing a multi-channel transmission path having 8 channels by optical wavelength multiplexing of 8 wavelengths ($\lambda 1$, $\lambda 2$, $\lambda 3$, $\lambda 4$, $\lambda 5$, $\lambda 6$, $\lambda 7$, $\lambda 8$).

Figure 1:
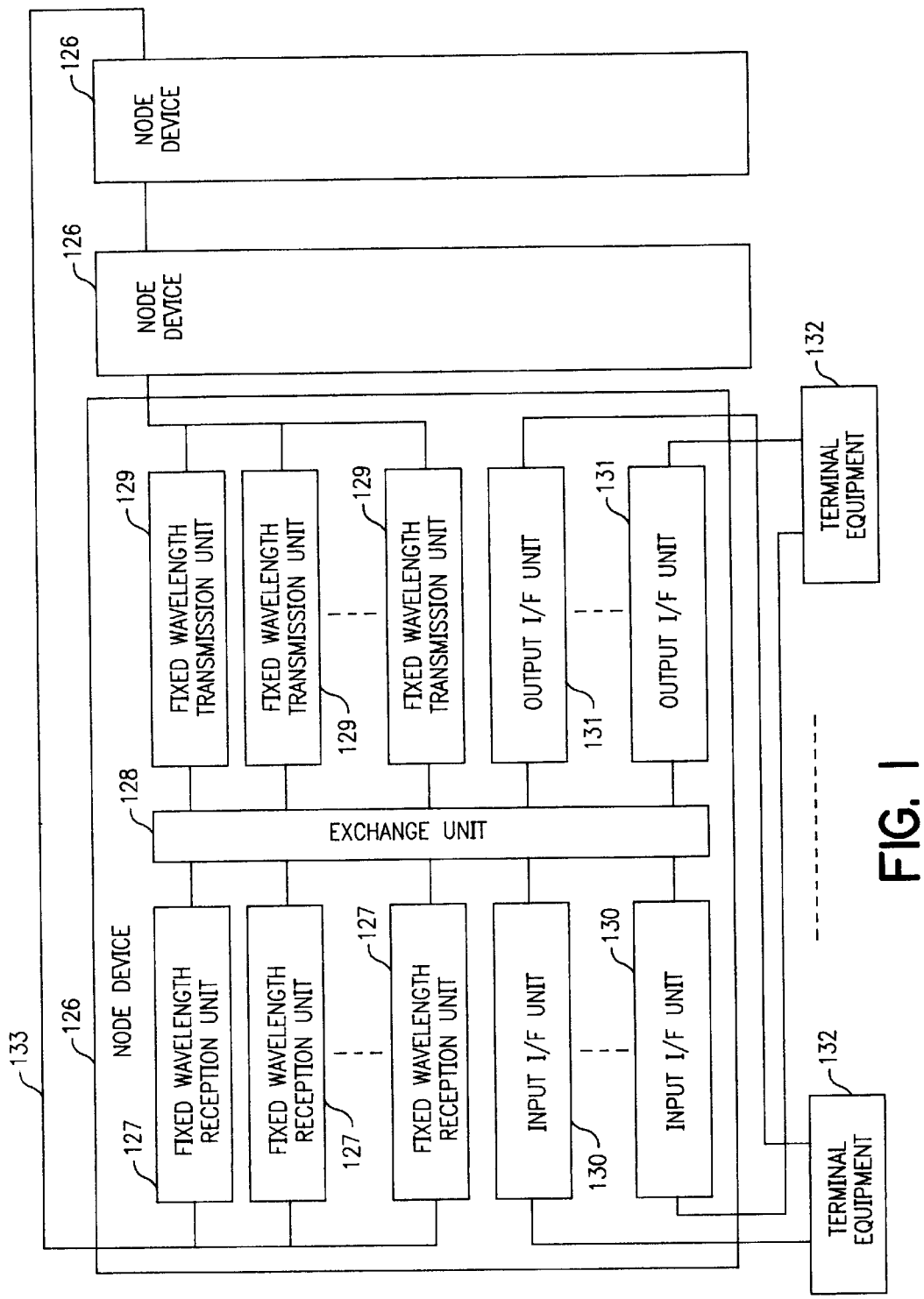
FIG. 1 is a view showing a first conventional configuration.
Figure 7:
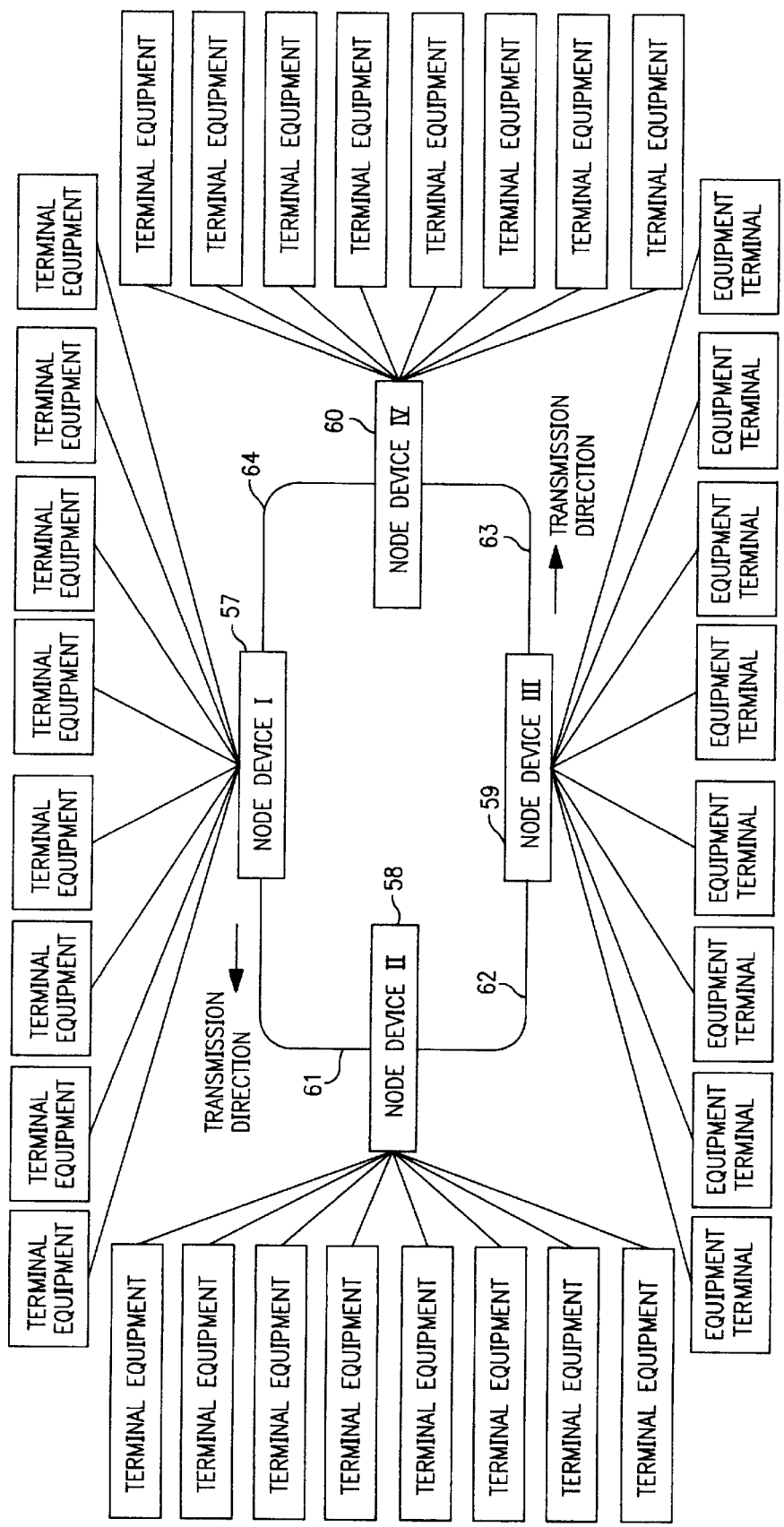
FIG. 7 is a view showing the configuration of a network system in the first embodiment of the present invention.

FIG. 7 shows an example of the network system utilizing the node devices of the first embodiment shown in FIGS. 6A and 6B, in which four node devices are connected as a ring with optical fibers. The direction of packet transmission is indicated by arrows, and the four node devices are same in the internal structure as shown in FIG. 1.

In the network system shown in FIG. 7, utilizing the node devices shown in FIGS. 6A and 6B, a packet transmitted from a terminal equipment constituting the transmission source is relayed by the node devices present between a node device to which the terminal equipment of the transmission source is connected and another node device to which the destination terminal equipment is connected. In such relayed transmission, the transmitting wavelength, namely the transmitting channel, is designated in a node device which is immediately upstream, in the transmitting direction, of the node device to which the destination terminal equipment is connected. The wavelength at the transmission is not designated in other node devices. By such transmission in thus designated channel, the reception means is varied in the node device present immediately downstream in the transmitting direction, whereby the packet is shifted to a desired channel process group.

In FIGS. 6A and 6B there are shown a control unit 1 of the node device, provided therein with an end detection unit 2, a buffer control unit 3 and a wavelength control unit 4; an end detection unit 2 for detecting the end of readout of channel-designated packets stored in buffers I to VIII and sending an end signal to the buffer control unit 3; a buffer control unit 3 for controlling the readout of the packets stored in the buffers I to VIII and sending a wavelength variation instruction signal to a wavelength control unit 4; a wavelength control unit 4 for controlling the transmission wavelength of variable-wavelength transmission means, in response to the wavelength variation instruction signal from the buffer control unit 3, according to a predetermined transmission wavelength control pattern to be explained later; an optical fiber 5 constituting an optical wavelength-multiplexed transmission path and serving as a transmission medium between a multiplexer of an upstream adjacent node device and a divider of this node device; a divider 6 for dividing the optical signal, transmitted through the optical fiber 5 to 8 fixed-wavelength reception units;, fixed-wavelength reception units I to VIII (7–14) utilizing photo-diodes and having an internal structure to be explained later, and respectively adapted to receive packet flows transmitted by the optical signals of wavelengths $\lambda 1$ to $\lambda 8$; separation/insertion units I to VIII (15–22) constituting separation means and insertion means for separating, from the packet flow released from the fixed-wavelength reception unit, a packet to be transmitted to a sub transmission path and sending such separated packet to the sub transmission path, and also inserting a packet, transmitted from the sub transmission path, into the packet flow released from the fixed-wavelength reception unit, with an internal structure to be explained later, wherein each of the separation/insertion units I (15) to VIII (22) is connected to a terminal equipment; buffers I to VIII (23—30) constituting buffer means for dividing the packets released from the separation/insertion means into channel-designated packets which have to be transmitted in channels of specified wavelengths and channel-non-designated packets which can be transmitted in the channels of any wavelength, and temporarily storing such packets, with an internal structure to be explained later; variable-wavelength transmission units I to VIII (31–38) utilizing tunable laser diodes (TLD), for converting a packet from the buffer into an optical signal of a predetermined wavelength selected among the wavelengths $\lambda 1$ to $\lambda 8$ under the control of the wavelength control unit 4 and sending the optical signal through a multiplexer 39 to an optical fiber 40 constituting an optical wavelength-multiplexed transmission path; a multiplexer 39 for multiplexing the optical signals of wavelengths $\lambda 1$ to $\lambda 8$ transmitted from the eight variable-wavelength transmission units, for release to the optical fiber 40; an optical fiber 40 constituting the physical medium of an optical wavelength-multiplexed transmission path and serving as a multi-channel transmission path between the multiplexer of this node device and the divider of a downstream adjacent node device; sub transmission paths I to VIII (41–48) serving as packet transmission paths between the separation/insertion units and terminal equipment; and terminal equipment I to VIII (49–56) adapted for receiving the packet released from the separation/insertion units and preparing packet which are transmitted to other terminal equipment through the sub transmission paths to the separation/insertion units.

FIG. 7 shows an example of the network system utilizing the node devices of the first embodiment shown in FIGS. 6A and 6B, wherein four node devices are connected by optical fibers. There are shown node devices 57–60 as shown in FIGS. 6A and 6B, each of which is connected to eight terminal equipment through eight sub transmission paths; and optical fibers 61–64 constituting the optical wavelength-multiplexed transmission paths.

The optical fibers 61–64 correspond to those 5, 40 shown in FIGS. 6A and 6B, in the following manner. For the node device I (57), the optical fibers 5, 40 in FIGS. 6A and 6B respectively correspond to those 64, 61 in FIG. 7. For the node device II (58), the optical fibers 5, 40 in FIGS. 6A and 6B respectively correspond to those 61, 62 in FIG. 7. Similar relationship stands also for the node devices III (59) and, IV (60).

Referring to FIGS. 6A and 6B, the fixed-wavelength reception unit I (7), the separation/insertion unit I (15), the buffer I (23) and the variable-wavelength transmission unit I (31) constitutes a set of the channel process means for the packet transmitted by a channel of the wavelength $\lambda 1$, and the packet received by the fixed-wavelength reception unit I (7) is processed in this set and is not processed in other sets. Similarly the fixed-wavelength reception unit II (8), the separation/insertion unit II (16), the buffer II (24) and the variable-wavelength transmission unit II (32) constitute a set of the channel process means for the packet transmitted by a channel of the wavelength $\lambda 2$, and other fixed-wavelength reception units, separation/insertion units, buffers and variable-wavelength transmission units are constructed in a similar manner.

In the network system shown in FIG. 7,. in the four node devices I (57) to IV (60), the four fixed-wavelength reception units I (7), the four separation/insertion units I (15), the four variable-wavelength transmission units I (31) constitute a channel process group for the packet transmitted by a channel of the wavelength $\lambda 1$. Similarly, in the four node devices I (57) to IV (60), the four fixed-wavelength reception units II (4), the four separation/insertion units II (14) and the four variable-wavelength transmission units II (22) constitute a channel process group for the packet transmitted by a channel of the wavelength $\lambda 2$, and other fixed-wavelength reception units, separation/insertion units and variable-wavelength transmission units are also constructed in a similar manner.

In the variable-wavelength transmission units I to VIII of each node device and in the fixed-wavelength reception units I (7) to VIII (14) in a downstream adjacent node device, with a variation in the transmission wavelength from the variable-wavelength transmission units, the fixed-wavelength reception unit which receives the transmission is also varied. Consequently the variable-wavelength transmission units I (31) to VIII (38) serve, by a variation of the transmitting wavelength, to vary the channel process means, containing the fixed-wavelength reception unit which processes the packet, in the downstream adjacent node device, thereby shifting the packet to a desired channel process group. This means that a packet stored in a buffer can be shifted to channel process means different from the above-mentioned buffer, by varying the transmission wavelength of the variable-wavelength transmission unit for transmitting the output of the above-mentioned buffer. For example, the buffer I (23) belongs, as explained in the foregoing, to the channel process means for the packet transmitted by the channel of the wavelength $\lambda 1$, the packet released from the buffer I (23) and transmitted by the variable-wavelength transmission unit I (31) as an optical signal of $\lambda 2$ is received, in the downstream adjacent node device, by the fixed-wavelength reception II (8) belonging to the channel process means for the packet transmitted by the channel of $\lambda 2$, so that the packet from the buffer I (23) is shifted to the channel process group of $\lambda 2$.

Figure 8:
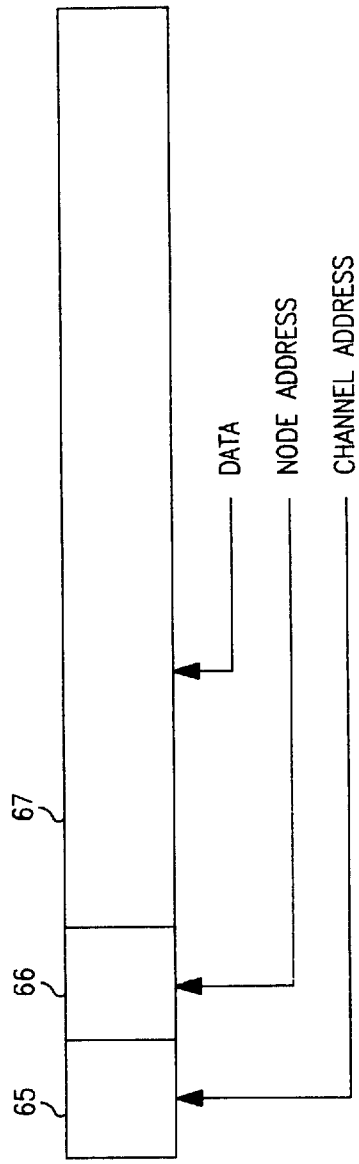
FIG. 8 is a view showing the configuration of a packet in the first embodiment of the present invention.

FIG. 8 shows an example of the configuration of the packet employed in this first embodiment, wherein provided are a field 65 for the channel identifying information of the packet, more specifically indicating a channel address indicating a channel process group containing a separation/insertion unit to which the destination terminal equipment for the packet is connected through the sub transmission path; a field 66 for the node device identifying information of the packet, more specifically indicating a node address indicating a node device to which the destination terminal equipment is connected; and a data portion 67 conveyed by the packet.

Figure 9:
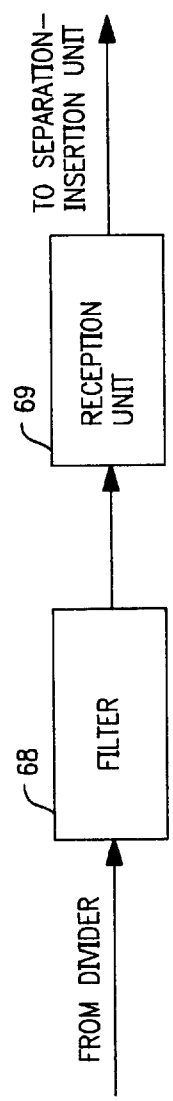
FIG. 9 is a view showing the configuration of a fixed-wavelength reception unit in the first embodiment of the present invention.

FIG. 9 shows the internal structure of any of the fixed-wavelength reception units I (7) to VIII (14) employed in the node device of the first embodiment of the present invention, wherein a filter 68 is adapted to transmit only the optical signal of a specific wavelength assigned to each fixed-wavelength reception unit and to intercept the optical signals of other wavelengths- The fixed-wavelength reception units I, II, III, IV, V, VI, VII and VIII respectively have filter transmission wavelengths of $\lambda 1, \lambda 2, \lambda 3, \lambda 4, \lambda 5, \lambda 6, \lambda 7$ and $\lambda 8$ which are numbered in the increasing order of wavelength, so that $\lambda 1 < \lambda 2 < \lambda 3 < \lambda 4 < \lambda 5 < \lambda 6 < \lambda 7 < \lambda 8$. A reception unit 69 utilizing a photodiode converts the optical signal of a predetermined wavelength, transmitted by the filter, into an electrical signal for supply to the separation/insertion unit. The reception unit is provided with a PIN photodiode and is capable of waveform shaping by an amplifier, an equalizer and an identification circuit connected after the PIN photodiode.

Figure 10:
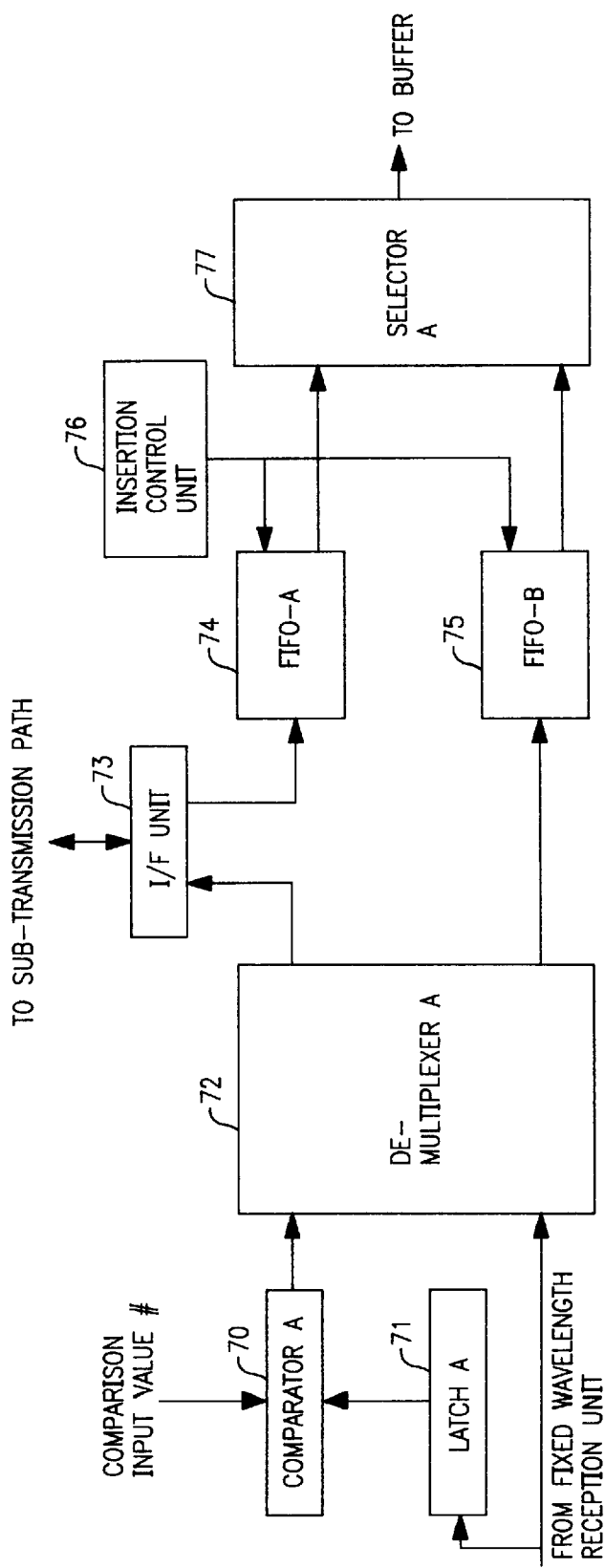
FIG. 10 is a view showing the configuration of a separation/insertion unit in the first embodiment of the present invention.

FIG. 10 shows the internal structure of any of the separation/insertion units I (15) to VIII (22), having the same internal structure, employed in the node device of the first embodiment. In FIG. 10, a comparator A (70) compares the node address of the packet released from a latch A (71) with a comparison input value #, and, in case of coincidence, releases a separation instruction signal to a demultiplexer A (72), but, in case of non-coincidence, releases a relay instruction signal. The comparison input value # corresponds to the node address of each node device, as shown in Tab. 1. A latch A (71) latches the node address of the packet and sends it to the comparator A (70). A demultiplexer A (72) sends the input packet to an I/F 73 or a FIFO-B, according to the instruction for separation or relaying of the comparator A (70). An I/F 73 transmits the packet from the demultiplexer A to the sub transmission path, and also transmits the packet from the sub transmission path to a FIFO-A. FIFO (first-in-first-out) -A (74) and -B (75) temporarily store the input packets and release them in the order of input to a selector A, under the control of an insertion control unit 76. An insertion control unit 76 controls the readout of the FIF0-A and FIFO-B, and informs the selector of the FIFO to be selected, thereby inserting the packet from the sub transmission path into the packet flow released from the fixed-wavelength reception unit. A selector A (77) selects a FIFO, storing the packet signal to be released, thereby sending the packet signal to the buffer.

TABLE 1

| Node device | Node address |
|---|---|
| I | 1 |
| II | 2 |
| III | 3 |
| IV | 4 |

Figure 11:
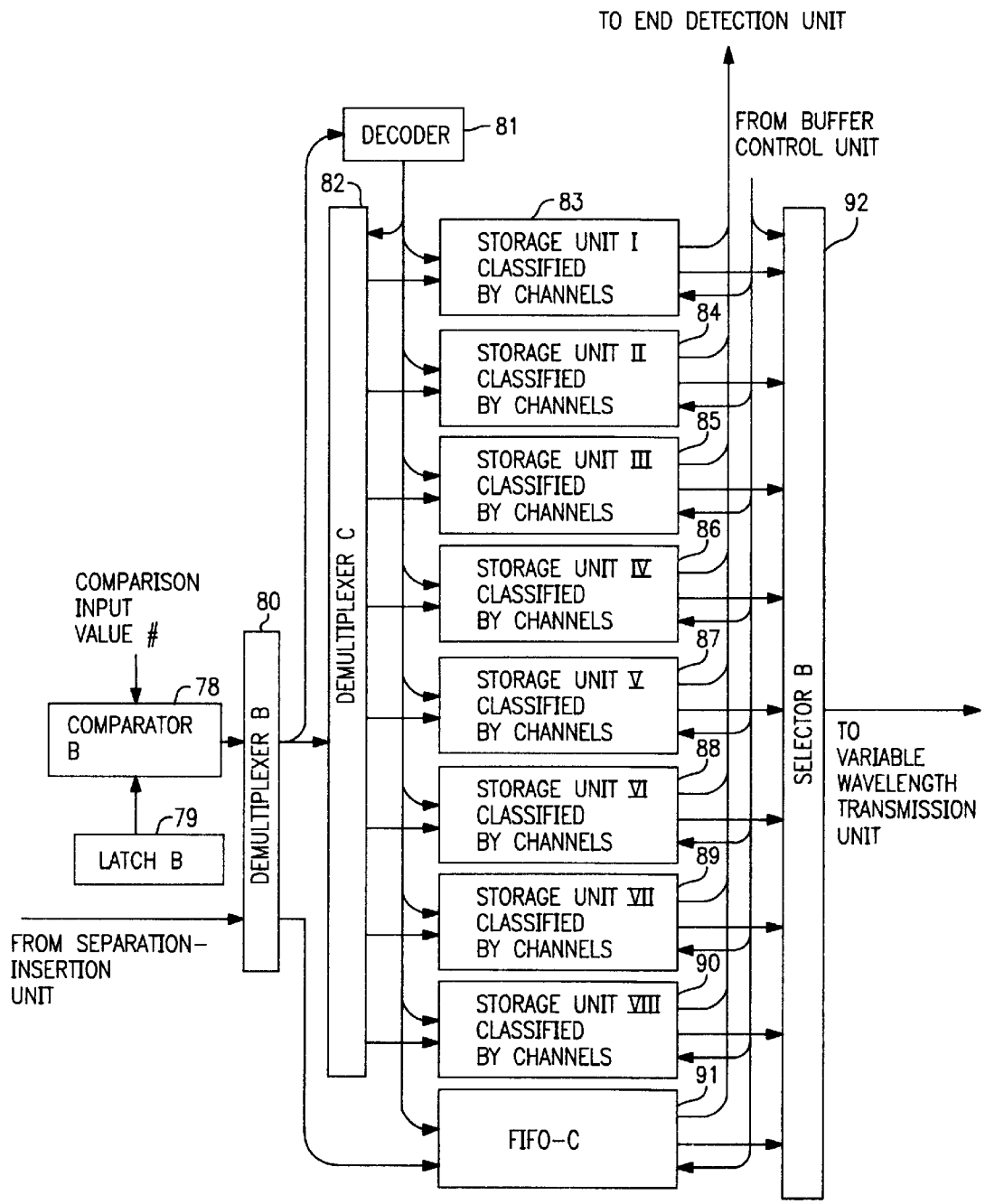
FIG. 11 is a view showing the configuration of a buffer unit in the first embodiment of the present invention.
Figure 21:
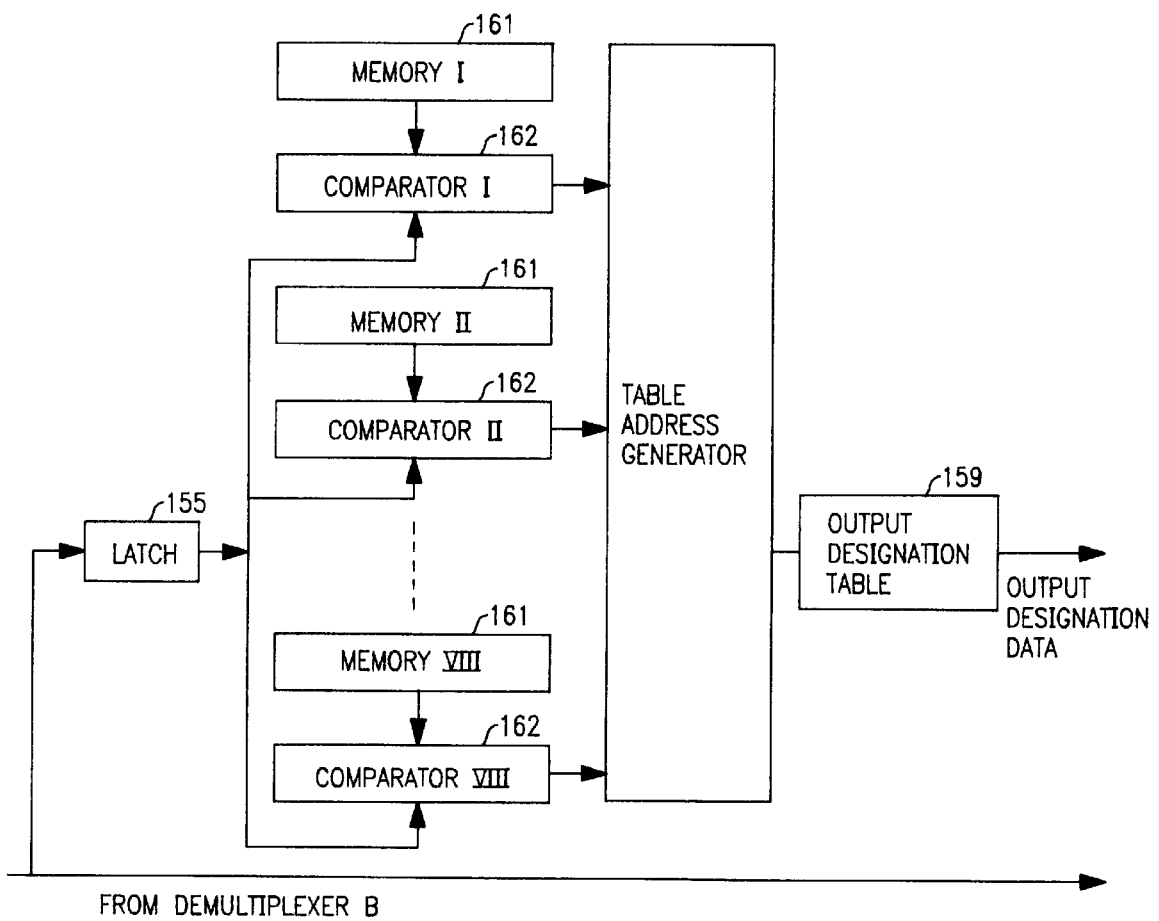
FIG. 21 is a view showing the configuration of a decoder in the buffer unit of the first embodiment of the present invention.

FIG. 11 shows the internal structure of any of the buffers I to VIII, having the same internal structure, employed in the first embodiment. In FIG. 11, a comparator B (78) compares the node address of the packet released from the latch B (79) with a comparison input value #, indicating the node address of a downstream adjacent node device, and, in case of coincidence, sends an instruction for channel-designated process to a demultiplexer B (80), but, in case of non-coincidence, sends an instruction for channel-non-designated process. A latch B (79) latches the node address of the packet and sends it to the comparator B (78). A demultiplexer B (80) transmits the input packet to a demultiplexer C or a FIFO-C, in response to the instruction of the comparator B (78) for channel-designated process or channel-non-designated process. A decoder 81 decodes the channel address of the packet, instructs the demultiplexer C of the respective channel memory unit for the packet output and instructs the predetermined respective channel memory unit to store the packet- The decoder 81 only decodes the channel address, which is the channel identifying information of the packet. The internal structure of the decoder is shown in FIG. 21. In the present first embodiment, as the decoder 81 only decodes the channel address, there are required, in the decoder 61, only 8 sets of a memory 161 and a comparator 162 corresponding to the number of the channels in the multi-channel transmission path, and the memories I to VIII respectively store values of Table 2, indicating the correspondence between the wavelengths used in the variable-wavelength transmission units and the channel addresses. As explained before, the wavelength used by the variable-wavelength transmission unit corresponds to the channel process group adapted to process the packet in the downstream adjacent node device.

In this configuration, as in the conventional configuration, an output designation data is read, from an output designation table 159, corresponding to the channel address of the input packet. Based on this output designation data, there are executed an instruction to the demultiplexer C (82) of the respective channel memory unit for the output of the packet and an instruction to a predetermined respective channel memory unit to store the packet.

TABLE 2

| Wavelength used by channel process group | Channel address |
|---|---|
| λ1 | 1 |
| λ2 | 2 |
| λ3 | 3 |
| λ4 | 4 |
| λ5 | 5 |
| λ6 | 6 |
| λ7 | 7 |
| λ8 | 8 |

A demultiplexer C (82) sends the packet to a predetermined respective channel memory unit according to the instruction of the decoder 81. Respective channel memory units I to VIII (83–90) store channel-designated packets for respective designated channels. The channels I to VIII are respectively assigned to the respective channel memory units I to VIII. The structure of such memory units will be explained later.

A FIFO-C (91) temporarily stores the channel-non-designated packets from the demultiplexer C and sends them in the order of input to a selector B (92) under the control of the buffer control unit 3. A selector B (92) selects one of the outputs of the respective channel memory units I to VIII and of the FIFO-C for supply to the variable-wavelength transmission unit, according to the instruction from the buffer control unit 3.

Figure 12:
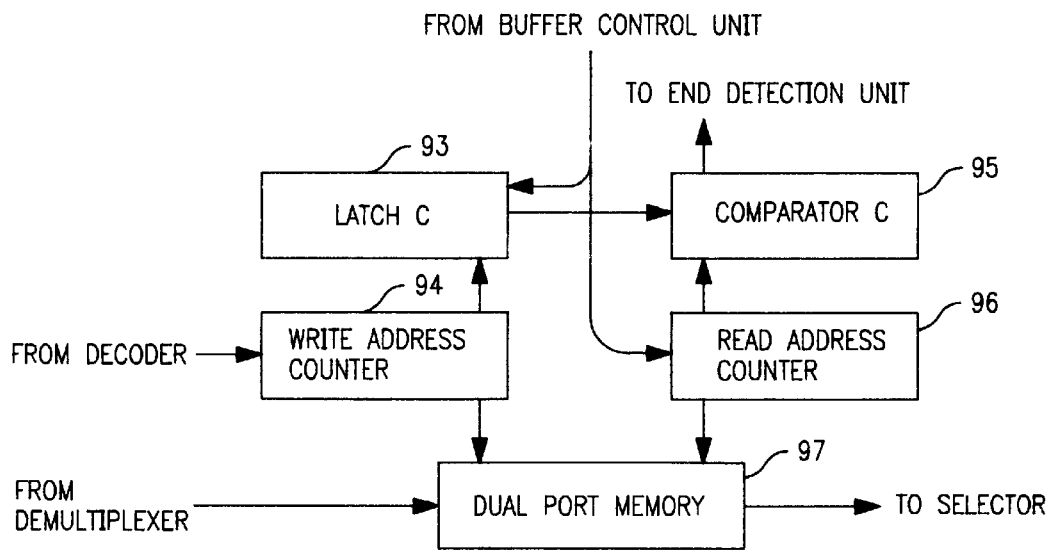
FIG. 12 is a view showing the configuration of a memory unit for each channel in the first embodiment of the present invention.

FIG. 12 shows the internal structure of any of the respective channel memory units I to VIII (83–90), having a same internal structure, employed in the buffers I to VIII (15–22) in the first embodiment. In FIG. 12, a latch C (93) latches the output address of a write-in address counter and sends it to a comparator C, under the control of the buffer control unit 3. A write-in address counter 94 supplies a dual-port memory 97 of address signals where the packets are to be stored in succession, under the instruction of the decoder 81. A comparator C (95) compares the address of the write-in address counter latched by the latch C with the address read from a read-out address counter, and, in case of coincidence, sends a coincidence signal to tile end detection unit. A read-out address counter 96 sends an address signal, indicating the-address where the packet is to be read, to a dual-port memory 97, under the control of the buffer control unit 3. A dual-port memory 97 effects the write-in and the read-out of the packet in the independent manner.

Figure 13:
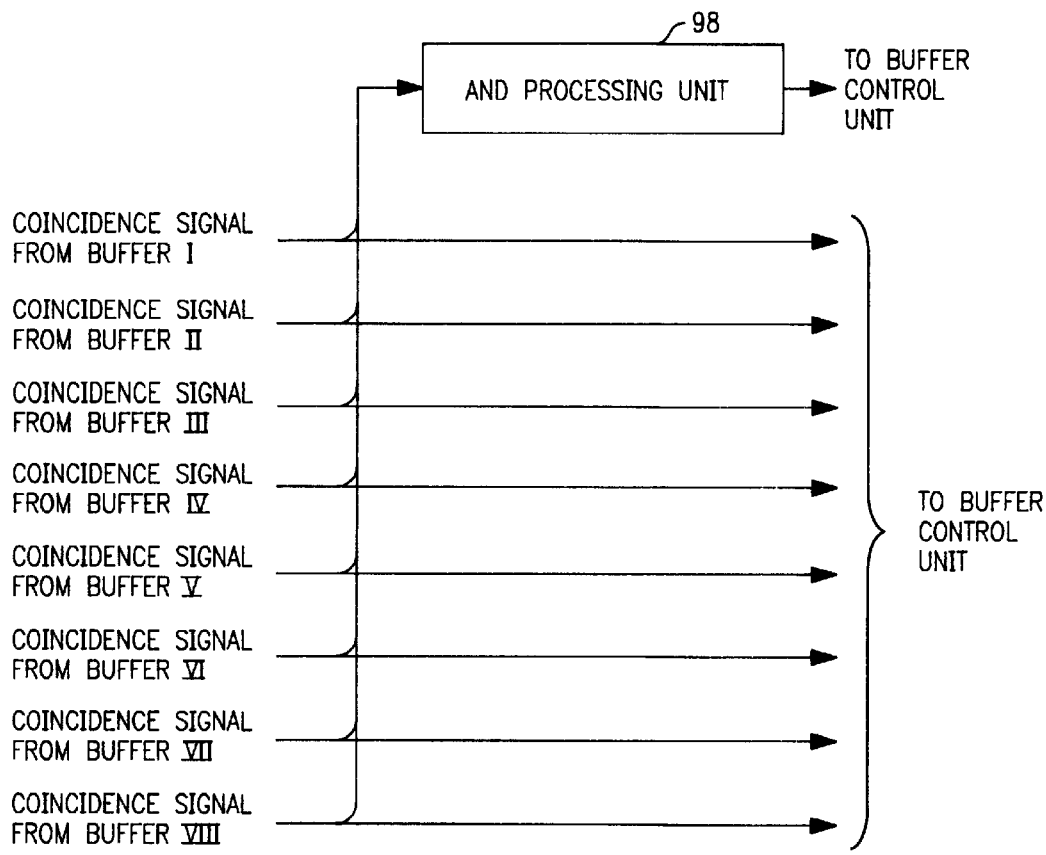
FIG. 13 is a view showing the configuration of an end detection unit in the first embodiment of the present invention.

FIG. 13 shows the internal structure of the end detection unit employed in this first embodiment. In FIG. 13, a logic product process unit 98 detects the release of the coincidence signals from all the buffers by calculating the logic product of the coincidence signals from the respective channel memory units of the buffers I to VIII and sends an end signal to the buffer control unit 3. The end detection unit 3 also transfers the coincidence signals, released from the respective channel memory units of the buffers I to VIII to the read-out control unit of the buffer control unit 3.

Figure 14:
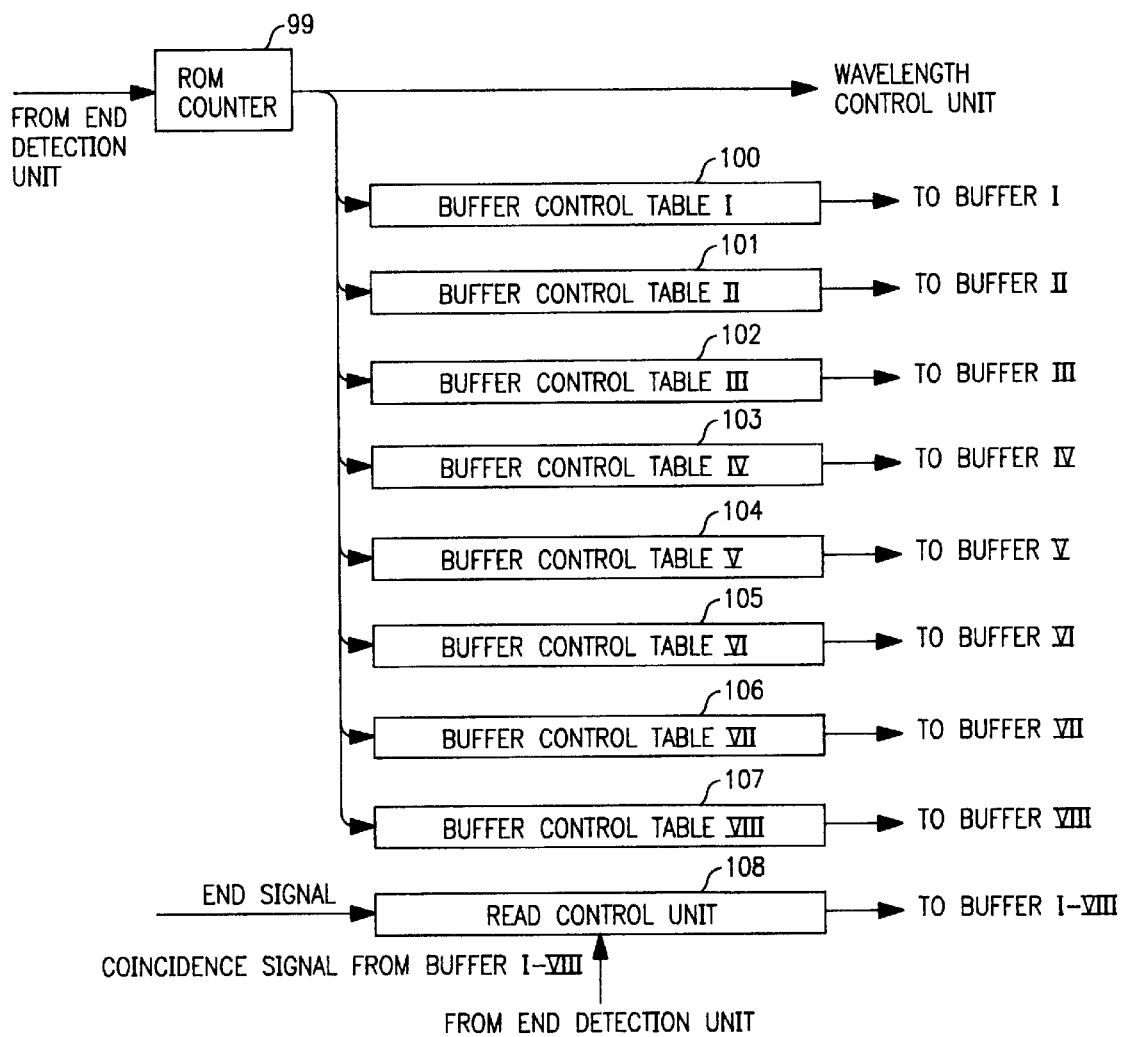
FIG. 14 is a view showing the configuration of a buffer control unit in the first embodiment of the present invention.

FIG. 14 shows the internal structure of the end detection unit employed in the first embodiment. In FIG. 14, a 3-bit ROM counter 99 counts the end signals released from the end detection unit, thereby releasing addresses for reading the buffer control tables I to VIII and wavelength control tables I to VIII to be explained later. The buffer control tables I to VIII (100–107) are read in succession by the addresses released from the ROM counter 99, thereby supplying the selector B and the read-out address counter 96 of the predetermined respective channel memory unit with control signals for reading the respective channel memory units of the buffers. These tables are composed of a ROM. The content of the buffer control tables I to VIII will be explained later. A read-out control unit 100 supplies the buffers I to VIII with readout control signals, for controlling the readout from the dual-port memory 97 and the FIFO-C (91), based on the coincidence signals released from the respective channel memory units of the buffers I to VIII. Under the control of the read-out control unit, in each buffer, the channel-designated packets are read from the dual-port memory in the predetermined respective channel memory unit until the release of the coincidence signal, and then the channel-non-designated packets from the FIFO-C until the end signal is released from the end detection unit.

Figure 15:
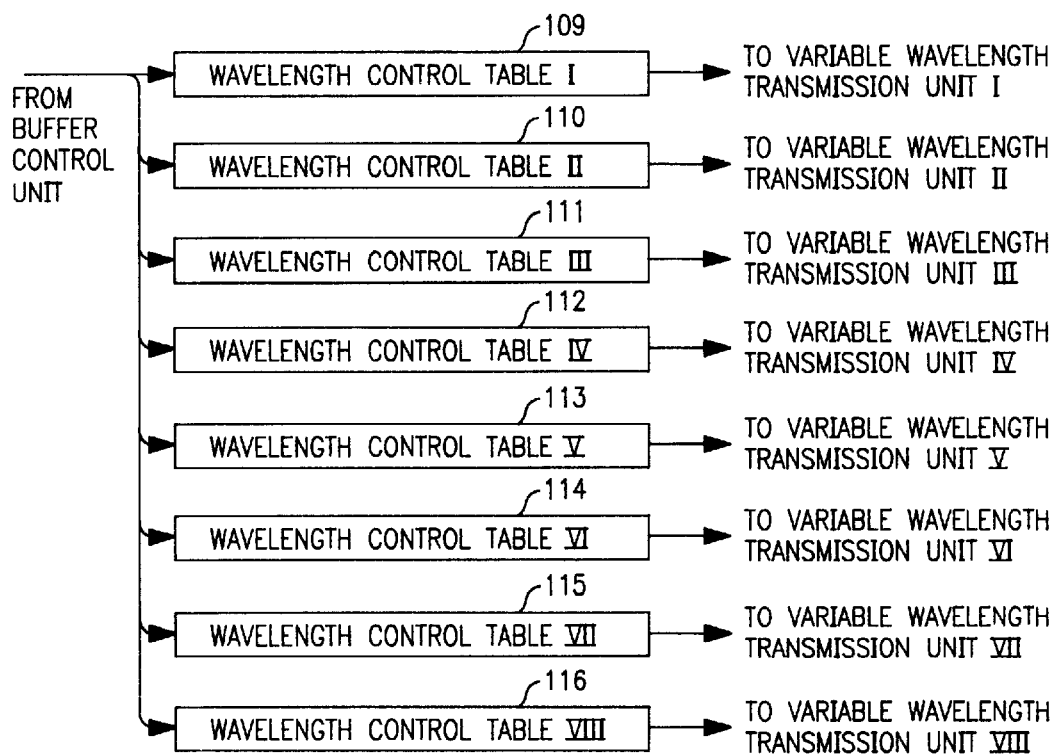
FIG. 15 is a view showing the configuration of a wavelength control unit in the first embodiment of the present invention.

FIG. 15 shows the internal structure of the wavelength control unit 4 employed in the first embodiment. In FIG. 15, wavelength control tables I to VIII (109–116) are read in succession by addresses from the ROM counter of the buffer control unit 3, and send predetermined wavelength control signals to the drive units of the wavelength-variable transmission units. These tables are composed of ROM, of which contents will be explained later.

Figure 16:
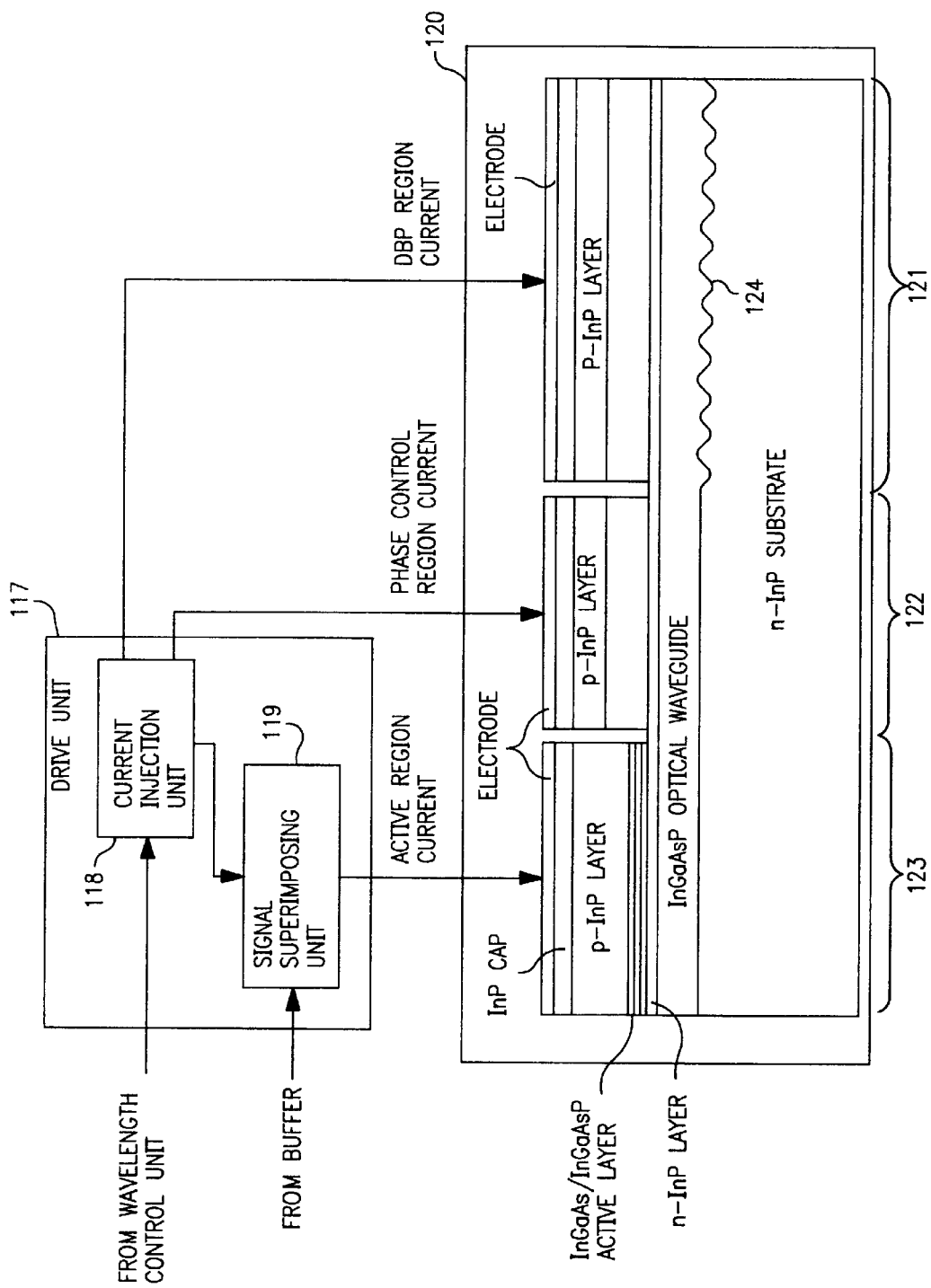
FIG. 16 is a view showing the configuration of a variable-wavelength transmission unit in the first embodiment of the present invention.

FIG. 16 shows the internal structure of the variable-wavelength transmission units I to VIII employed in the first embodiment. These units have a same internal structure. In FIG. 16, a drive unit 116 is composed of a signal overlaying unit 119 and a current injection unit 118. The current injection unit 118 controls the transmission wavelength from $\lambda 1$ to $\lambda 8$ by controlling the biases for the currents injected into a light emission area, a phase control area and a DBR area of the DBR-type tunable laser diode, according to the wavelength control signal from the wavelength control unit 4. The signal overlaying unit 119 overlays the electrical signals from the buffers on the bias currents from the current infection unit, thereby causing the tunable laser diode to emit an intensity-modulated optical signal of a predetermined wavelength. The DBR tunable laser diode 120 is provided with a DBR area 121 for varying the refractive index according to the amount of injected carriers, thereby varying the transmission wavelength, a phase control area 122 for matching the phase of the transmission wavelength in the DBR area and that in a light emission area, a light emission area 123 which is an active area for laser oscillation, and a diffraction grating 124 for providing a single transmission wavelength.

In this first embodiment, the wavelength control tables I to VIII have the contents shown in Table 3, which shows the transmission wavelength of the variable-wavelength transmission unit under the control of the wavelength control unit 4 Also the respective channel memory units of the buffers, read by the control signals from the buffer control tables I to VIII are set as shown in Table 4. These 16 tables are read in synchronization with every count of the end signal by the ROM counter 99. Consequently, the transmission wavelength of each tunable laser diode cyclically shifts in the order of $\lambda 1, \lambda 3, \lambda 5, \lambda 7, \lambda 8, \lambda 6, \lambda 4, \lambda 2$ and $\lambda 1$. Such cyclic jumping shift of the transmission wavelength allows to reduce the maximum shift of the wavelength at the shift thereof. For example, if the wavelength is shifted in the order of $\lambda 1, \lambda 2, \lambda 3, \lambda 4, \lambda 5, \lambda 6, \lambda 7, \lambda 8$, and $\lambda 1$, a large shift of the wavelength is involved in the shift from $\lambda 8$ to $\lambda 1$, but the above-mentioned setting allows to avoid such large shift in the wavelength. In case the number of the multiplexed wavelengths is not 8 (in case of N-wavelengths multiplexing), the effect of the present embodiment can be realized by a cyclic shift pattern of selecting the odd-numbered wavelengths in succession in the increasing order from the first wavelength to the largest odd-numbered wavelength, then selecting the even-numbered wavelengths in the decreasing order from the largest even-numbered wavelength to the second one and returning the first wavelength, or at first selecting the even-numbered wavelengths in the increasing order from the second wavelength to the largest one, then selecting the odd-numbered wavelengths in the decreasing order from the largest one to the smaller one and returning to the second wavelength. Also as shown in Table 3, the cyclic shifts of the transmission wavelength of the tunable laser diodes are mutually displaced in phase in order that the plural tunable laser diodes do not effect the transmission in a same wavelength. In this manner the pattern of the transmission wavelength control is determined by the wavelength control tables I–VIII.

TABLE 3

| Table | Address | | | | | | | |
|---|---|---|---|---|---|---|---|---|
| | 0 | 1 | 2 | 3 | 4 | 5 | 6 | 7 |
| Wavelength control table I | λ1 | λ3 | λ5 | λ7 | λ8 | λ6 | λ4 | λ2 |
| Wavelength control table II | λ2 | λ1 | λ3 | λ5 | λ7 | λ8 | λ6 | λ4 |
| Wavelength control table III | λ4 | λ2 | λ1 | λ3 | λ5 | λ7 | λ8 | λ6 |
| Wavelength control table IV | λ6 | λ4 | λ2 | λ1 | λ3 | λ5 | λ7 | λ8 |
| Wavelength control table V | λ8 | λ6 | λ4 | λ2 | λ1 | λ3 | λ5 | λ7 |
| Wavelength control table VI | λ7 | λ8 | λ6 | λ4 | λ2 | λ1 | λ3 | λ5 |
| Wavelength control table VII | λ5 | λ7 | λ8 | λ6 | λ4 | λ2 | λ1 | λ3 |
| Wavelength control table VIII | λ3 | λ5 | λ7 | λ8 | λ6 | λ4 | λ2 | λ1 |

TABLE 4

| Table | Address | | | | | | | |
|---|---|---|---|---|---|---|---|---|
| | 0 | 1 | 2 | 3 | 4 | 5 | 6 | 7 |
| Buffer control table I | A1 | A3 | A5 | A7 | A8 | A6 | A4 | A2 |
| Buffer control table II | A2 | A1 | A3 | A5 | A7 | A8 | A6 | A4 |
| Buffer control table III | A4 | A2 | A1 | A3 | A5 | A7 | A8 | A6 |
| Buffer control table IV | A6 | A4 | A2 | A1 | A3 | A5 | A7 | A8 |
| Buffer control table V | A8 | A6 | A4 | A2 | A1 | A3 | A5 | A7 |
| Buffer control table VI | A7 | A8 | A6 | A4 | A2 | A1 | A3 | A5 |
| Buffer control table VII | A5 | A7 | A8 | A6 | A4 | A2 | A1 | A3 |
| Buffer control table VIII | A3 | A5 | A7 | A8 | A6 | A4 | A2 | A1 |

Referring to Tables 3 and 4, in case the variable-wavelength transmission unit has a transmission wavelength $\lambda 1$, there is read the respective channel memory unit I, storing the channel-designated packets which are to be transmitted with the wavelength $\lambda 1$. Similarly, for a transmission wavelength $\lambda 2, \lambda 3, \lambda 4, \lambda 5, \lambda 6, \lambda 7$ or $\lambda 8$, there is respectively read the respective channel memory unit II, III, IV, V, VI, VII or VIII. Thus, by setting the wavelength control table as shown in Table 3 and the buffer control table as shown in Table 4, the channel-designated packets stored in each buffer are transmitted as optical signals of a designated wavelength to the downstream adjacent node device, then received therein by the reception means of the channel of the transmitting wavelength and are shifted to a desired channel process group.

Figure 17:
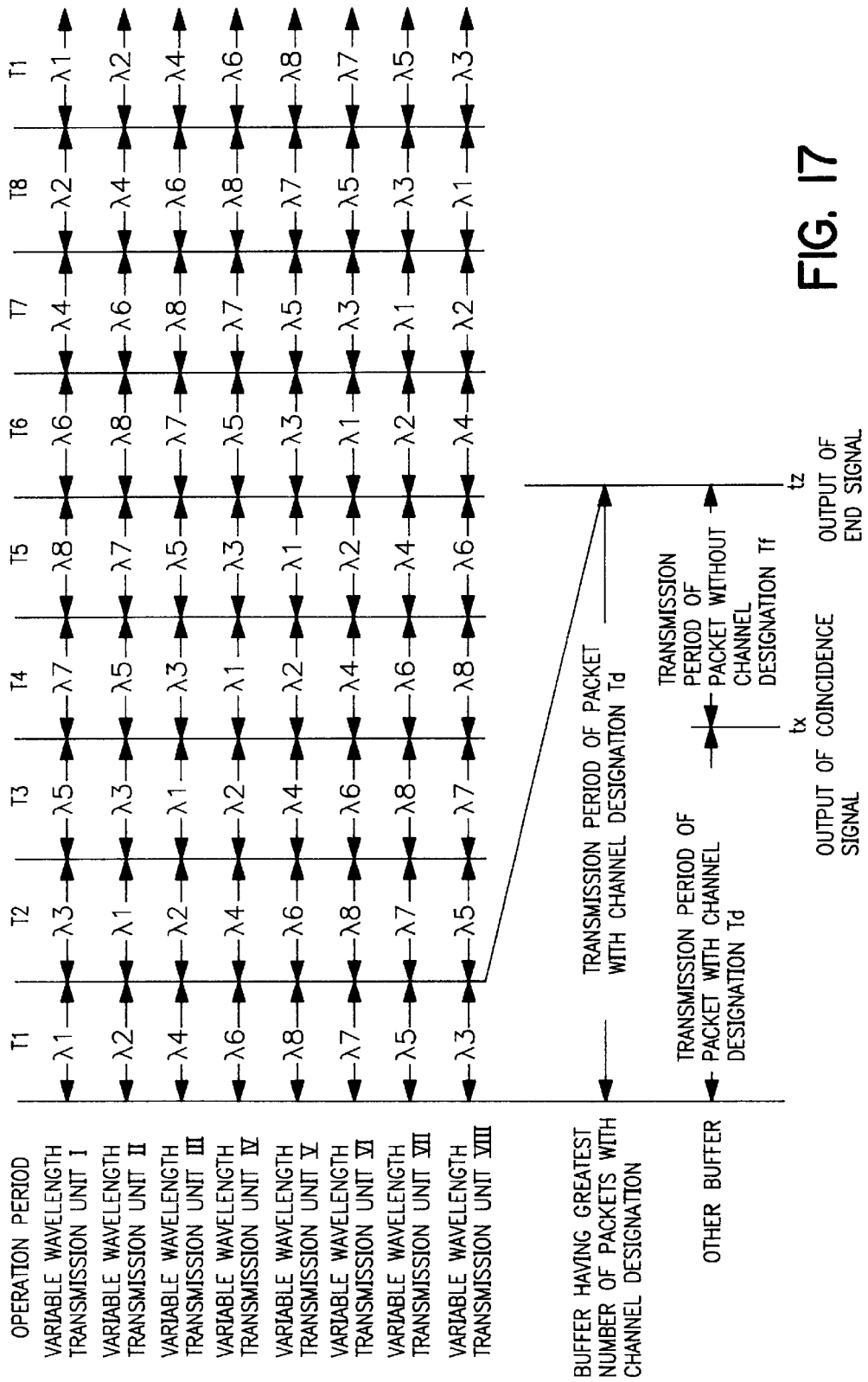
FIG. 17 is a timing chart of the first embodiment of the present invention.

The function of the node device in this embodiment consists, as shown in FIG. 17, of 8 consecutive operation periods T1 to T8, of which lengths vary according to the amount of the channel-designated packets stored in the buffers. Also each of these operation periods is divided into a channel-designated packet transmission period Td, for reading and transmitting the channel-designated packets stored in the dual-port memory of the respective channel memory unit under the read-out control operation by the buffer control unit 3, and a channel-designation-free packet transmission period Tf for reading and transmitting the channel-designation-free packets stored in the FIFO-C.

Upon release of the coincidence signal, each buffer terminates the channel-designated packet transmission period Td and shifts to the channel-designation-free packet transmission period Tf. However a buffer, storing the largest number of the channel-designated packets end releasing the coincidence signal latest, does not shift to the channel-designation-free packet transmission period Tf but to the next channel-designated packet transmission period. The periods Td and Tf are different for each buffer, but the start of the period Td and the end of the period Tf, or the start and end of each of the operation periods T1–T8 are common to all the buffers.

Figure 18:
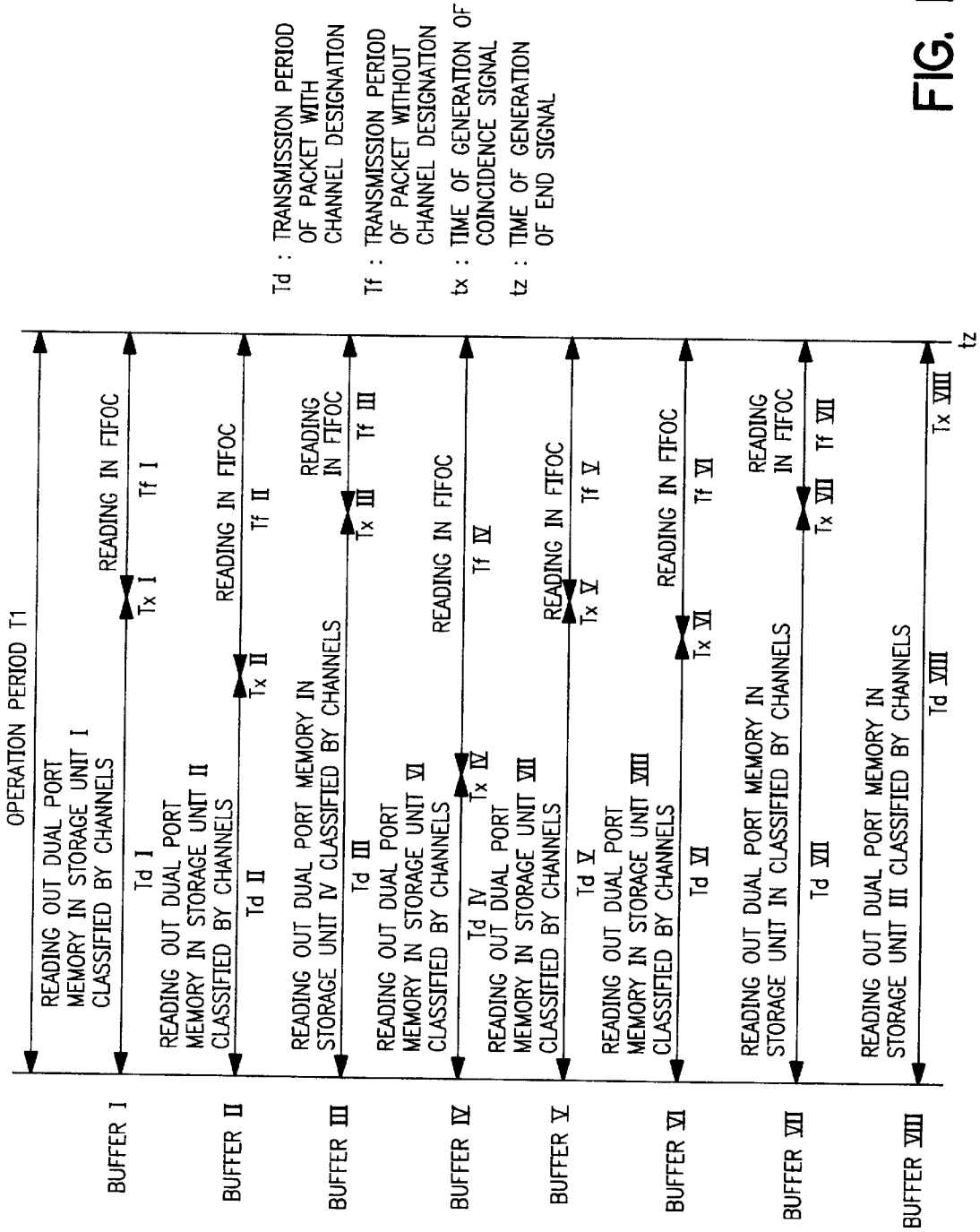
FIG. 18 is a timing chart of an operation period T1 of the first embodiment of the present invention.

FIG. 18 shows an example of operation of the buffers I–VIII in the operation period T1, in which the buffer VIII is assumed to store the largest number of the channel-designated packets and releases the coincidence signal last. The respective channel memory unit read in each buffer corresponds to the transmission wavelength of the variable-wavelength transmission unit.

In the following there will be explained, with reference to the attached drawings, the function of the first embodiment, by an example of packet transmission from a terminal equipment I (49) connected to the sub transmission path I (41) of the node device I (57) to a terminal equipment V (53) connected to the sub transmission path V (45) of the node device III (59). In the following description, the transmitted packet is called the packet A. Also for the purpose of simplicity, same components in different node devices are represented by a same symbol shown in the drawings.

The transmitting terminal equipment I 49, connected to the sub transmission path I 41 of the node device I 57, constructs the packet A of the structure shown in FIG. 8 by adding the channel address and the node address to the data addressed to the destination terminal equipment V 53, connected to the sub transmission path V 45 of the node device III 59, and sends it to the separation/insertion unit I 15 of the node device I 57. The channel address is set at "5" from Table 2, because the channel process group of the separation/insertion unit V 19, to which the destination terminal equipment V 53 is connected through the sub transmission path, uses a wavelength $\lambda 5$. The node address is set at "3" from Table 1, because the destination of the packet A is the node device III 59.

The I/F of the separation/insertion unit I 15 of the node device I 57 writes the packet A, transmitted through the sub transmission path I 41, into the FIFOA. After the writing, the insertion control unit 76 finds a gap in the packet flow from the FIFO-B, switches the selector-A to the input from the FIFO-A, terminates the read-out of the FIFO-B and starts the read-out of the FIFO-A. After the reading of the packet A stored in the FIFO-A, the insertion control unit 76 again switches the selector-A to the input from the FIFO-B, then terminates the read-out of the FIFO-A and again starts the read-out of the FIFO-B The packet A released from the selector-A is entered into the buffer I, and the node address of the packet A is latched in the latch-B and supplied to the comparator-B. The node address of the packet is set at "3", while the comparison input value # of the comparator-B of the buffers of the node device I is set at "2" which is the node address of the downstream adjacent node device II and does not coincide with the node address "3" of the packet A, so that the comparator-B sends a channel-designation-free process instruction signal to the demultiplexer-B, which in response sends the entered packet A to the FIFO-C.

If the packet A is stored in the FIFO-C in an operation period T8, it is then read under the control of the buffer control unit 3, in the channel-designation-free packet transmission period Tf in the succeeding operation period T1.

In the succeeding operation period T1, a read-out address 0 is supplied from the ROM counter 99 of the buffer control unit 3 simultaneously to the wavelength control tables I–VIII, whereby the contents thereof are read by said address. As shown in Table 3, control signals corresponding to the wavelengths $\lambda 1$, $\lambda 2$, $\lambda 4$, $\lambda 6$, $\lambda 8$, $\lambda 7$, $\lambda 5$ and $\lambda 3$ are respectively read from the wavelength control tables I to VIIII These drive signals are supplied respectively to the drive units 117 of the variable-wavelength transmission units I–VIII (31–38). In the drive units 117, the drive currents of the current injection units are set by these wavelength control signals, in such a manner that the tunable laser diodes thereof have predetermined transmission wavelengths.

Also in the channel-designated packet transmission period Td of the operation period T1, the read-out address 0 from the ROM counter 99 of the buffer control unit 3 is supplied to the buffer control tables of the buffer control unit 3, in order to read the contents of the buffer control tables I to VIII. As shown in Table 4, the control signals read from the buffer control tables I, II, III, IV, V, VI, VII and VIII are respectively for reading the respective channel memory units I, II, IV, VI, VIII, VII, V and III.

These control signals are supplied to the selector-B, FIFO-C, latch-C of the predetermined respective channel memory unit and read-out address counter 96 in each buffer. In response, the buffer I 23 effects enabling of the read-out of the respective channel memory unit I, disabling of the FIFO-C and setting of the respective channel memory unit I as the input source of the signal released from the selector-B.

In the respective channel memory unit $_1$, the value of the write-in address counter is latched in the latch-C, whereby memorized is the last address, in the dual-port memory, of the channel-designated packets to be transmitted with the wavelength $\lambda 1$, and the packets stored to this address are transmitted in the channel-designated packet transmission period Td. When the read-out is enabled, the read-out address counter 96 generates addresses for reading the packets from the dual-port memory, by successive increments, and sends the addresses to the dual-port memory 97, whereby the packets are read in succession from the output port thereof and supplied to the variable-wavelength transmission unit I 31. The packets read in this operation, having the transmission wavelength $\lambda 1$, are addressed to the terminal equipment I, connected to the sub transmission path I of the adjacent node device II 58.

Also in the channel-designated packet transmission period Td of the operation period T1, in the buffer II 24, the channel-designated packets are read from the dual-port memory 97 of the respective channel memory unit II, as in the buffer I 23, by the control signal from the buffer control table II 101 as shown in FIG. 18, and are supplied to the variable-wavelength transmission unit II 32. Similarly the channel-designated packets are read from the dual-port memories of the respective channel memory unit IV of the buffer III 25, the respective channel memory unit VI of the buffer III 25, the respective channel memory unit VI of the buffer IV 26, the respective channel memory unit VIII of the buffer V 27, the respective channel memory unit VII of the buffer VI 28, the respective channel memory unit V of the buffer VII 29 and the respective channel memory unit III of the buffer VIII 30 and are respectively supplied to the variable-wavelength transmission units III 33 to VIII 38. The packets read in this operation are respectively addressed to the sub transmission paths III to VIII of the adjacent node device II 58.

In this channel-designated packet transmission period Td of the operation period T1, in each respective channel memory unit from which the channel-designated packets are read under the control of the buffer control unit 3, the value of the read-out address counter 96 is increased in succession and is supplied to the comparator-C 95. The other input port of the comparator receives the value of the write-in address counter 94, latched at the start of the channel-designated packet transmission period Td of the operation period T1. Thus the comparator-C 95 releases the coincidence signal when the read-out of the channel-designated packets from the dual-port memory 97 is completed before the start of the channel-designated packet transmission period Td in the operation period T1, through such successive increments of the address from the read-out address counter 96.

In response to the coincidence signal, each buffer shifts to the channel-designation-free packet transmission period Tf, which continues until the release of the end signal from the end detection unit. However, as shown in FIG. 18, the buffer storing the largest number of the channel-designated packets and thus releasing the coincidence signal latest does not shift to the channel-designation-free packet transmission period Tf but to the channel-designated packet transmission period Td of a next operation period, since the coincidence signal indicates that all the data to be read in the current channel have been read from all the respective channel memory units.

In the channel-designation-free packet transmission period of the operation period T1, the read-out control unit of the buffer control unit 3 releases a control signal for enabling the read-out of the FIFO-C, disabling the read-out of the respective channel memory unit and setting of the FIFO-C as the input source for the signal released from the selector-B. In response to these control signals, the contents of the FIFO-C are read in the buffers I 23–VIII 30, and are supplied, through the selectors-B, to the variable-wavelength transmission units I 31 to VIII 38. In this operation, in the buffer I 23, the packet A is read from the FIFO-C. Similarly in the buffers II 24–VIII 30, the packets are read from the FIFO-C and are supplied to the variable-wavelength transmission units I–VIII (31–38)

The variable-wavelength transmission units I–VIII (31–38) convert the packets from the buffers I–VIII (23–30) into predetermined wavelengths, based on the wavelength control signals from the wavelength control unit 4, for supply to the multiplexer 39. The wavelengths of the optical signals from the variable-wavelength transmission units I–VIII (31–38) are, as explained in the foregoing, respectively $\lambda 1$, $\lambda 2$, $\lambda 4$, $\lambda 6$, $\lambda 8$, $\lambda 7$, $\lambda 5$ and $\lambda 3$. As the optical signals from the eight variable-wavelength transmission units have mutually different by the control unit 4, they are mutually mixed without interference in the multiplexer 39, and the lights of all the wavelengths enter the optical fiber 40 and are transmitted to the downstream adjacent node device II 58.

The packet A, transmitted from the terminal equipment I 49, connected to the Sub transmission path I 41 of the node device I 57, toward the terminal V 53, connected to the sub transmission path V 45 of the node device III 59, is transferred, as an optical signal of $\lambda 1$ to the node device II 58.

It is then relayed in the node device II 59 in the following manner.

The optical signals of $\lambda 1$–$\lambda 8$, transmitted from the node device I 57 through the optical fiber 61 are divided by the divider of the node device II 58, and enter the fixed-wavelength reception units I–VIII (7–14) In the reception unit I 7, the optical signal of $\lambda 1$ alone is transmitted by the filter I and is received by the photodiode I. The packet A, having been transmitted as an optical signal of $\lambda 1$ from the node device I 57, is received by the fixed-wavelength reception unit I 7 and supplied to the separation/insertion unit I 15.

Then the node address of the packet A is latched in the latch A 71 and is supplied to the comparator-A. As the node address "3" of the packet A is different from the comparison input value # "2" of the comparator-A of the node device II 58, the comparator-A sends a relay instruction signal to the demultiplexer A 72, which in response sends the entered packet A to the FIFO-B 75. The packet A stored therein is read under the control of the insertion control unit, and is supplied to the buffer I 23 through the selector-A 77.

In the buffer I 23, the node address of the packet A is latched in the latch-B 79 and is supplied to the comparator-B 78. As the comparison input value # of the comparators-B in the buffers of the node device II 48 is set at "3" which is the node address of the downstream adjacent node device III and coincides with the node address of the packet A, the comparator-B 78 sends a channel-designated process instruction signal to the demultiplexer B 80, which in response sends the packet A to the decoder and the demultiplexer-C.

In the decoder 81 of the buffer I 23, the channel address of the entered packet A is latched in the latch 155 and supplied to the comparators I–VIII. As the channel address of the packet A is set at "5" as explained before while the memories I–VI respectively store "1" to "8" as shown in Table 2, the comparator V releases the coincidence signal, whereby the table address generator generates a predetermined address and the output designation data are read from the output designation table 159 The data indicates, to the demultiplexer-C, the respective channel memory unit V as the output destination of the packet, and instructs the respective channel memory unit V to store the packet. In the memory unit V, the packet A is stored in the dual-port memory according to the address from the write-in address counter.

If the storage of the packet A in the dual-port memory is conducted in the operation period T1, the read-out of the packet A therefrom is so controlled as to wait until the operation period T3 in which the transmission wavelength of the variable-wavelength transmission unit I 31 in the node device II 58 is set at $\lambda 5$.

In the node device II 58, when the coincidence signals have been released from all the buffers and the end signal is sent from the end detection unit to the buffer control unit, the ROM counter 99 effects an increment and the operation period T1 is terminated. In the succeeding operation period T2, the read-out address "1" is supplied from the ROM counter 99 of the buffer control unit 3 to the wavelength control tables I–VIII, in order to read the contents thereof. In this operation, from the wavelength control tables I–VIII there are respectively read control signals corresponding to the wavelengths $\lambda 3, \lambda 1, \lambda 2, \lambda 4, \lambda 6, \lambda 8, \lambda 7$ and $\lambda 5$, which are respectively supplied to the drive units 117 of the variable-wavelength transmission units I–VIII (31–38). In the operation period T2, in a similar manner as explained in the foregoing, the read-out address "1" from the ROM counter 99 of the buffer control unit 3 is supplied to the buffer control table of the buffer control unit 3, for releasing the control signals for the read-out control of the buffers. Based on these control signals, the channel-designated packets are read from the dual-port memories of the predetermined respective channel memory units of the buffers I–VIII (23–30). After the completion of read-out, the coincidence signal is released, and the channel-designation-free packets are read from the FIFO-C. The read-out operation is conducted, in the buffers I–VIII, respectively from the respective channel memory units III, I, II, IV, VI, VIII, VII and V, as shown in Table 4. The packets read from the buffers in this manner are converted in the variable-wavelength transmission units I–VIII (31–38) into the optical signals as explained in the foregoing, which are sent through the multiplexer 39 to the optical fiber.

After the read-out of the channel-designated packets, each buffer releases the coincidence signal and shifts to the channel-designation-free packet transmission period Tf. When the coincidence signal is supplied to the end detection unit from the buffer which stores the largest number of the channel-designated packets and terminates the read-out of the channel-designated packets at the last, the logic product process unit sends the end signal to the ROM counter of the buffer control unit 3, whereupon the ROM counter executes an increment to terminate the operation period T2 and start the operation period T3.

In the operation period T3, the read-out address "2" is supplied from the ROM counter 99 of the buffer control unit 3 to the wavelength control tables I–VIII and the buffer tables I–VIII. The packet A is stored in the dual-port memory 97 of the respective channel memory unit V 87 of the buffer I 23, and, in the buffer I, the read-out of the respective channel memory unit V is enabled in the following manner, in the channel-designated packet transmission period Td of the operation period T3.

According to the address "2" from the ROM counter 99, the content of the wavelength control tables is read, and the variable-wavelength transmission unit I is set at a wavelength $\lambda 5$. The address "2" is also sent to the buffer control unit 3, for reading the buffer control tables. In the buffer I 23, the read-out is enabled-for the respective channel memory unit V. Under the control of various control signals, the contents of the buffers are read, as explained in the foregoing, and converted in the variable-wavelength transmission units into predetermined optical signals, which are sent through the multiplexer 39 to the optical fiber.

The packet A is read in the channel-designated packet transmission period Td of the operation period T3, then transmitted as an optical signal of $\lambda 5$ from the variable-wavelength transmission unit I 31 to the optical fiber through the multiplexer 39, and enters the node device III 59.

The optical signals of $\lambda 1$–$\lambda 8$ transmitted from the node device II 58 through the optical fiber 62 are divided by the divider of the node device III 59 and enter the fixed-wavelength reception units I–VIII (7–14). In the reception unit V 11, the optical signal of $\lambda 5$ alone is transmitted by the filter V and is received by the photodiode V. The packet A, having been transmitted as an optical signal of $\lambda 5$ from the node device II 58, is received by the fixed-wavelength reception unit V 11. In this manner the reception means is shifted to the reception unit V 11 in the node device III 59, so that the packet is shifted to the desired channel process group V. The packet received by the reception unit V 11 is supplied to the separation/insertion unit V 19.

Then the node address of the packet A is latched in the latch A 71, and supplied to the comparator-A. As the node address "3" of the packet A coincides with the comparison input value "3" of the comparator-A of the node device III 59, the comparator-A 70 sends the separation instruction signal to the demultiplexer-A 72, which in response sends the input packet A to the I/F. Consequently the packet A is supplied from the I/F to the sub transmission path V 45, then received by the destination terminal equipment V 53, and subjected to the removal of the address portion, whereby the data portion alone is taken out and processed in the desired manner.

As explained in the foregoing, the packet A addressed from the terminal equipment I 49,. connected to the sub transmission path I 41 of the transmitting node device I 57, to the terminal equipment V 53, connected to the sub transmission path V 45 of the node device III 59, is transmitted from the variable-wavelength transmission unit I of the node device I with a wavelength ($\lambda 1$ in the foregoing explanation) according to the timing of entry of the packet A into the node device I, and, in the node device II 58 which is upstream adjacent to the node device III 59, is transmitted as an optical signal of $\lambda 5$, which is the transmission wavelength of the channel process group including the separation/insertion unit V connected to the destination terminal equipment in the node device III 59, whereby the reception means in the node device III 59 is shifted to the desired channel process means V. Then the packet is received by the fixed-wavelength reception unit V 11 of the node device III 59, separated by the separation/insertion unit V 19, transmitted through the sub transmission path V 45 and finally received by the terminal equipment V 53.

[Embodiment 2]

Figure 19:
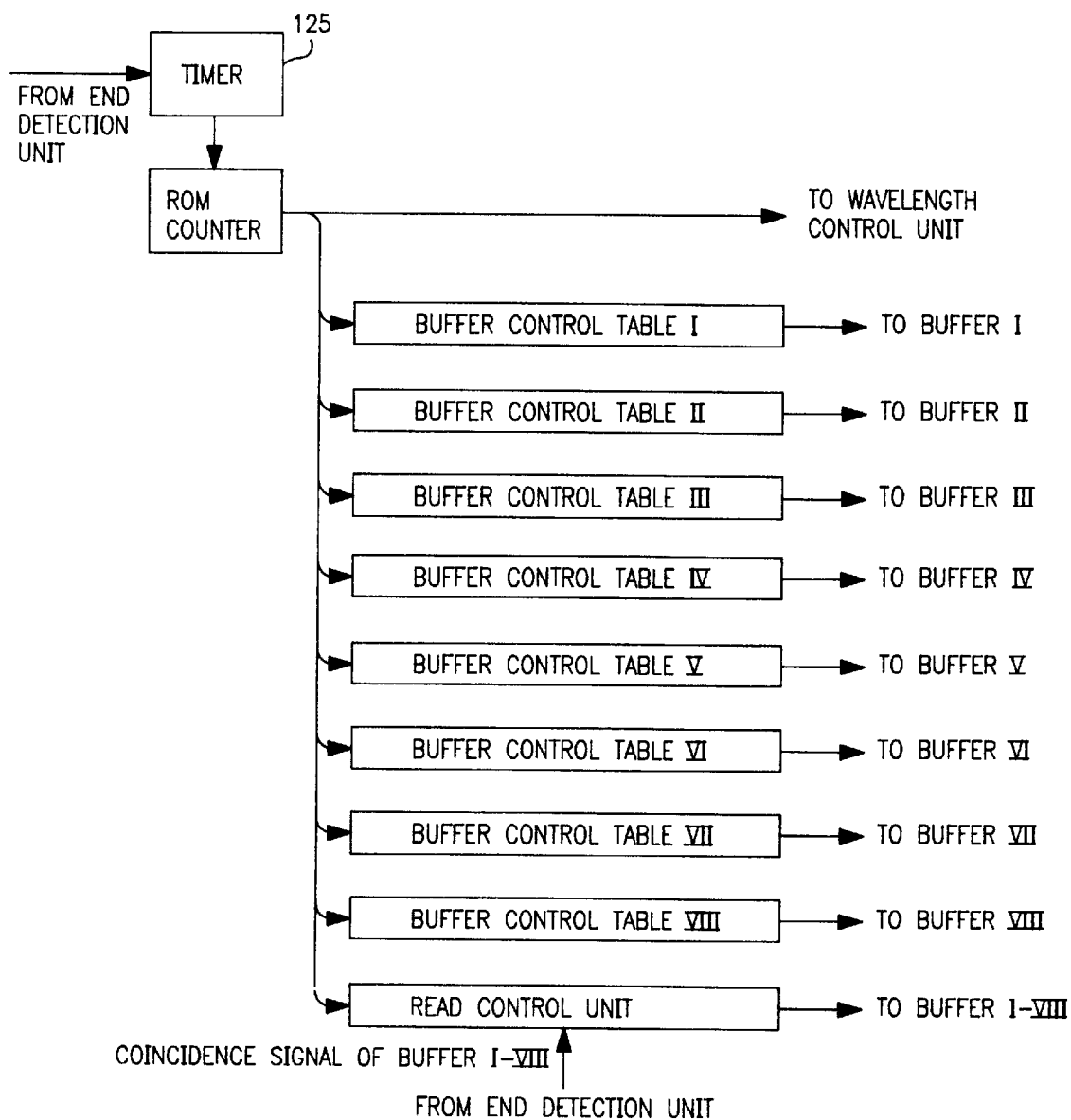
FIG. 19 is a view showing another configuration of the buffer control unit in the first embodiment of the present invention.

FIG. 19 shows a second configuration of the buffer control unit 3 of the node device of the present invention.

In FIG. 19, a timer 125 is activated by the end signal released from the end detection unit, and, after the lapse of a predetermined time Tt, sends a count signal to the ROM counter, which in response effects an increment. By the use of this timer, the channel-designation-free packet transmission period Tf can be realized even in the buffer which stores the largest number of the channel-designated packets and releases the coincidence signal at the last.

Figure 20:
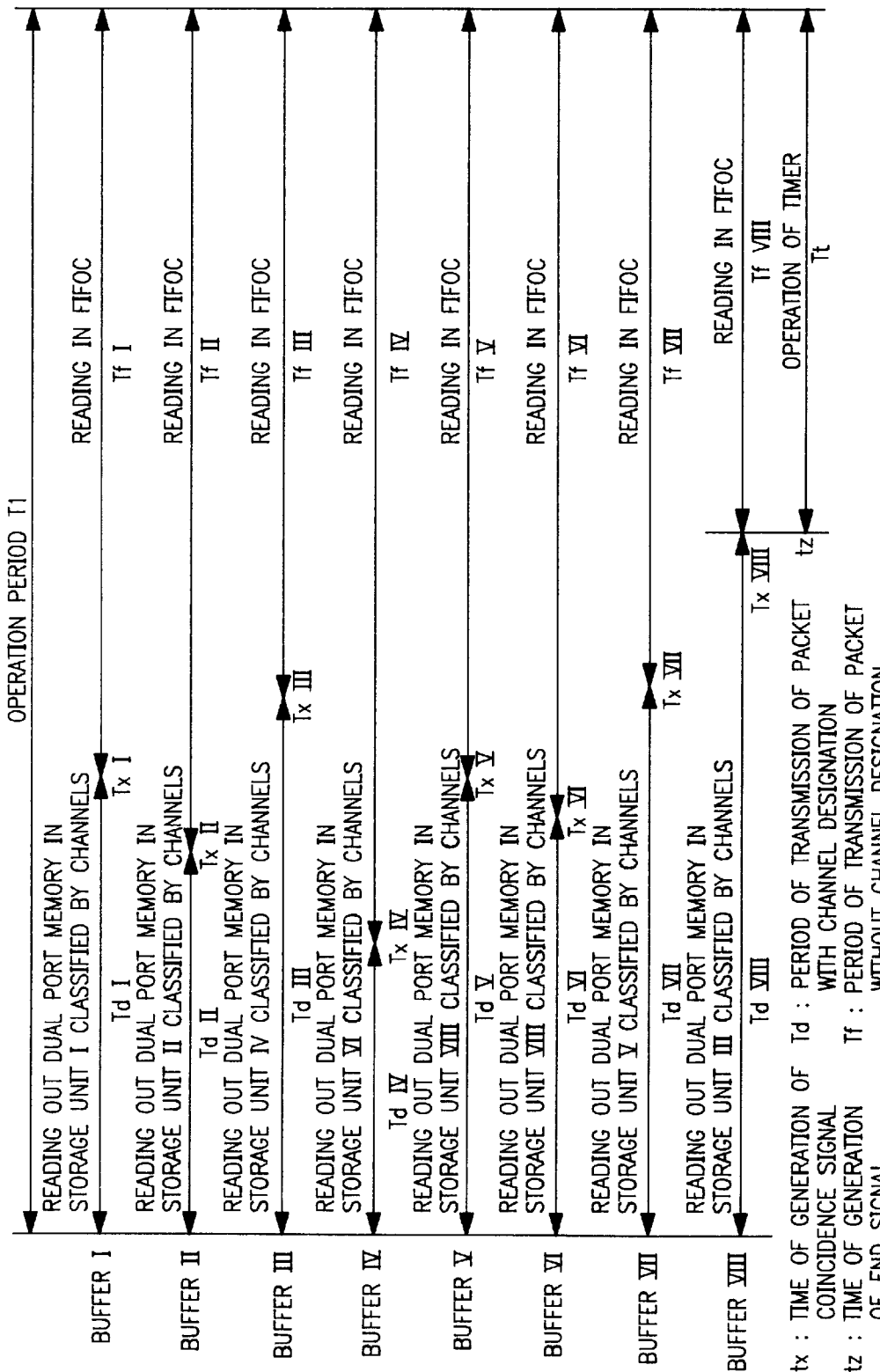
FIG. 20 is a timing chart of an operation period T1 in the other configuration of the buffer control unit in the first embodiment of the present invention.

FIG. 20 shows an example of the function of the buffers I–VIII, in the operation period T1, with the second configuration of the buffer control unit 3. In comparison with FIG. 17, the read-out of the FIFO-C in the channel-designation-free packet transmission period Tf is extended by the working period of the timer in all the buffers.

In a one-directional ring-shaped network system as in the first embodiment, if W node devices are connected therein with uniform packet transmissions among the terminal equipment, the averaged number of relaying operations is about W/2. In the packet transmission from the transmitting terminal to the destination terminal in the network system of the present invention, the wavelength is designated only once in the node device which is upstream adjacent to the node device to which the designation terminal equipment is connected. Consequently, in the relayed transmission of the packets in each node, the number of the packets without wavelength designation becomes larger than that of the packets with wavelength designation. It is therefore effective, for reducing the delay in the packet transmission and for avoiding buffer overflow, to select the average of the channel-designation-free packet transmission time Tf longer than that of the channel-designated packet transmission time Td, by the use of a timer. More preferably the functioning time of the timer is so adjusted that the ratio of the average of the channel-designation-free packet transmission time Tf to that of the channel-designated packet transmission time Td is equal to W/2:1.

[Embodiment 3]

Figure 22B:
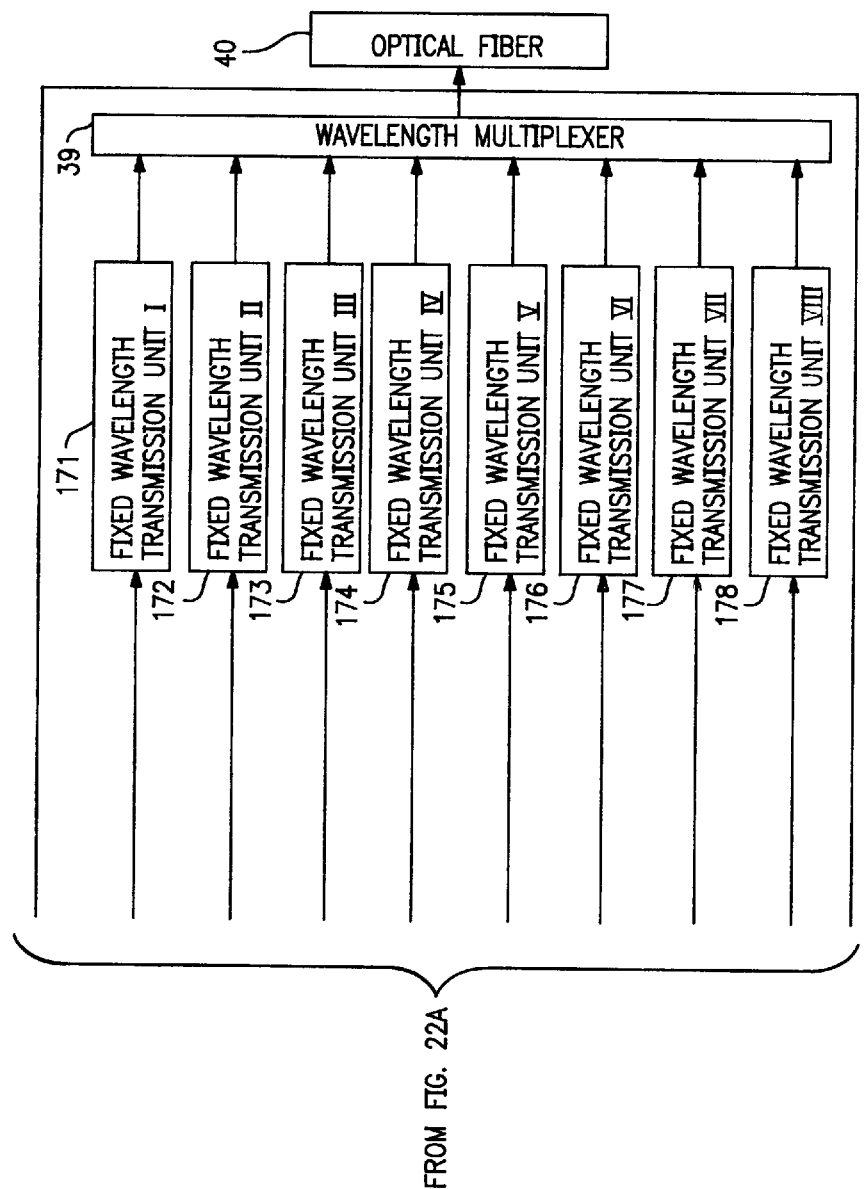
FIG. 22 is comprised of FIGS. 22A and 22B illustrating views showing the configuration of a node device for use in a third embodiment of the present invention.

FIGS. 22A and 22B show the configuration of a part of the node devices in the network system of this embodiment. This node device is formed, in the node device shown in FIGS. 6A and 6B, by eliminating the control unit 1 (including the end detection unit 2, the buffer control unit 3 and the wavelength control unit 4) and the buffers I–VIII (23–30), and by replacing the variable-wavelength transmission units I–VIII (31–38) with fixed-wavelength transmission units I–VIII (171–178) which can transmit the optical signals respectively of wavelengths $\lambda 1$–$\lambda 8$ only.

The network system of this embodiment is constructed similarly to FIG. 7, but the node devices II–IV (58–60) in FIG. 7 are composed of those of the configuration shown in FIGS. 22A and 22B, while the node device I 57 is composed of that of the configuration shown in FIGS. 6A and 6B, as in the embodiment 1.

In this configuration, there is considered a case of sending a packet C from a terminal equipment I 49, connected to the node device II 58, to a terminal V 53 connected to the node device III 59.

As in the embodiment 1, the packet C from the terminal equipment 49 connected to the node device II 58 is supplied to the separation/insertion unit I 15 thereof. The packet C, inserted in the separation/insertion unit I 15 into the packet flow from the fixed-wavelength reception I 7, is transmitted in the channel of $\lambda 1$ from the fixed-wavelength transmission unit I 171 and supplied to the node device III 59. Though the node device III 59 is a node device to be connected to the destinaiton terminal equipment of the packet C, since the packet C is transmitted to the node device III 59 with the channel of the wavelength $\lambda 1$, the packet C is inputted to the separation/insertion unit I 15 after received by the fixed wavelength reception unit I 7, and is relayed and transmitted toward the node device IV 60 without being inputted to the separation/insertion unit V 19 to which the destination terminal equipment is connected. It is likewise relayed in the node device IV 60 and enters the node device I 57.

In the buffer I 23 of the node device I 57, the packet C is stored, according to the address thereof, in the respective channel memory unit V 87, then read when the variable-wavelength transmission unit I 31 assumes the transmission wavelength $\lambda 5$ and transmitted toward the node device II 58. After being relayed therein, the packet C enters the node device III 59, is received by the fixed wavelength reception unit V 11, separated according to the address in the separation/insertion unit V 19 and reaches the destination terminal 53.

This embodiment can provide a less expensive network system, because of the use of the node devices lacking the variable-wavelength transmission units, buffers and control means therefor.

Figure 23B:
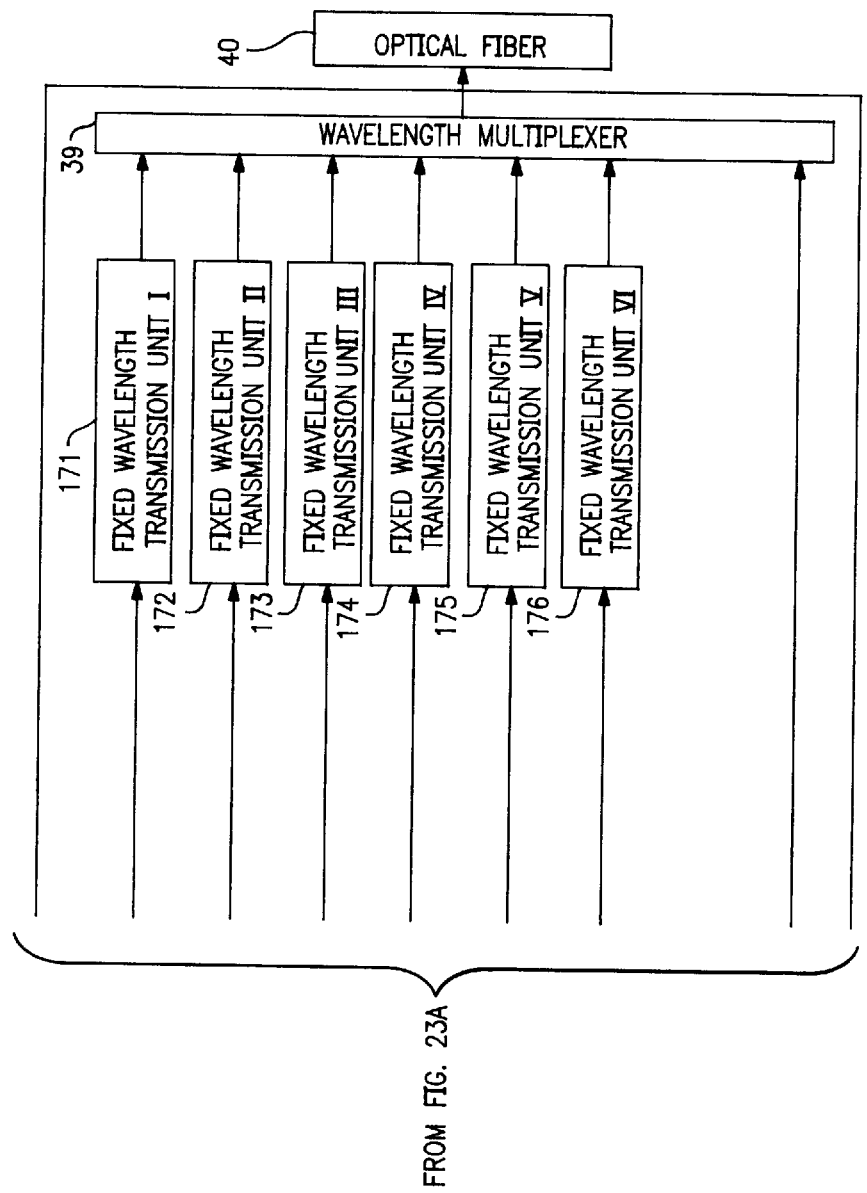
FIG. 23 is comprised of FIGS. 23A and 23B illustrating views showing the configuration of a node device for use in a third embodiment of the present invention.

It is also possible to employ the configuration as shown in FIGS. 23A and 23B, in a part of the node devices constituting the network system. The node device shown in FIGS. 23A and 23B can be formed, from that shown in FIGS. 22A and 22B, by eliminating the fixed-wavelength reception units, the separation/insertion units and the fixed-wavelength transmission units corresponding to $\lambda 7$ and $\lambda 8$. A filter 181 only transmits the signals of $\lambda 7$ and $\lambda 8$ which are not handled in this node device, and intercepts the signals of $\lambda 1$ to $\lambda 6$. Even in case the network system contains such node device, it is still possible to transmit the packet to a desired terminal equipment if the network contains at least a node device of the configuration shown in FIGS. 6A and 6B, which has the variable-wavelength transmission units capable of synchronized variation of the transmission channels, in a number same as that of the transmission channel, thereby varying the channel or the wavelength of packet transmission.

[Embodiment 4]

In the foregoing embodiment 3, as all the node devices are not capable of varying the packet communicating channels, the separation unit of each node device has to judge whether the destination terminal of the entered packet is connected to this separation unit. For this reason, if the address of the packet is constructed as shown in FIG. 8, it becomes necessary to judge both of the channel address and the node address. This is because the node address alone cannot indicate whether the destination of the packet is connected to this separation unit, as it is not clear whether the packet entered into the separation unit is already transmitted on the desired channel. Therefore the present embodiment provides, even in case all the node devices are not given the function of varying the channel as in the third embodiment, a configuration in which the separation unit of every node device need not judge the channel address of the packet.

Figure 24:
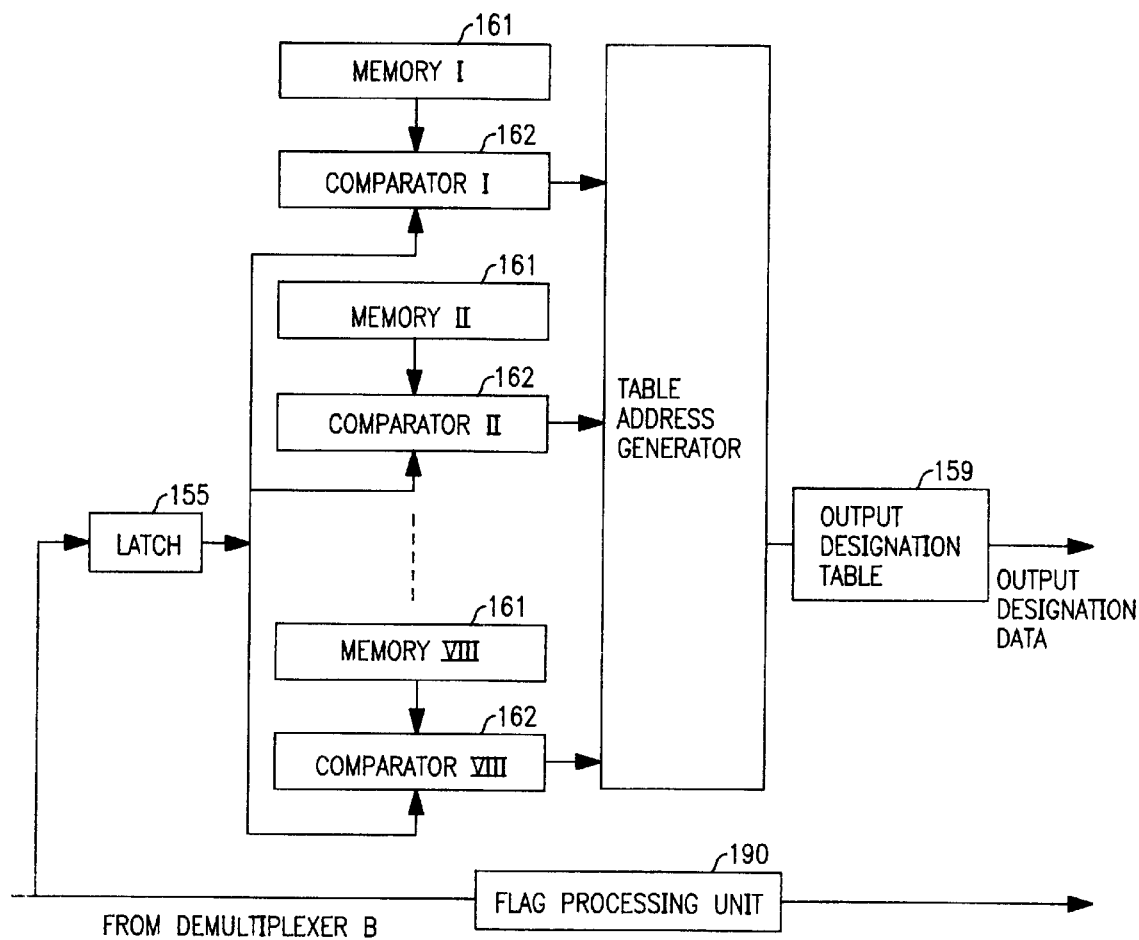
FIG. 24 is a view showing the configuration of a buffer unit in a 4th embodiment of the present invention.

In the present embodiment, the buffer unit of the node device that is capable of varying the packet transmitting channel is provided with a flag process unit for processing as address flag which is provided in the packet as will be explained later. more specifically, a flag process unit 190 is provided between the demultiplexers B and C shown in FIG. 11, and indicates that the node address is effective, when an address flag is set on the packet. Such configuration is shown in FIG. 24.

Figure 25:
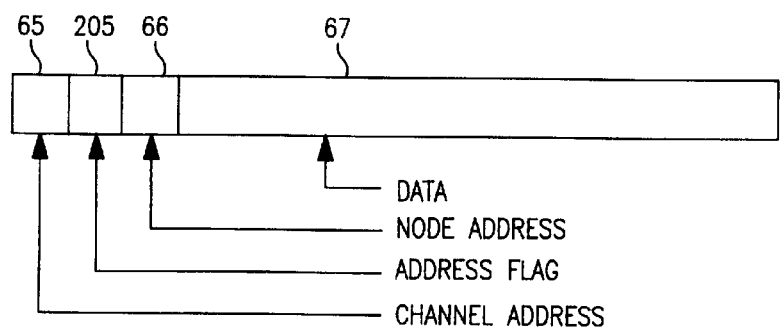
FIG. 25 is a view showing the configuration of a packet in the 4th embodiment of the present invention.

FIG. 25 shows the configuration of the packet employed in this embodiment, which is same as that shown in FIG. 8 except for the addition of an address flag 200 which indicates effectiveness of the node device identifying information. The address flag 200 is in the reset state when the packet is transmitted from the transmitting terminal equipment, and is set when this packet is transmitted, in a node device having the channel varying means or the variable-wavelength transmission unit, in a channel corresponding to a separation unit connected to the destination terminal equipment of the packet.

At the data transmission in the present embodiment, each terminal equipment constructs the packet as shown in FIG. 25, with the address flag in the reset state. Each separation unit, receiving the packet, latches the node address and the address flag of the packet by the latch 71, and separates only the packet of which the address flag is set and the node address coincides with the comparison value. A packet whose address flag is not set is not separated and is transferred to the buffer unit, even if in case of coincidence of the node address. The packet is relayed by the node devices in this manner, and, upon entry into the node device having the variable-wavelength transmission units, the packet transmitting channel is determined in the buffer unit of this node device according to the channel address of the packet and the address flag is set in the flag process unit. The packet with thus set flag is separated in the separation unit connected to the destination terminal equipment, because of the coincidence of the node address and the set state of the address flag, and reaches the destination terminal equipment.

[Embodiment 5]

Figure 2:
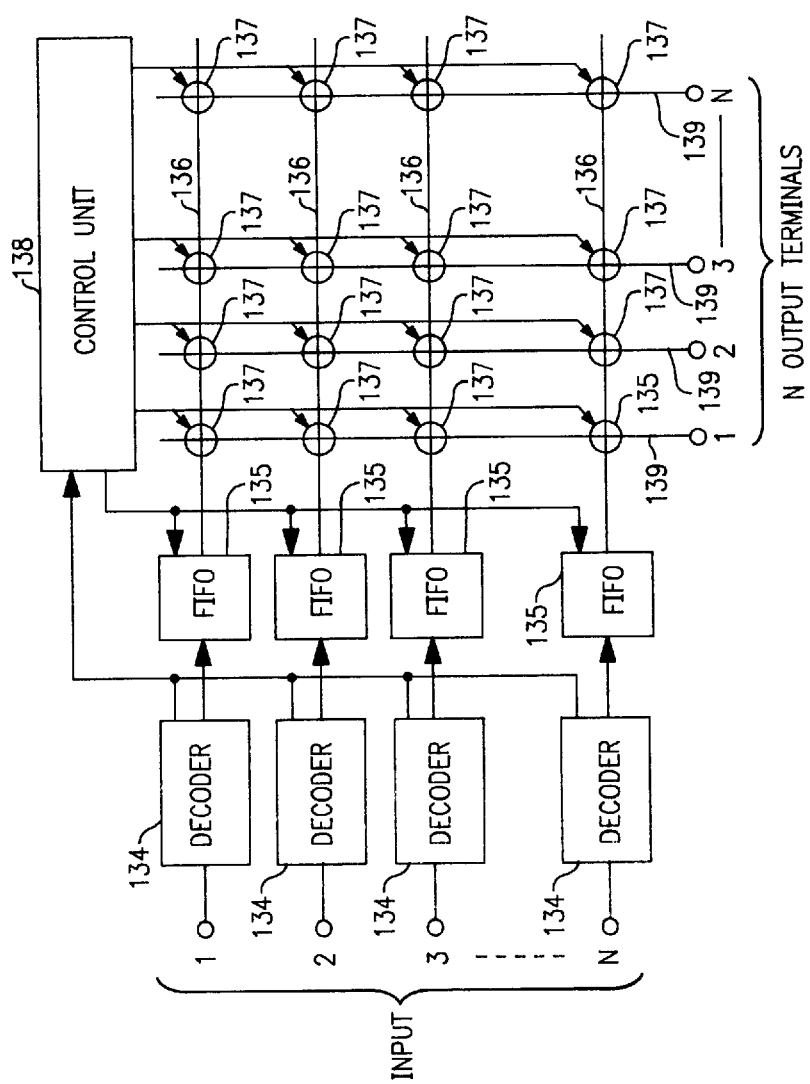
FIG. 2 is a view showing 8×8 electrical switches in the first conventional configuration.
Figure 3:
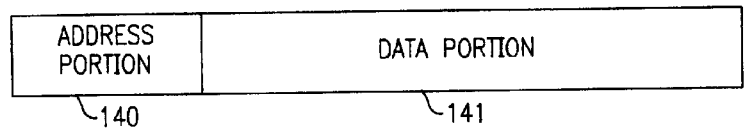
FIG. 3 is a view showing the configuration of a packet.
Figure 4:
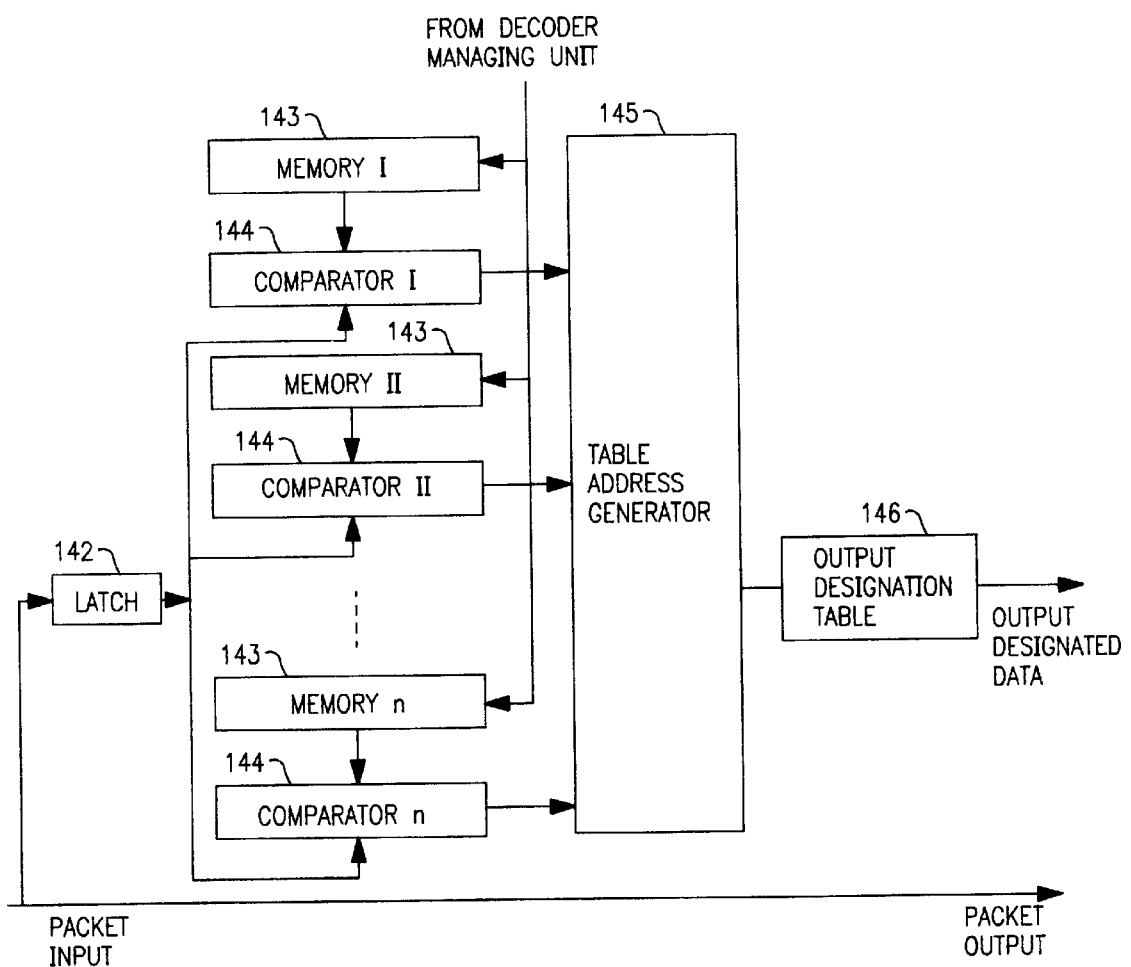
FIG. 4 is a view showing the configuration of a decoder.
Figure 5:
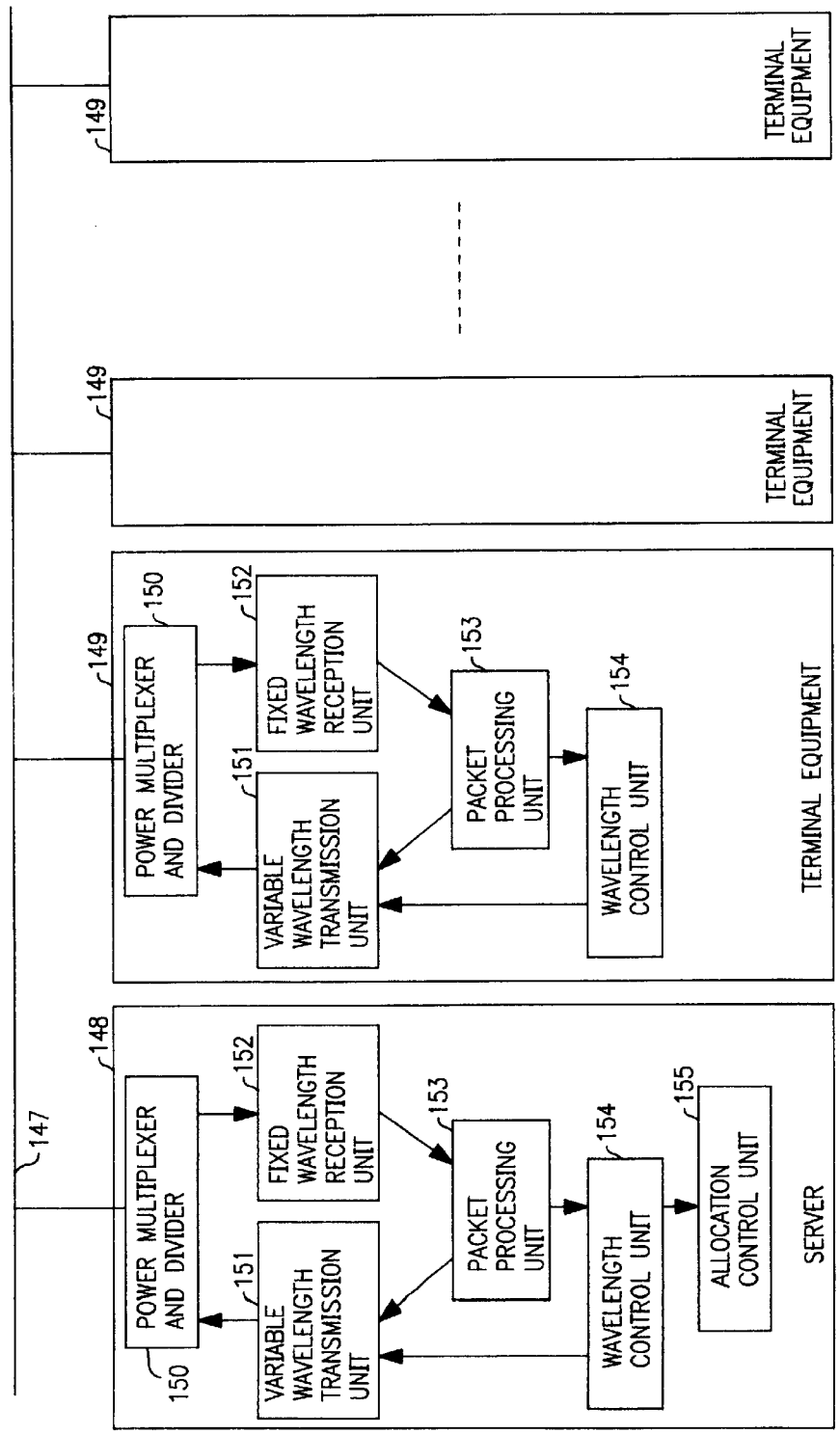
FIG. 5 is a view showing a second conventional configuration.
Figure 26B:
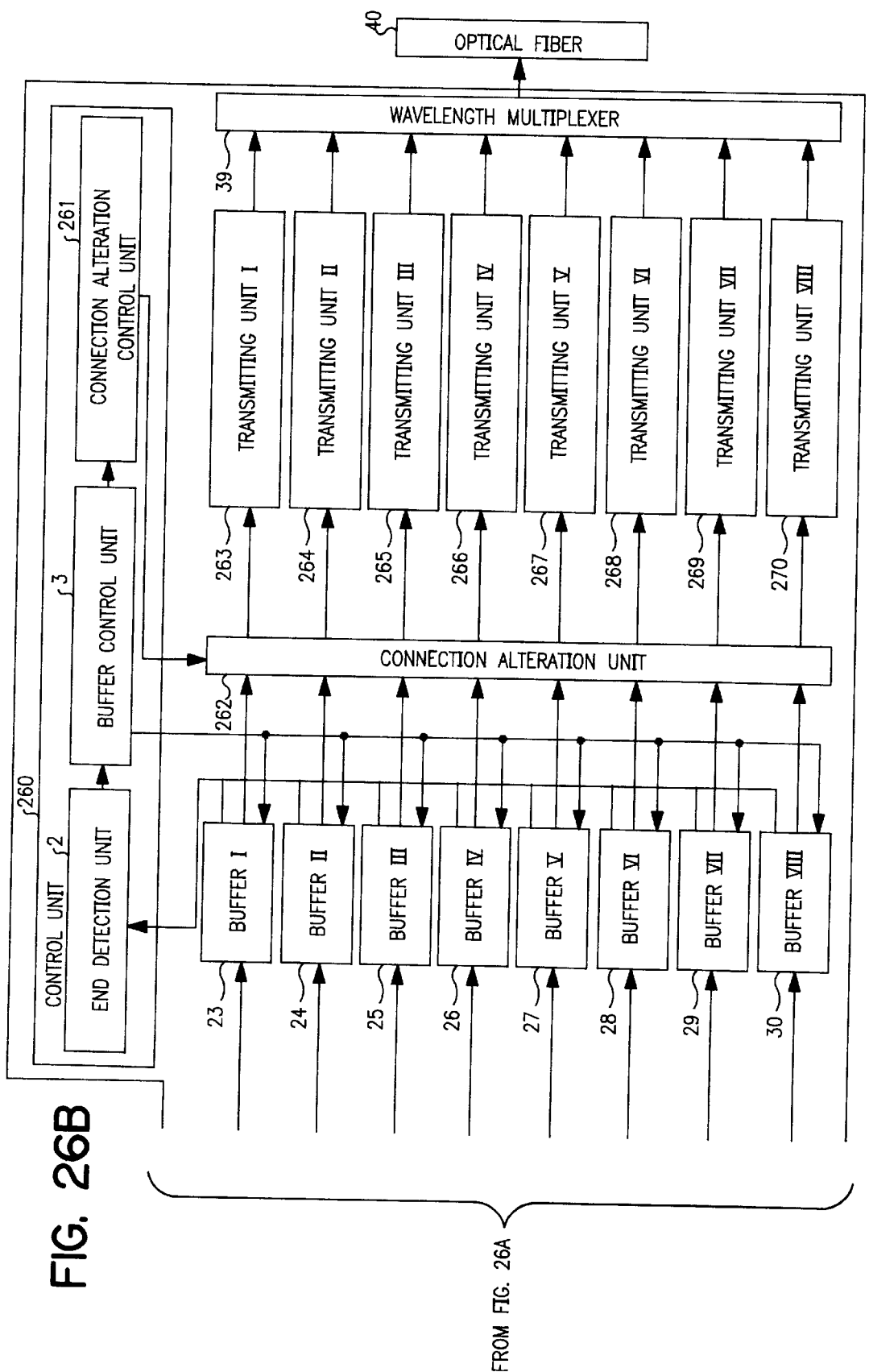
FIG. 26 is comprised of FIGS. 26A and 26B illustrating views showing the configuration of a node device in a 5th embodiment of the present invention.

This embodiment employs a node device as shown in FIGS. 26A and 26B, in which components equivalent to those in FIG. 1 are represented by same numbers. It is different from the node device shown in FIG. 1 in that the wavelength transmitted from the transmission units I–VIII (263–270) are not variable, that a connection varying unit 262 is provided for varying the connection relationship between the buffers and the transmission units, and that a connection varying control unit 261 for controlling the connection varying units is provided instead of the wavelength control unit. In this embodiment, each transmission unit is incapable of varying the transmission wavelength but is assigned with a predetermined wavelength, and the transmission units capable of output from the buffer units are varied in a predetermined pattern. The configuration of the network in this embodiment is same as that shown in FIG. 2.

A connection varying unit 262, constituting the connection varying means, is connected, at input terminals I–VIII thereof, respectively to the buffers I–VIII, and, at output terminals I–VIII, respectively to the transmission units I–VIII.

The transmission units I–VIII employing semiconductor lasers convert the packets, entered from the connection varying unit, into optical signals of predetermined wavelengths and transmit them through the multiplexer to the optical fiber constituting the physical medium of the optical wavelength-multiplexed transmission path. The semiconductor laser is of the DFB (distributed feedback) type with multielectrode structure. Since also this embodiment employs the optical wavelength-multiplex method by multiplexing 8 channels, the transmission units I–VIII are assigned with transmission wavelengths $\lambda 1$ to $\lambda 8$ by the control of injection currents to the electrodes of the DFB lasers.

Figure 27:
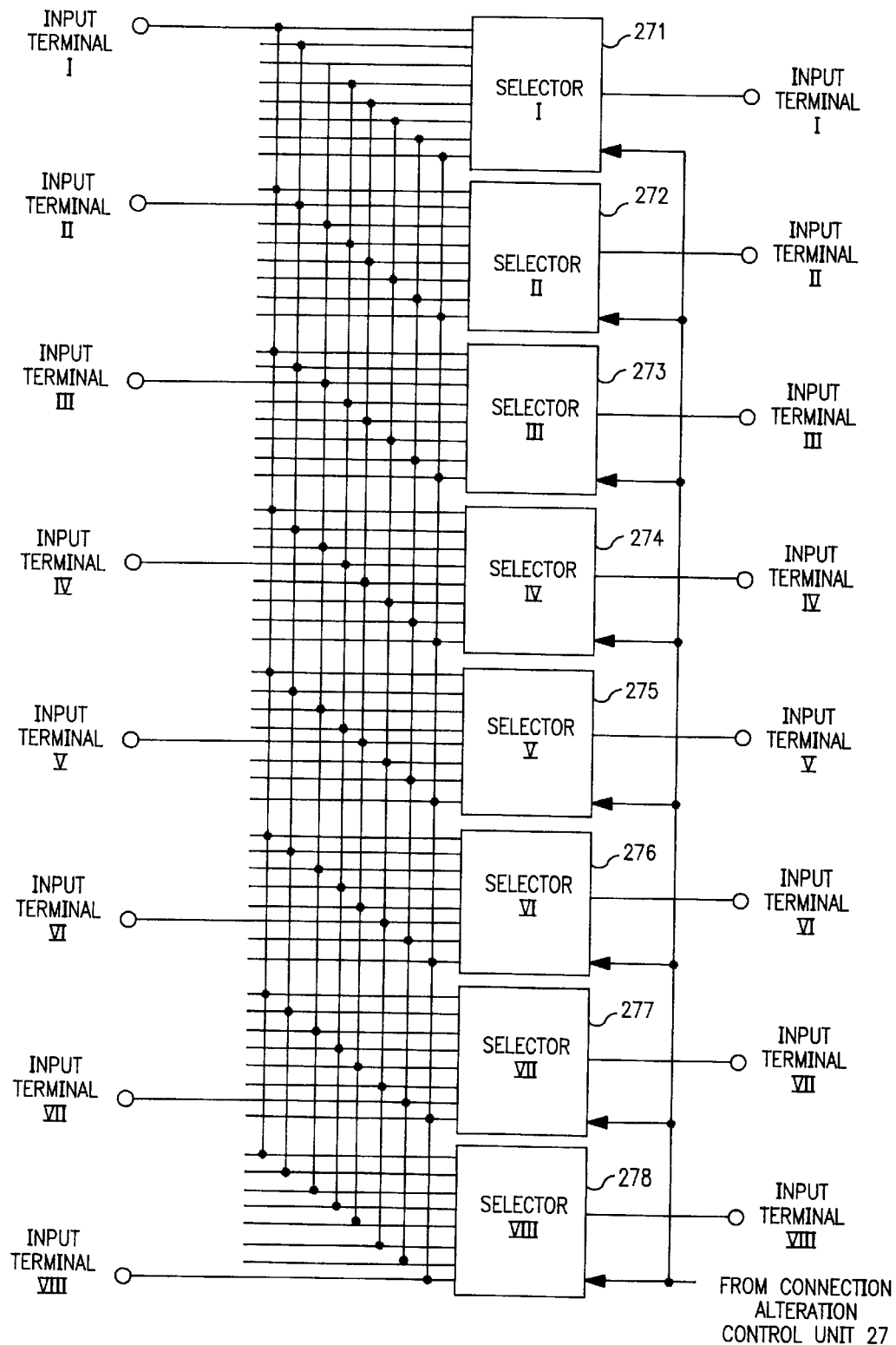
FIG. 27 is a view showing the configuration of a connection varying unit in the 5th embodiment of the present invention.

FIG. 27 shows the internal , structure of the connection varying unit employed in this embodiment, having eight input terminals and eight output terminals. Selectors I–VIII (271–278) receives 8 signals from the input terminals and transfer the packets from the predetermined input terminals to the output terminals according to a selection signal supplied from the connection varying control unit as will be explained later. In this manner there is determined the connection relationship between the input and output terminals, and the shifting of the packet between the channel process groups is achieved.

Figure 28:
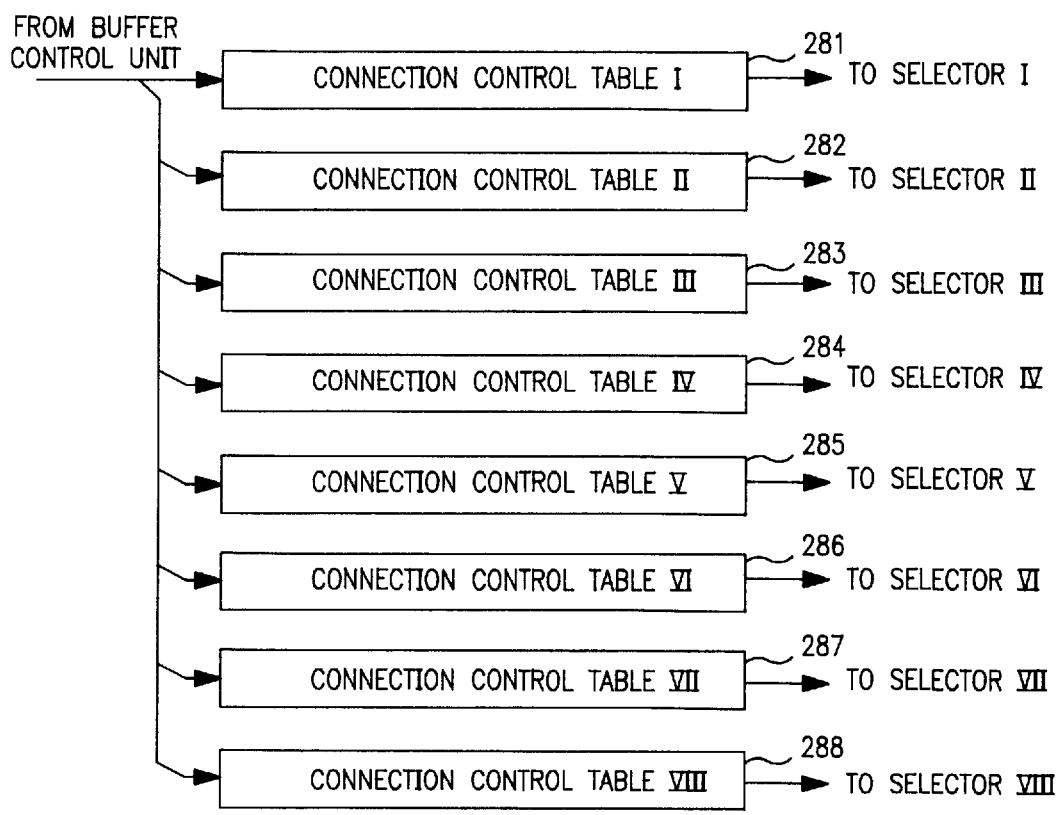
FIG. 28 is a view showing the configuration of a connection variation control unit in the 5th embodiment of the present invention.

FIG. 28 shows the internal structure of the connection varying control unit employed in this embodiment, wherein connection control tables I–VIII (281–288) are read in succession according to addresses released from the ROM counter of the buffer control unit, thereby sending predetermined control signals to the selectors of the connection varying unit. These tables are compose of ROM and the contents thereof will be explained later.

In this fifth embodiment, the connection varying tables I–VIII have contents as shown in Table 5.

Table 5 shows the input terminals to be selected by the selectors I–VIII of the connection varying unit. As the selectors I–VIII are respective connected to the output terminals I–VIII, the connection relationship between the input and output terminals is determined by Table 5. Table 5 is so constructed that two or more input terminals are not simultaneously connected to a same output terminal. Table 6 shows, for each output address of the ROM counter, the relationship between the input and output terminals, determined by the connection control tables I–VIII.

The configuration of the buffer control unit in this embodiment is same as that shown in FIG. 9, but the buffer control tables I–VIII have offsets shown in Table 7. These 16 tables are cyclically read in synchronization, by means of the ROM counter. Consequently the connection relationship between the input and output terminals is a cyclic pattern in which the output terminals connected to the input terminals are cyclically changed.

As indicated in Tables 5, 6, and 7, when each input terminal is connected to the output terminal I, II, III, IV, V, VI, VII or VIII, there is respectively read, in each buffer, the respective channel memory unit I, II, III, IV, V, VI, VII or VIII. Thus, by setting the connection control tables as shown in Table 5 and the buffer control tables as shown in Table 7, the read-out of the packet stored in the each buffer is so controlled as to be synchronized with the connection to an output terminal corresponding to a channel process group containing, in the adjacent node device, the separation/insertion unit which is connected to the destination terminal equipment.

Figure 29:
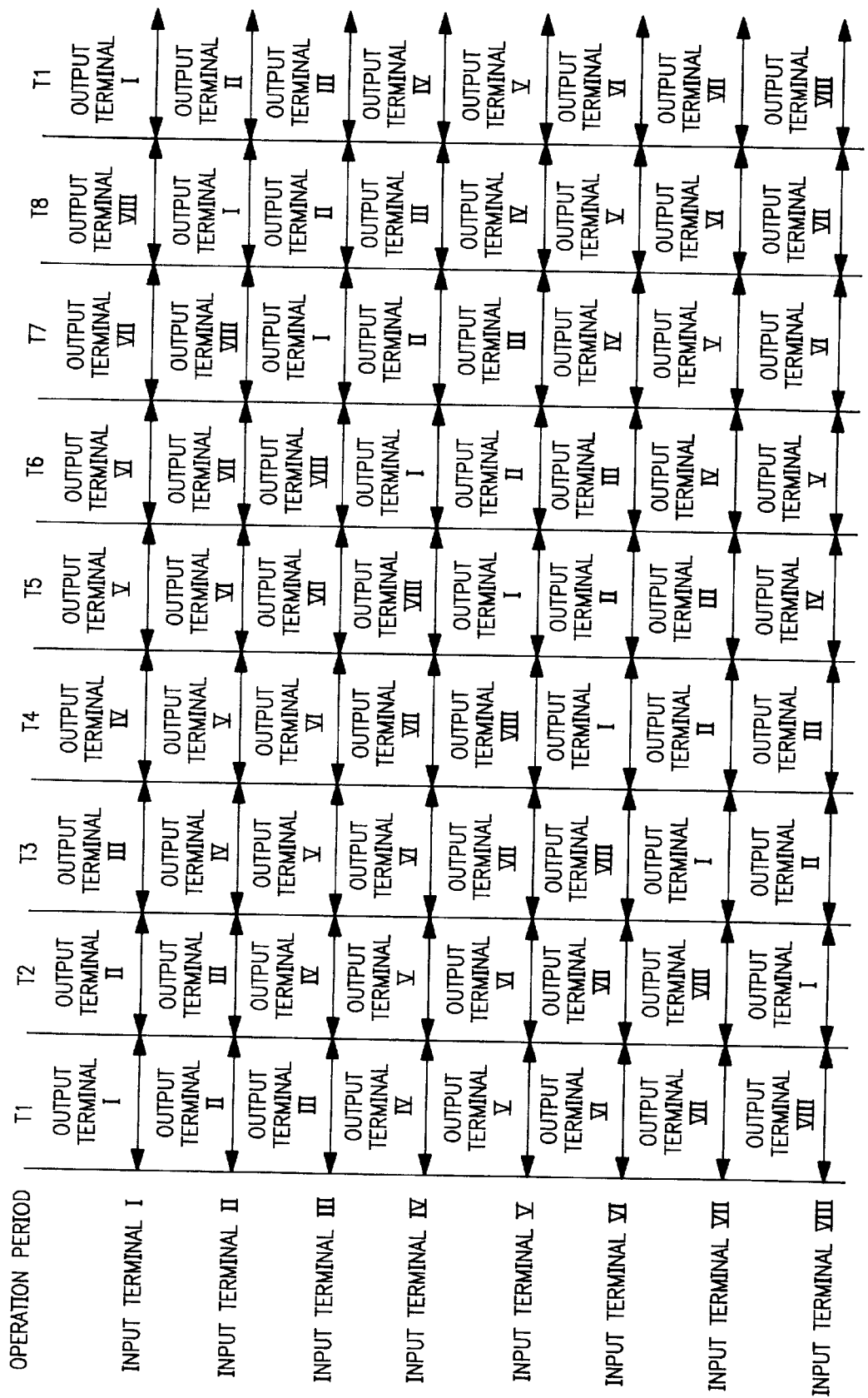
FIG. 29 is a timing chart of the 5th embodiment of the present invention.

The function of the node device in this embodiment consists, as shown in FIG. 29, of eight consecutive operation periods T1–T8, formed by cyclic reading of the eight values in the above-mentioned 16 tables. Each of these eight operation periods is divided, by the function of the buffers, into a dual-port memory reading period Td and a FIFO reading period Tf, which are adequately controlled as in the foregoing embodiments.

In the following there will be explained, with reference to the attached drawings, the function of the fifth embodiment, taking an example of packet transmission from a terminal equipment I 49, connected to the sub transmission path I 41 of the node device I 57 to a destination terminal equipment V 53, connected to the sub transmission path V 45 of the node device III 59. In the following description, the transmitted packet will be called the packet D.

The transmitting terminal equipment I 49 constructs the packet D by adding the channel address and the node address to the data to be addressed to the terminal equipment V 53, and sends it to the separation/insertion unit I 15 of the node device I 57, through the sub transmission path I 41. In this state the channel address is set at "5" according to Table 5, since the channel process group of the separation/insertion unit V 19, connected to the destination terminal equipment V 53, uses the wavelength $\lambda 5$. The node address is set at "3", because the destination of the packet is the node device III 59.

The I/F of the separation/insertion unit I 15 stores the packet D, transmitted through the sub transmission path I 41, into the FIFO-A. After the storage, the insertion control unit 76 finds a gap in the packet flow from the FIFO-B, switches the selector-A to the input from the FIFO-A, interrupts the read-out of the FIFO-B and starts the read-out of the FIFO-A. After the packet from FIFO-A, the insertion control unit switches the selector-A again to the input from the FIFO-B, terminates the read-out of the FIFO-A and restarts the read-out of the FIFO-B.

The packet D released from the selector-A is entered in the buffer I, and the node address of the packet is latched in the latch-B and supplied to the comparator-B. As the node address "3" of the packet D does not coincide with the comparison input value # of the comparator-B of the buffers of the node device I, set as "2" which is the node address of the downstream adjacent node device II, the comparator-B sends a channel-designation-free process instruction signal to the demultiplexer-B, which in response sends the input packet D to the FIFO-C.

If the storage of the packet D in the FIFO-C takes place in an operation period T8, the packet D is read in the channel-designation-free packet transmission period Tf of a succeeding operation period T1, under the control of the buffer control unit 3.

In the succeeding operation period T1, a read-out address 0 is supplied from the ROM counter 99 of the buffer control unit 3 to the connection control tables I–VIII, in order to read the contents thereof. In this operation, from the connection control tables I–VIII, there are read control signals respectively corresponding to the input terminals I–VIII as indicated in Table 5. These control signals are respectively supplied to the selectors I–VIII (271–278) of the connection varying unit 262, whereby the selectors respectively select the input terminals.

In the channel-designated packet transmission period Td of the operation period T1, the read-out address 0, supplied from the ROM counter 99 of the buffer control unit 3 is also supplied to the buffer control tables I–VIII of the buffer control unit 3, for reading the contents thereof In this operation, from the buffer control tables I, II, III, IV,, V, VI, VII and VIII, there are read control signals for respectively reading the respective channel memory units I, II, IV, VI, VIII, VII V and III.

These control signals are supplied to the selector-B, FIFO-C, specified respective channel memory unit and read-out address counter 96 of the buffers In response, the buffer I 23 effects enabling the readout of the respective channel memory unit I, disabling the read-out of the FIFO-C and selecting the respective channel memory unit I as the signal input source for the selector-B.

In the respective channel memory unit I, the value of the write-in address counter is latched in the latch-C, whereby the last address, in the dual-port memory, of the channel-designated packets to be transmitted with the wavelength $\lambda 1$ is memorized, and the packets stored up to this address are transmitted in the channel-designated packet transmission period Td. When the read-out is enabled, the read-out address counter 96 effects successive increments to generate address for reading the packets stored in the dual-port memory and sends these addresses to the dual-port memory 97. In response to the packets are read in succession from the output port thereof and are supplied to the transmission unit I 263 through the input terminal I and the output terminal I of the connection varying unit.

The read packets, having a transmission wavelength $\lambda 1$, are addressed to the terminal I connected to the sub transmission path I of the adjacent node device II 58.

Also in the channel-designated packet transmission period Td of the operation period T1, in the buffer II 24, the channel-designated packets are read from the dual-port memory 97 of the respective channel memory unit II, as in the buffer I 23, in response to the control signal released from the buffer control table II 101, and are supplied to the transmission unit II 264. Similarly the channel-designated packets are read from the dual-port memories of the respective channel memory units III–VIII respectively of the buffers III–VIII (25–30) and are respectively supplied to the transmission units II–VIII (266–270). The packets read in this operation are respectively addressed to the terminals connected to the sub transmission paths II–VIII of the adjacent node device II 58.

In this channel-designated packet transmission period Td of the operation period T1, in each respective channel memory unit effecting the packet read-out operation, the value of the read-out address counter 96 is increased in succession under the control of the buffer control unit 3 and is supplied to the comparator-C 95, of which the other input port receives the value of the write-in address counter 94, latched at the start of the channel-designated packet transmission period Td of the operation period T1. Thus, when the read-out operation of the channel-designated packets from the dual-port memory is completed before the start of the channel-designated packet transmission period Td of the operation period T1 as a result of successive increments of the address released from the read-out address counter 96, the comparator-C 95 releases the coincidence signal.

In response to the coincidence signal, each buffer shifts to the channel-designation-free packet transmission period Tf until the release of the end signal from the end detection unit. However the buffer storing the largest number of the channel-designated packets and releasing the coincidence signal at the last does not shift to the channel-designation-free packet transmission period Tf but to the channel-designated packet transmission period of a next operation period, since such coincidence signal indicates, as shown in FIG. 20, that all the data to be read in the current channel have been read from all the respective channel memory units.

In the channel-designation-free packet transmission period of the operation period T1, the read-out control units of the buffer control unit 3 releases the control signals for disabling the read-out of the respective channel memory units, enabling the read-out of the FIFO-C and selecting the FIFO-C as the input signal source for the selector-B. In response to these control signals, the signals are read from the FIFO-C of the buffers I–VIII (23–30) and supplied, through the selector-B, to the transmission units I–VIII (263–270). In this operation, the packet D is read from the FIFO-C in the buffer I 23. Similarly the packets are read from the FIFO-C in the buffers II–VIII (24–30) and are supplied to the transmission units II–VIII (263–270).

The transmission units I–VIII (263–270) convert the packets released from the buffers I–VIII (23–30) into fixed wavelengths respectively assigned to the transmission units, and send these wavelengths to the multiplexer 39. The optical signals, emitted from eight transmission units, have mutually different wavelengths and are therefore mixed, without interference, in the multiplexer 39, so that the lights of all the wavelengths enter the optical fiber 40 and are transmitted to the downstream adjacent node device II 58.

In this state, the packet D addressed from the terminal equipment I 49, connected to the sub transmission path I 41 of the node device I 57, to the terminal equipment V 53, connected to the sub transmission path V 45 of the node device III 58, is transmitted, as an optical signal of the wavelength $\lambda 1$ as explained in the foregoing, to the node device II 58.

The packet D thus transmitted is relayed in the node device II 58 in the following manner.

The optical signals of the wavelengths λ1–λ8, transmitted from the node device I 57 through the optical fiber 61, are divided by the divider of the node device II 58 and supplied to the fixed-wavelength reception units I–VIII (7–14). In the fixed-wavelength reception unit I 7, the optical signal of λ1 alone is transmitted by the filter I and is received by the photodiode I. The packet D, having been transmitted from the node device I 57 as an optical signal of λ1, is received by the fixed-wavelength reception unit I, and is then transferred to the separation/insertion unit I 15.

Then the node address of the packet D is latched in the latch A 71 and is supplied to the comparator-A. As the node address "3" of the packet D does not coincide with the comparison input value # "2" of the comparator-A of the node device II 58, the comparator-A sends a relay instruction signal to the demultiplexer-A 72, which in response sends the entered packet D to the FIFO-B 75. Then the packet D is read from the FIFO-B under the control of the insertion control unit, and is supplied to the buffer I 23 through the selector-A 77.

In the buffer I 23, the node address of the packet D is latched in the latch-B 79 and is supplied to the comparator-B 78. As the comparison input value # of the comparators-B of the buffers in the node device II 58 is set at the node address "3" of the downstream adjacent node device III and coincides with the node address of the packet D, the comparator-B 78 sends a channel-designated process instruction signal to the demultiplexer-B 80, which in response sends the entered packet D to the decoder and the demultiplexer-C.

In the decoder 81 of the buffer I 23, the channel address of the entered packet D is latched in the latch 155 and is supplied to the comparators I–VIII. As the channel address of the packet D is set at "5" as explained in the foregoing, while the memories I–VIII respectively stored "1" to "8" as shown in Table 2, the comparator V releases the coincidence signal to generate predetermined addresses from the table address generator, thereby reading the output designation data from the output designation table 159. The output designation data designate, to the demultiplexer-C, the respective channel memory unit V as the packet output destination, and instruct the respective channel memory unit V of the packet storage. In the memory unit V, the packet D is stored in the dual-port memory according to the address released from the write-in address counter.

If the storage of the packet D in the dual-port memory takes place in an operation period T1, the read-out of the packet D therefrom is so controlled as to wait until an operation period T5 in which the buffer I 23 of the node device II 58 is connected to the transmission unit V 267.

When the coincidence signals have been released from all the buffers in the node device II 58 and the end signal is supplied from the end detection unit to the buffer control unit, the ROM counter 99 effects an increment and the operation period T1 is terminated. In the succeeding operation period T2, a read-out address 1 is supplied from the ROM counter 99 of the buffer control unit 3 simultaneously to the connection control tables I–VIII, in order to read the contents thereof. In this operation, from the connection control tables I, II, III, IV, V, VI, VII and VIII, there are read control signals respectively corresponding to the input terminals VIII, I, II, III, IV, V, VI and VII as shown in Table 5. These control signals are respectively supplied to the selectors I–VIII (271–278) of the connection varying units. In a similar manner as explained in the foregoing, in the operation period T2, the read-out address "1" released from the ROM counter 99 of the buffer control unit 3 is supplied to the buffer control table of the buffer control unit 3, thereby releasing control signals for controlling the read-out of the buffers. Based on these control signals, the channel-designated packets are read from the dual-port memories of the specified respective channel memory units of the buffers I–VIII (23–30), and, after the read-out operation, the coincidence signals are released whereupon the channel-designation-free packets are read from the FIFO-C. In this read-out operation, in the buffers I, II, III, IV, V, VI, VII and VIII, there are respectively read the respective channel memory units VIII, I, II, III, IV, V, VI and VII as shown in Table 7. The packets read from the buffers are converted, in the transmission units I–VIII (263–270), into optical signals of predetermined wavelengths, which are transmitted to the optical fiber through the multiplexer 39.

Upon completion of tie read-out of the channel-designated packets, each buffer releases the coincidence signal and shifts to the channel-designation-free packet transmission period Tf. When the buffer storing the largest number of the channel-designated packets and completing the read-out of such packet at the last releases the coincidence signal to the end detection unit, the logic product process unit sends the end signal to the ROM counter of the buffer control unit 3, whereby the ROM counter effects an increment, the operation period T2 is terminated and the operation period T3 is initiated. Also in the operation periods T3 and T4, there are executed operations according to the connection control tables and the buffer control tables as explained in the foregoing, but the packet D is not read from the buffer I 23 since the transmission unit V 267 for the transmission in the channel λ5, receivable by the destination of the packet D, is not connected.

In the operation period T5, a read-out address "4" is supplied from the ROM counter 99 of the buffer control unit 3 to the connection control tables I–VIII and the buffer control tables I–VIII. The packet D is stored in the dual-port memory of the respective channel memory unit V 87 of the buffer I 23, and, in the buffer I, the read-out of the respective channel memory unit V is enabled in the channel-designated packet transmission period Td of the operation period T5.

According to the address "4" from the ROM counter 99, the content of the connection control table is read and the selector V 275 of the connection varying unit selects the input terminal I. The address "4" is also supplied to the buffer control unit 3 to read the contents of the buffer control tables. In the buffer I 23, there is read the respective channel memory unit V. As explained in the foregoing, the signals are read from the buffers and converted in the transmission units into the predetermined optical signals, which are transmitted to the optical fiber through the multiplexer.

The packet D is read in the channel-designated packet transmission period Td of the operation period T5, then transmitted as an optical signal of λ5 from the transmission unit V 267 to the optical fiber through the multiplexer 39, and enters the node device III 59.

The optical signals of wavelengths λ1–λ8 transmitted from the node device II 58 through the optical fiber 62, are divided by the divider of the node device III 59 and supplied to the fixed-wavelength reception units I–VIII (7–14). In the fixed wavelength reception unit V 11, the optical signal of wavelength λ5 alone is transmitted by the filter V and is received by the photodiode V. The packet D, having been transmitted as the optical signal of λ5 from the node device II 58, is received by the fixed-wavelength reception unit V 11, and is then transferred to the separation/insertion unit V 19.

The node address of the packet D is latched in the latch-A 71 and is supplied to the comparator-A. Since the node address "3" of the packet D coincides with the comparison input value # "3" of the comparator-A of the node device III 59, the comparator-A 70 sends a separation instruction signal to the demultiplexer-A 72, which in response sends the entered packet D to the I/F. Thus the packet D is transmitted from the I/F through the sub transmission path V 45, and received by the destination terminal equipment V 53. After the elimination of the address portion of the packet, the data portion alone is taken out and processed in the desired manner.

As explained in the foregoing, the packet D addressed from the terminal equipment I 49, connected to the sub transmission path I 41 of the node device I 57, to the terminal equipment V 53, connected to the sub transmission path V 45 of the node device III 59, is transmitted from the buffer I of the node device I with a wavelength ($\lambda$1 in the foregoing explanation) depending on the timing of entry of the packet D into the node device I, and is then transmitted, in the node device II 58 which is upstream adjacent to the node device III 59, as an optical signal of the wavelength $\lambda$5 corresponding to the channel process group containing the separation/insertion unit V, connected to the destination terminal equipment in the node device III 59, whereby the reception means in the node device III 59 is changed to the predetermined channel process means V. After the packet is shifted to the desired channel process group, it is received by the fixed-wavelength reception unit V 11 of the node device III 59, then separated by the separation/insertion unit V 19, transmitted through the sub transmission path V 45 and finally received by the terminal equipment V 53.

TABLE 5

Input Terminals Selected by Selectors

| Table | Address | | | | | | | |
|---|---|---|---|---|---|---|---|---|
|  | 0 | 1 | 2 | 3 | 4 | 5 | 6 | 7 |
| Connection control table I | I | VIII | VII | VI | V | IV | III | II |
| Connection control table II | II | I | VIII | VII | VI | V | IV | III |
| Connection control table III | III | II | I | VIII | VII | VI | V | IV |
| Connection control table IV | IV | III | II | I | VIII | VII | VI | V |
| Connection control table IV | V | IV | III | II | I | VIII | VII | VI |
| Connection control table IV | IV | V | IV | III | II | I | VIII | VII |
| Connection control table IV | VII | VI | V | IV | III | II | I | VIII |
| Connection control table IV | VIII | VII | VI | V | IV | III | II | I |

TABLE 6

Input and Output Terminals Connected by Connection Control Tables

| Input Terminal | Address | | | | | | | |
|---|---|---|---|---|---|---|---|---|
|  | 0 | 1 | 2 | 3 | 4 | 5 | 6 | 7 |
| Input terminal I | I | II | III | IV | V | VI | VII | VIII |
| Input terminal II | II | III | IV | V | VI | VII | VIII | I |
| Input terminal III | III | VI | V | VI | VII | VIII | I | II |
| Input terminal IV | IV | V | VI | VII | VIII | I | II | III |
| Input terminal V | V | VI | VII | VIII | I | II | III | IV |
| Input terminal VI | VI | VII | VIII | I | II | III | IV | V |
| Input terminal VII | VII | VIII | I | II | III | IV | V | VI |
| Input terminal VIII | VIII | I | II | III | IV | V | VI | VII |

TABLE 7

| Table Address | 0 | 1 | 2 | 3 | 4 | 5 | 6 | 7 |
|---|---|---|---|---|---|---|---|---|
| Buffer control table I | A1 | A2 | A3 | A4 | A5 | A6 | A7 | A8 |
| Buffer control table II | A2 | A3 | A4 | A5 | A6 | A7 | A8 | A1 |
| Buffer control table III | A3 | A4 | A5 | A6 | A7 | A8 | A1 | A2 |
| Buffer control table IV | A4 | A5 | A6 | A7 | A8 | A1 | A2 | A3 |
| Buffer control table V | A5 | A6 | A7 | A8 | A1 | A2 | A3 | A4 |
| Buffer control table VI | A6 | A7 | A8 | A1 | A2 | A3 | A4 | A5 |
| Buffer control table VII | A7 | A8 | A1 | A2 | A3 | A4 | A5 | A6 |
| Buffer control table VIII | A8 | A1 | A2 | A3 | A4 | A5 | A6 | A7 |

[Other Embodiments]

Though the foregoing embodiments have been explained by the network of a ring-shaped configuration, the present invention is also applicable to the networks of other configurations. However the ring-shaped configuration is particularly preferable as the transmission is possible among all the node devices even in case the transmission is limited to one direction. Also in the foregoing embodiments, one terminal equipment is connected to the separation/insertion means, but it is also possible to connect plural terminal equipment. It is furthermore possible to connect another network, containing plural terminal equipment, to the separation/insertion means.

Also in the foregoing embodiments, the separation/insertion means is employed for separating the packet to the connected terminal equipment and inserting the packet from such terminal equipment into the multi-channel transmission path, but such separation means and the insertion means may be provided separately. In such case, the separation means is preferably positioned at the upstream side of the insertion means.

Also in the foregoing embodiments, the wavelengths are separated and received in each node device by means of the divider and the filters, but there may also be employed light splitter capable of separating the wavelength-multiplexed light into respective wavelengths, and the configuration of the node device can be further simplified in this manner.

Also the memory capacities in the separation/insertion unit, the FIFO and the dual-port memory in each node device can be determined in consideration of the size of the transmitted packet and the transmission capacity required for the network.

Also in the foregoing embodiments, the plural channels are realized by the plural lights of different wavelengths, it is also possible, with the electrical signals, to realize the plural channels for example by the frequency multiplexing technology. Also in the configuration employing the connection varying unit and the plural fixed channel transmission units as in the embodiment 5, each transmission unit and each reception unit receiving the signal from the transmission unit mutually correspond in 1:1 relationship, so that they may be connected with a separate transmission path. In such case, each transmission path becomes equivalent to a wavelength in the embodiments 1 to 4. In such configuration, the wavelength or the frequency need not be varied among the transmission units, since the crosstalk need not be considered among the channels. Also the multiplexer and the divider can be dispensed with. FIGS. 30A and 30B show the configuration of the node device in such configuration, employing ribbon fibers 301, 302, containing plural optical fibers constituting plural channels. Such collected plural transmission paths, realizing so-called spatial multiplexing, facilitates the wiring operation and reduces the difference in distance of the transmission paths.

As explained in the foregoing, the network system, the node device and the transmission control method of the present invention allow to simplify the routing control for the packet entered into the separation/insertion unit from the sub transmission path, since the reception means for receiving the packet can be varied by controlling the transmission channel for the packet from the buffer which stores the packet, according to the information contained in the packet for identifying the channel process means therefor, and also since the separation means separates, from the incoming packet flow, the packet addressed to the destination terminal equipment connected to this separation means and transmits thus separated packet to the destination terminal equipment through the sub transmission channel according to the information of the packet for identifying the node device to which the destination terminal equipment is connected, while transmits the packet, not addressed to the destination terminal equipment, by the transmission means. Also the hardware magnitude can be made smaller, as the exchange unit in the conventional node device can be dispensed with.

Also in case of an increase in the number of the channels in the multi-channel transmission path or of the connected terminal equipment, there is only needed to correspondingly add the channel process groups. Consequently excellent expandability is assured, as the magnitude of hardware does not increase in the second order as in the conventional configuration.

Also the control by the channel varying pattern to prevent simultaneous output from plural buffer to a same channel allows to dispense with the arbitration control, required in the conventional wavelength-multiplex network system, through the detection of competition of the outputs from all the node devices in each transmission wavelength. It is therefore rendered possible to simplify the configuration of the node device and to reduce the magnitude of the hardware.

Also the frequency of channel variation is reduced by transmitting, in the same channel, the channel-designated packets and the channel-designation-free packets in succession. It is therefore rendered possible to avoid the deterioration of the throughput of the network, resulting from a fact that the data communication is not possible during the channel setting time.

Furthermore, the decoder need not compare the destination address of the packet with the addresses of all the terminals connected to the network system as in the conventional configuration, but is only required to decode the information indicating the channel process means. For this reason, the hardware magnitude does not increase and the node device does not become expensive even in case the number of the terminal equipment connected to the network system increases. It is also possible to achieve high-speed decoding, thereby achieving a high-speed operation in the network system.

In the present invention, the transmission of the channel-designated packets in the designated channel has to wait until the designated channel is selected for transmission, and the waiting period may be, at maximum, the operation periods (Td+Tf) of a number equal to the number of channels. For this reason, it is preferable to transmit the channel-designated packets preferentially to the channel-designation-free packets.

Also as the transmission channel is not varied until the transmission of the channel-designated packets is completed, the frequency of channel variation varies according to the amount of the channel-designated packets, having the priority for transmission. It is thus made possible to avoid the overflow of the buffers and to improve the quality of communication.

Furthermore, by maintaining the current channel for a predetermined period after the detection of the end by the end detection means, it is made possible to reduce the delay in transmission and to avoid the overflow of the buffers. This effect can be further enhanced by selecting the average of the channel-designation-free packet transmission period Tf longer than that of the channel-designated packet transmission period Td.

What is claimed is:

1. A network system for effecting signal transmission by connecting node devices with at least plural N channels, comprising:

a first node device constituting at least a node device and including:

N fixed-channel reception means for respectively receiving said N channels;

N buffer means for temporarily storing at least signals respectively received by said N fixed-channel reception means, wherein a buffer means of said N buffer means divides said received signals into first signals with designation of a channel for transmission and second signals without designation of a channel for transmission, where the first and second signals are to be transmitted to another node device, and further divides the first signals in respective designate channels;

transmission means for transmitting the first and second signals released from said N buffer means respectively in said N channels;

end detection means for detecting an end of reading of the first and second signals to be transmitted by channels currently capable of transmission;

channel variation control means for controlling said transmission means to vary the channels capable of transmitting released signals from said N buffer means, in response to a detection of the end of reading by said end detection means such that the released signals from two or more of said N buffer means are not simultaneously supplied to a same channel; and buffer control means for controlling said N buffer means, in synchronization with a variation of the channels capable of transmitting the released signals from said N buffer means, to read the first and second signals based on the variation of the channels.

2. A network system according to claim 1, wherein said first node device further includes:

N separation means for separating, from a signal flow released from said N fixed-channel reception means, only a predetermined signal according to associated address information and sending said predetermined signal to a connected terminal equipment;

N insertion means for inserting a signal transmitted from said connected terminal equipment into the signal flow released from said N fixed channel reception means.

3. A network system according to claim 2, wherein:

the associated address information contained in said predetermined signal includes channel identification information for identifying a channel corresponding to said N separation means to which destination terminal equipment is connected, and node identification information for identifying a node device to which the destination terminal equipment is connected;

said buffer means is adapted to determine a channel for transmitting an input signal according to said channel identification information; and said N separation means is adapted to separate said predetermined signal according to said node identification information and to send said predetermined signal to the destination terminal equipment connected to said N separation means.

4. A network system according to claim 1, wherein said channel variation control means is adapted to vary the channels capable of transmitting the released signals, after the detection of the end of reading of the first and second signals to be transmitted by the channels currently capable of transmission, from all said N buffer means.

5. A network system according to claim 1, wherein said channel variation control means is adapted to vary the channels capable of transmitting the released signals from said N buffer means, after a predetermined time from the detection of the end of reading of the first and second signals to be transmitted by the channels currently capable of transmission, from all said N buffer means.

6. A network system according to claim 1, wherein said channel variation control means is adapted to vary the channels capable of transmitting the released signals from said N buffer means according to a predetermined pattern.

7. A network system according to claim 1, wherein said transmission means is composed of N variable-channel transmission means respectively corresponding to said N buffer means, and said channel variation control means is adapted to respectively vary the transmission channels of said N variable-channel transmission means.

8. A network system according to claim 1, wherein:

said transmission means is composed of N fixed-channel transmission means for transmission in predetermined channels, without mutual overlapping, in said N channels, and connection variation means for varying the connection relationship between said N buffer means and said N fixed-channel transmission means; and said channel variation control means is adapted to control said connection variation means to vary said fixed-channel transmission means capable of transmitting the released signals.

9. A network system according to claim 8, wherein said connection variation means is composed of N selectors respectively corresponding to said N fixed-channel transmission means and means for distributing outputs of said N buffer means to all of said N selectors, and variation of said connection relationship is achieved by varying a selection of the outputs of said N buffer means in each of said N selectors.

10. A network system according to claim 1, wherein said plural N channels are composed of lights of mutually different wavelengths.

11. A network system according to claim 1, wherein said plural N channels are composed of mutually different transmission paths.

12. A network system for effecting signal transmission by connecting node devices with at least plural N channels, comprising:

a first node device for effecting at least signal transmission, including:

N buffer means for temporarily storing at least signals to be transmitted to another node device wherein a buffer means of said N buffer means divides said signals into first signals with designation of a channel for transmission and second signals without designation of a channel for transmission, and further divides the first signals in respective designate channels;

transmission means for transmitting the first and second signals released from said N buffer means respectively in said N channels;

end detection means for detecting an end of reading of the first and second signals to be transmitted by channels currently capable of transmission;

channel variation control means for controlling said transmission means to vary the channels capable of transmitting released signals from said N buffer means, in response to detection of an end by said end detection means such that the released signals from two or more of said N buffer means are not simultaneously supplied to a same channel; and buffer control means for controlling said N buffer means, in synchronization with the variation of the channels capable of transmitting the released signals , to read the first and second signals based on the variation of the channels;

a second node device for receiving the released signals transmitted from said first node device, including:

N reception means for respectively receiving at least said N channels.

13. A network system according to claim 12, wherein said channel variation control means is adapted to vary the channels capable of transmitting the released signals, after the detection of the end of reading of the first and second signals to be transmitted by the channels currently capable of transmission, from all said N buffer means.

14. A network system according to claim 12, wherein said channel variation control means is adapted to vary the channels capable of transmitting the released signals, after a predetermined time from the detection of the end of reading of the first and second signals to be transmitted by the channels currently capable of transmission, from all said N buffer means.

15. A network system according to claim 12, wherein said channel variation control means is adapted to vary the channels capable of transmitting the released signals according to a predetermined pattern.

16. A network system according to claim 12, wherein said transmission means is composed of N variable-channel transmission means respectively corresponding to said N buffer means, and said channel variation control means is adapted to respectively vary the transmission channels of said N variable-channel transmission means.

17. A network system according to claim 12, wherein:

said transmission means is composed of N fixed-channel transmission means for transmission in predetermined channels, without mutual overlapping, in said N channels, and connection variation means for varying the connection relationship between said N buffer means and said N fixed-channel transmission means; and said channel variation control means is adapted to control said connection variation means to vary said fixed-channel transmission means capable of transmitting the released signals.

18. A network system according to claim 17, wherein said connection variation means is composed of N selectors respectively corresponding to said N fixed-channel transmission means and means for distributing outputs of said N buffer means to all of said N selectors, and a variation of said connection relationship is achieved by varying a selection of the outputs of said N buffer means in each of said N selectors.

19. A network system according to claim 12, wherein said plural N channels are composed of lights of mutually different wavelengths.

20. A network system according to claim 12, wherein said plural N channels are composed of mutually different transmission paths.

21. A node device for use in a network system for effecting signal transmission by connecting node devices with at least plural N channels, comprising:

N fixed-channel reception means for respectively receiving said N channels;

N buffer means for temporarily storing at least signals respectively received by said N fixed-channel reception means, wherein a buffer means of said N buffer means divides said received signals into first signals to be transmitted to another node device with designation of a channel for transmission and second signals to be transmitted to another node device without designation of a channel for transmission, and further divides the first signals in respective designate channels;

transmission means for transmitting the first and second signals released from said N buffer means respectively in said N channels;

end detection means for detecting an end of reading of the first and second signals to be transmitted by channels currently capable of transmission;

channel variation control means for controlling said transmission means to vary the channels capable of transmitting released signals from said N buffer means, in response to a detection of the end by said end detection means such that the released signals from two or more of said buffer means are not simultaneously supplied to a same channel; and buffer control means for controlling said N buffer means, in synchronization with a variation of the channels capable of transmitting the released signals from said N buffer means, to read the first and second signals based on the variation of the channels.

22. A node device according to claim 21, further comprising:

N separation means for separating, from a signal flow released from said N fixed-channel reception means, only a predetermined signal according to associated address information and sending said predetermined signal to a connected terminal equipment;

N insertion means for inserting a signal transmitted from said connected terminal equipment into the signal flow released from said N fixed-channel reception means.

23. A node device according to claim 22, wherein:

the associated address information contained in said predetermined signal includes channel identification information for identifying a channel corresponding to said N separation means to which destination terminal equipment is connected, and node identification information for identifying a node device to which the destination terminal equipment is connected;

said buffer means is adapted to determine a channel transmitting an input signal according to said channel identification information; and said separation means is adapted to separate said predetermined signal according to said node identification information and to send said predetermined signal to the destination terminal equipment connected to said separation means.

24. A node device according to claim 21, wherein said channel variation control means is adapted to vary the channels capable of transmitting the released signals, after the detection of the end of reading of the first and second signals to be transmitted by the channels currently capable of transmission, from all said N buffer means.

25. A node device according to claim 21, wherein said channel variation control means is adapted to vary the channels capable of transmitting the released signals, after a predetermined time from the detection of the end of reading of the first and second signals to be transmitted by the channels currently capable of transmission, from all said N buffer means.

26. A node device according to claim 21, wherein said channel variation control means is adapted to vary the channels capable of transmitting the released signals according to a predetermined pattern.

27. A node device according to claim 21, wherein said transmission means is composed of N variable-channel transmission means respectively corresponding to said N buffer means, and said channel variation control means is adapted to respectively vary the transmission channels of said N variable-channel transmission means.

28. A node device according to claim 21, wherein:

said transmission means is composed of fixed-channel transmission means for transmission in predetermined channels, without mutual overlapping, in said N channels, and connection variation means for varying the connection relationship between said N buffer means and said fixed-channel transmission means; and said channel variation control means is adapted to control said connection variation means to vary said fixed-channel transmission means capable of transmitting the released signals.

29. A node device according to claim 28, wherein said connection variation means is composed of N selectors respectively corresponding to said N fixed-channel transmission means and means for distributing outputs of said N buffer means to all of said N selectors, and variation of said connection relationship is achieved by varying a selection of the outputs of said N buffer means in each of said N selectors.

30. A node device according to claim 21, wherein said plural N channels are composed of lights of mutually different wavelengths.

31. A node device according to claim 21, wherein said plural N channels are composed of mutually different transmission paths.

32. A node device for effecting at least signal transmission and for use in a network system for effecting signal transmission by connecting node devices with at least plural N channels, comprising:

N buffer means for temporarily storing at least signals to be transmitted to another node device wherein a buffer means of said N buffer means divides said signals into first signals with designation of a channel for transmission and second signals without designation of a channel for transmission, and further divides the first signals in respective designate channels:

transmission means for transmitting the first and second signals released from said N buffer means respectively in said N channels;

end detection means for detecting an end of reading of the first and second signals to be transmitted by the channels currently capable of transmission;

channel variation control means for controlling said transmission means to vary the channels capable of transmitting released signals from said N buffer means, in response to a detection of the end by said end detection means and such that the released signals from two or more of said buffer means are not simultaneously supplied to a same channel; and buffer control means for controlling said N buffer means, in synchronization with the variation of the channels capable of transmitting the released signals, to read the first and second signals based on the variation of the channels.

33. A node device according to claim 32, wherein said channel variation control means is adapted to vary the channels capable of transmitting the released signals, after the detection of the end of reading of the first and second signals to be transmitted by the channels currently capable of transmission, from all said N buffer means.

34. A node device according to claim 32, wherein said channel variation control means is adapted to vary the channels capable of transmitting the released signals, after a predetermined time from the detection of the end of reading of the first and second signals to be transmitted by the channels currently capable of transmission, from all said N buffer means.

35. A node device according to claim 32, wherein said channel variation control means is adapted to vary the channels capable of transmitting the released signals according to a predetermined pattern.

36. A node device according to claim 32, wherein said transmission means is composed of N variable-channel transmission means respectively corresponding to said N buffer means, and said channel variation control means is adapted to respectively vary the transmission channels of said N variable-channel transmission means.

37. A node device according to claim 32, wherein:

said transmission means is composed of N fixed-channel transmission means for transmission in predetermined channels, without mutual overlapping, in said N channels, and connection variation means for varying the connection relationship between said buffer means and said N fixed-channel transmission means; and said channel variation control means is adapted to control said connection variation means to vary said fixed-channel transmission means capable of transmitting the released signals.

38. A node device according to claim 37, wherein said connection variation means is composed of N selectors respectively corresponding to said N fixed-channel transmission means and means for distributing outputs of said N buffer means to all of said N selectors, and variation of said connection relationship is achieved by varying a selection of the outputs of said N buffer means in each of said N selectors.

39. A node device according to claim 32, wherein said plural N channels are composed of lights of mutually different wavelengths.

40. A node device according to claim 32, wherein said plural N channels are composed of mutually different transmission paths.

41. A signal transmission control method for use in at least a node device in a network system for effecting signal transmission by connecting node devices with at least plural N channels, comprising steps of:

respectively receiving signals by said N channels;

temporarily storing in N buffer means, among at least the received signals, signals to be transmitted to another node device, wherein the stored signals are divided into first signals with designation of a channel for transmission and second signals without designation of a channel for transmission, and where the first signals are further divided in respective designate channels;

transmitting the first and second signals released from the N buffer means respectively in the N channels such that released signals from two or more of the N buffer means are not supplied to a same channel;

detecting an end of reading of the first and second signals to be transmitted by channels currently capable of transmission;

varying the channels capable of transmitting the released signals, in response to a detection of the end of reading such that the released signals from two or more of the N buffer means are not simultaneously supplied to a same channel; and controlling the N buffer means, in synchronization with a variation of the channels capable of transmitting the released signals from the N buffer means, to read the first and second signals based on the variation of the channels.

42. A signal transmission control method according to claim 41, wherein the second signals are read, when there is no first signal to be transmitted, or after the first signal to be transmitted has been exhausted.

43. A signal transmission control method according to claim 41, wherein the variation of the channels capable of transmitting the released signals from the N buffer means is executed after the detection of the end of reading of the first and second signals to be transmitted by the channels currently capable of transmission.

44. A signal transmission control method according to claim 41, wherein the variation of the channels capable of transmitting the released signals from the N buffer means is executed after a predetermined time from the detection of the end of reading of the first and second signals to be transmitted by the channels currently capable of transmission.

45. A signal transmission control method according to claim 41, wherein the variation of the channels capable of transmitting the released signals from the N buffer means is executed according to predetermined patterns.

46. A signal transmission control method according to claim 41, wherein the node device includes N variable-channel transmission means respectively corresponding to the N buffer means, and said step for varying the channels capable of transmitting the released signals is effected by varying respective transmission channels of the N variable-channel transmission means.

47. A signal transmission control method according to claim 41, wherein the node device includes N fixed-channel transmission means for transmission in predetermined channels, without mutual overlapping, the N channels, and said step for varying the channels capable of transmitting the released signals is effected by changing a connection relationship between the N buffer means and the N fixed-channel transmission means.

48. A signal transmission control method according to claim 47, wherein a change of the connection relationship is effected by distributing respective outputs from the N buffer means to respective fixed-channels of the N fixed-channel transmission means and selectively varying distributed outputs in the N fixed-channel transmission means.

49. A signal transmission control method for use in a node device for effecting at least signal transmission in a network system by connecting node devices with at least plural channels, comprising steps of:

temporarily storing signals to be transmitted to another node device in N buffer means, wherein the stored signals are divided into first signals with designation of a channel for transmission and second signals without designation of a channel for transmission, and where the first signals are further divided in respective designate channels;

transmitting the first and second signals released from the N buffer means respectively in the N channels such that the released signals from two or more of the N buffer means are not supplied to a same N channel;

detecting an end of reading of the first and second signals to be transmitted by channels currently capable of transmission ;

varying the channels capable of transmitting the released signals, in response to a detection of the end of reading such that the released signals from two or more of the N buffer means are not simultaneously supplied to a same channel; and controlling the N buffer means, in synchronization with the variation of the channels capable of transmitting the released signals, to read the first and second signals based on the variation of the channels.

50. A signal transmission control method according to claim 49, wherein the second signals are read when there is no first signal to be transmitted, or after the first signal to be transmitted has been exhausted.

51. A signal transmission control method according to claim 49, wherein the variation of the channels capable of transmitting the released signals is executed after the detection of the end of reading of the first and second signals to be transmitted by the channels currently capable of transmission.

52. A signal transmission control method according to claim 49, wherein the variation of the channels capable of transmitting the released signals is executed after a predetermined time from the detection of the end of reading of the first and second signals to be transmitted by the channels currently capable of transmission.

53. A signal transmission control method according to claim 49, wherein the variation of the channels capable of transmitting the released signals is executed according to a predetermined pattern.

54. A signal transmission control method according to claim 49, wherein the node device includes N variable-channel transmission means respectively corresponding to the N buffer means, and said step for varying the channels capable of transmitting the released signals from the N buffer means is effected by varying respective transmission channels of the N variable-channel transmission means.

55. A signal transmission control method according to claim 49, wherein the node device includes N fixed-channel transmission means for transmission in predetermined channels, without mutual overlapping, in the N channels, and said step for varying the channels capable of transmitting the released signals from the N buffer means is effected by changing a connection relationship between the N buffer means and the N fixed-channel transmission means.

56. A signal transmission control method according to claim 55, wherein a change of the connection relationship is effected by distributing respective outputs from the N buffer means to respective fixed-channels of the N fixed-channel transmission means and selectively varying distributed outputs in the N fixed-channel transmission means.

57. A communication apparatus capable of effecting communication using plural channels and of transmitting a signal communicated on each of said plural channels, through a channel different from a receiving channel on which said signal is received, comprising:

storing means for temporarily storing the signal of each of said plural channels when the signal is received;

read out means for reading out the signal of each of said receiving channels stored in said storing means for each transmitting channel for transmission;

identifying means for identifying end of the reading-out by said read out means of the signal among the signals stored in said storing means transmitted on a predetermined channel; and channel switch means for effecting switching of the transmitting channel in accordance with a predetermined pattern in which the signal of each of said transmitting channels read out by said read out means is transmitted on the transmitting channel different from the receiving channel on which said signal is received and the signals received on at least two receiving channels are not transmitted simultaneously on the same channel, in accordance with the identification provided by said identifying means.

58. A communication apparatus according to claim 57, wherein said predetermined channel on which the end of the reading-out by said reading out means is identified is the transmitting channel on which the reading-out of the signal on each transmitting channel by said reading out mean is finally ended.

59. A communication apparatus according to claim 58, wherein said channel switch means effects switching of said transmitting channel when said identifying means identifies the end of the reading-out of the signals transmitted on said predetermined channel by said reading out means.

60. A communication apparatus according to claim 58, wherein said channel switch means effects switching of said transmitting channel after a predetermined amount of time when said identifying means identifies the end of the reading-out of the signal transmitted on said predetermined channel by said reading out means.

61. A communication apparatus according to claim 57, further comprising first determining means for determining that the received signal of each of said plural channels is a signal to be transmitted on a particular transmitting channel.

62. A communication apparatus according to claim 61, wherein said storing means distinguishably stores the signal to be transmitted on said particular channel and another signal.

63. A communication apparatus according to claim 62, wherein said storing means distinguishably stores the signal to be transmitted on said particular channel and the other signal in different storing sections.

64. A communication apparatus according to claim 61, wherein said storing means distinguishably stores the signal to be transmitted on said particular channel for each transmitting channel.

65. A communication apparatus according to claim 64, wherein said storing means distinguishably stores the signal to be transmitted on said particular channel in a different storing section for each transmitting channel.

66. A communication apparatus according to claim 57, wherein said communication apparatus is capable of communicating with another communication apparatus connected thereto through said plural channels and a terminal apparatus connected thereto through a sub-transmission path, said communicator apparatus further comprising second determining means for determining whether the received signal on each of said plural channels is a signal to be transmitted to said other communication apparatus or a signal to be transmitted to said terminal apparatus.

67. A communication apparatus according to claim 57, wherein said communication apparatus is capable of communicating with another communication apparatus connected thereto through said plural channels and a terminal apparatus connected thereto through a sub-transmission path, said communicator apparatus further comprising inserting means for inserting a signal transmitted from said terminal into a flow of a signal transmitted from said other communication apparatus.

68. A control method for a communication apparatus for effecting communication using plural channels and capable of transmitting a signal communicated on each of said plural channels, through a channel different from a receiving channel on which said signal is received, comprising:

a storing step of temporarily storing the signal of each of said plural channels when the signal is received;

a read out step of reading out the signal of each said receiving channel stored in said storing step for each transmitting channel for transmission;

an identifying step of identifying the end of reading by said reading step of the signal among the signals stored in said storing step transmitted on a predetermined channel; and a channel switch step of effecting switching of the transmitting channel in accordance with a predetermined pattern in which the signal of each of said transmitting channels read in said reading step is transmitted on the transmitting channel different from the receiving channel on which said signal is received and the signals received on at least two receiving channels are not transmitted simultaneously on the same channel, in accordance with the identification made in said identifying step.

69. A control method according to claim 68, wherein said predetermined channel on which the end of the reading-out in said reading out step is identified is the transmitting channel on which the reading-out of the signal on each transmitting channel in said reading out step is finally ended.

70. A control method according to claim 69, wherein said channel switch step effects switching of said transmitting channel when said identifying step identifies the end of the reading-out of the signal transmitted on said predetermined channel in said reading out step.

71. A control method according to claim 69, wherein said channel switch step effects switching of said transmitting channel after a predetermined amount of time when said identifying step identifies the end of the reading-out of the signal transmitted on said predetermined channel in said reading out step.

72. A control method according to claim 68, further comprising a first determining step of determining that the received signal of each of said plural channels is a signal to be transmitted on a particular transmitting channel.

73. A control method according to claim 72, wherein said storing step distinguishably stores the signal to be transmitted on said particular channel and another signal.

74. A control method according to claim 73, wherein said storing step distinguishably stores the signal to be transmitted on said particular channel and an other signal in different storing sections.

75. A control method according to claim 72, wherein said storing step distinguishably stores the signal to be transmitted on said particular channel for each transmitting channel.

76. A control method according to claim 75, wherein said storing step distinguishably stores the signal to be transmitted on said particular channel in a different storing section for each transmitting channel.

77. A control method according to claim 68, wherein said communication apparatus is capable of communicating with another communication apparatus connected thereto through said plural channels and a terminal apparatus connected thereto through a sub-transmission path, said method further comprising a second determining step of determining whether the received signal on each of said plural channels is a signal to be transmitted to said other communication apparatus or a signal to be transmitted to said terminal apparatus.

78. A control method according to claim 68, wherein said communication apparatus is capable of communicating with another communication apparatus connected thereto through said plural channels and a terminal apparatus connected thereto through a sub-transmission path, said method further comprising an inserting step of inserting a signal transmitted from said terminal into a flow of a signal transmitted from said other communication apparatus.

* * * * *

UNITED STATES PATENT AND TRADEMARK OFFICE
CERTIFICATE OF CORRECTION

PATENT NO. : 5,828,669
DATED : October 27, 1998
INVENTOR(S) : MITSURU YAMAMOTO

It is certified that error appears in the above-identified patent and that said Letters Patent is hereby corrected as shown below:

COLUMN 1

Line 65, "equipment" should read --equipment.--.

COLUMN 2

Line 30, "the" ($2^{nd}$ occurrence) should read --The--.

COLUMN 3

Line 31, "seperate" should read --separate--.

COLUMN 4

Line 6, "made" should be deleted.
Line 7, "divided" should read --divides--.
Line 17, "As" should read --as--.

COLUMN 5

Line 37, "Inexpensive" should read --inexpensive--.

COLUMN 6

Line 34, "Sion Also" should read --sion. Also--.

COLUMN 7

Line 48, "8" should read --a--.

UNITED STATES PATENT AND TRADEMARK OFFICE
CERTIFICATE OF CORRECTION

PATENT NO. : 5,828,669

DATED : October 27, 1998

INVENTOR(S) : MITSURU YAMAMOTO

It is certified that error appears in the above-identified patent and that said Letters Patent is hereby corrected as shown below:

COLUMN 8

Line 3, "the," should read --the--.
    Line 60, "channels;" should read --channel;--.
    Line 64, "signal" should read --signals--.

COLUMN 9

Line 21, "form" should read --from--.
    Line 55, "the and" should read --the end--.

COLUMN 10

Line 7, "of;" should read --of:--.
    Line 23, "an" should read --a--.
    Line 30, "signals ," should read --signals--.

COLUMN 11

Line 47, "DECRIPION" should read --DESCRIPTION--.
    Line 66, "same" should read --the same--.

COLUMN 12

Line 37, "units;," should read --units;--.

COLUMN 13

Line 45, "FIG. 7,." should read --FIG. 7,--.

UNITED STATES PATENT AND TRADEMARK OFFICE
CERTIFICATE OF CORRECTION

PATENT NO. : 5,828,669

DATED : October 27, 1998

INVENTOR(S) : MITSURU YAMAMOTO

It is certified that error appears in the above-identified patent and that said Letters Patent is hereby corrected as shown below:

COLUMN 14

Line 38, "wavelengths-" should read --wavelengths.--.

COLUMN 15

Line 41, "packet-" should read --packet.--.
    Line 46, "are" should read --is--.
    Line 62, "are" should read --is--.

COLUMN 16

Line 45, "the-address" should read --the address--.

COLUMN 17

Line 36, "infection" should read --injection--.

COLUMN 19

Line 21, "end" should read --and--.
    Line 63, "FIFOA" should read --FIFO-A--.

COLUMN 20

Line 50, "unit $_1$," should read --unit I,--.

COLUMN 22

Line 8, "Sub" should read --sub--.

UNITED STATES PATENT AND TRADEMARK OFFICE
CERTIFICATE OF CORRECTION

PATENT NO. : 5,828,669

DATED : October 27, 1998

INVENTOR(S): MITSURU YAMAMOTO

It is certified that error appears in the above-identified patent and that said Letters Patent is hereby corrected as shown below:

COLUMN 23

Line 54, "enabled-for" should read --enabled for--.

COLUMN 24

Line 25, "49,." should read --49,--.

COLUMN 25

Line 49, " destinaton" should read --destination--.
    Line 52, "after" should read --after being--.
    Line 62, "and" should read --and is--.

COLUMN 26

Line 31, "of" should be deleted.
    Line 45, "more" should read --More--.

COLUMN 27

Line 3, "if" should be deleted.
    Line 51, "internal , structure" should read --internal structure--.
    Line 55, "receives" should read --receive--.

UNITED STATES PATENT AND TRADEMARK OFFICE
CERTIFICATE OF CORRECTION

PATENT NO. : 5,828,669
DATED : October 27, 1998
INVENTOR(S) : MITSURU YAMAMOTO

It is certified that error appears in the above-identified patent and that said Letters Patent is hereby corrected as shown below:

COLUMN 28

Line 2, "compose" should read --composed--.
    Line 8, "respective" should read --respectively--.
    Line 30, "the each" should read --each--.

COLUMN 29

Line 36, "thereof" should read --thereof.--.
    Line 37, "IV,," should read --IV,--.

COLUMN 32

Line 19, "tie" should read --the--.
    Line 24, "at the last" should read --at last--.

COLUMN 41

Line 33, "signals ," should read --signals--.
    Line 38, "signals ," should read --signals--.

COLUMN 42

Line 23, "signals ," should read --signals,--.
    Line 48, "read," should read --read--.
    Line 49, "transmitted ," should read --transmitted,--.

UNITED STATES PATENT AND TRADEMARK OFFICE
CERTIFICATE OF CORRECTION

PATENT NO. : 5,828,669
DATED : October 27, 1998
INVENTOR(S) : MITSURU YAMAMOTO

It is certified that error appears in the above-identified patent and that said Letters Patent is hereby corrected as shown below:

COLUMN 43

Line 39, "transmission ;" should read --transmission;--.
    Line 48, "signals," should read --signals--.

COLUMN 44

Line 49, "is the" should read --by the--.
    Line 51, "mean" should read --means--.

COLUMN 46

Line 30, "an other" should read --another--.

Signed and Sealed this

Thirteenth Day of July, 1999

*Attest:*

Q. TODD DICKINSON

*Attesting Officer*     Acting Commissioner of Patents and Trademarks